US009959513B2

(12) United States Patent
Borodow et al.

(10) Patent No.: US 9,959,513 B2
(45) Date of Patent: May 1, 2018

(54) SYSTEMS AND METHODS INVOLVING FEATURES OF SALES FORCE PROCESSING AND/OR PRODUCTIVITY

(71) Applicant: Ophio Software, Inc., Whistler (CA)

(72) Inventors: Eli Borodow, Whistler (CA); Imed Yahmadi, Whistler (CA); Ali Aljane, Whistler (CA); Eric Baranes, Whistler (CA); Andrew Borodow, Whistler (CA)

(73) Assignee: Ophio Software, Inc., Whistler (CA)

( * ) Notice: Subject to any disclaimer, the term of this patent is extended or adjusted under 35 U.S.C. 154(b) by 671 days.

(21) Appl. No.: 13/905,115

(22) Filed: May 29, 2013

(65) Prior Publication Data
US 2014/0046711 A1    Feb. 13, 2014

Related U.S. Application Data

(60) Provisional application No. 61/652,830, filed on May 29, 2012.

(51) Int. Cl.
*G06Q 10/06*    (2012.01)
*G06Q 10/04*    (2012.01)

(52) U.S. Cl.
CPC ..... *G06Q 10/063114* (2013.01); *G06Q 10/04* (2013.01); *G06Q 10/06* (2013.01)

(58) Field of Classification Search
None
See application file for complete search history.

(56) References Cited

U.S. PATENT DOCUMENTS

| | | | |
|---|---|---|---|
| 6,292,830 B1 * | 9/2001 | Taylor | G06N 5/043 709/224 |
| 8,311,960 B1 | 11/2012 | Ginzburg | |
| 2003/0125996 A1 | 7/2003 | Bush | |
| 2004/0024629 A1 | 2/2004 | Kirby | |
| 2005/0246221 A1 * | 11/2005 | Geritz, III | G06Q 10/10 705/7.33 |
| 2006/0015533 A1 * | 1/2006 | Wolf | G06Q 10/107 |
| 2006/0123010 A1 | 6/2006 | Landry | |
| 2006/0184566 A1 * | 8/2006 | Lo | G06F 17/30038 |
| 2006/0195461 A1 * | 8/2006 | Lo | G06F 17/30011 |
| 2007/0061421 A1 * | 3/2007 | Karidi | H04L 67/02 709/218 |
| 2007/0139212 A1 * | 6/2007 | Kaundinya | G06Q 10/06 340/692 |
| 2008/0126244 A1 * | 5/2008 | Loving | G06Q 40/025 705/38 |

(Continued)

FOREIGN PATENT DOCUMENTS

WO    WO 2004/013781 A2    2/2004
WO    WO 2008/112627 A2    9/2008

OTHER PUBLICATIONS

Search Report and Written Opinion for PCT/CA2013/050415 dated Oct. 8, 2013, 11 pgs.

*Primary Examiner* — Leland Marcus
(74) *Attorney, Agent, or Firm* — Knobbe, Martens, Olson & Bear LLP

(57) ABSTRACT

Systems and methods are disclosed associated with classifying, processing and interpreting information based on the aggregation and/or analysis of fact-based data events. Some implementations include associated notifications, reports and/or dispute resolution mechanisms.

68 Claims, 48 Drawing Sheets

(56) References Cited

U.S. PATENT DOCUMENTS

| | | |
|---|---|---|
| 2008/0276179 A1 | 11/2008 | Borenstein et al. |
| 2010/0069092 A1 | 3/2010 | Bajpai et al. |
| 2011/0082746 A1 | 4/2011 | Rice et al. |
| 2013/0036117 A1 | 2/2013 | Fisher |

* cited by examiner

```
Type    Incoming Call
Time    2013-05-27 14:48
Phone   +33954081033
Notes
spoke with Jean about next quarter
purchase estimate
```
{ 1002 }

- ◉ Work Related | ○ Not Work Related
- ◉ Sales          ○ Management
- ○ Social         ○ IT and Logistics
- ○ Internal Sales ○ General

[ Save ]

```
Type    Offsite Geolocation
Time    2013-05-28 14:11
Address 565 17 St West Vancouver, BC V7V
        3S8 Canada
Notes
Enter your notes
```
{ 1006 }

- ○ Work Related | ◉ Not Work Related
- ◉ Personal
- ○ Internal Social
- ○ Benefits and HR

[ Save ]

SYSTEMS AND METHODS INVOLVING FEATURES OF SALES FORCE PROCESSING AND/OR PRODUCTIVITY

CROSS REFERENCE TO RELATED APPLICATION DATA

This application claims benefit/priority of U.S. provisional patent application No. 61/652,830 filed 29 May 2012, which is incorporated herein by reference in entirety.

BACKGROUND

Field

Aspects of the present inventions relate to "Sales Force Automation" or "Sales Force Management" systems (hereinafter collectively referred to as "SFA") and other systems that rely on data entry by users, data quality enforcement and facilitation for those systems, and both Big Data Analytics and Business Analytics, and, more particularly, to systems and methods for providing user-centric tools that help companies to facilitate and enforce both user software adoption and data quality in user data entries; automate data collection tasks and distill large volumes of relevant data from telecom networks and devices, data networks and devices, billing systems, mobile and other computing and communications devices; shorten the time needed to make that data useful and available; provide real-time access to data while making that data more user-centric and consumable by business stakeholders; and translate large volumes of transactional data into business insight to drive business decision-making.

Aspects of the present inventions utilize a data-driven approach to solving the core data quality issues for systems that collect information from users via data entry, such as Customer relationship Management and Sales Force Automation systems, and enhances those systems with actionable insight derived from objective data sources and the data quality facilitation and enforcement mechanisms described herein.

Description of Related Information

Too much data is a massive analysis issue. The volume, variety and velocity of newly available data sources challenge IT leaders to extract actionable insight from those sources while the veracity of related user data entries often complicates those challenges. As such, some of the solutions/innovations herein are designed to make sense of Big Data and other data sources to find patterns that help organizations better manage their data quality and employees, and gain new insights that enable them to make better financial projections and better manage their sales processes.

Further, drawbacks of current "Sales Force Automation" or "Sales Force Management" systems (hereinafter referred to as "SFA" and/or "SFM") include or involve aspects of failing to effectively address one or more of 3 core issues adoption, data integrity and/or productivity. For example, many such systems suffer with respect to adoption in being unable to address issues of salespeople failing to enter relevant data into the system on a timely basis or at all. Further, many suffer drawbacks with respect to data integrity, such as issues relating to sales pipeline projections that are often overly optimistic. Finally, such systems have drawbacks with respect to accurate productivity measures, such as when level(s) of productive activity may not bode well for future sales results in future quarters, but management may not have a reliability check on the level of sales prospecting and sales process activity that may be lacking.

In sum, there is a need for systems and methods that may adequately address these and other drawbacks.

OVERVIEW OF SOME ASPECTS

Aspects of the innovations herein may involve proprietary systems, methods and to answer these new questions in the areas of sales force management, sales forecast analysis, workforce policy adherence and technology adoption facilitation and enforcement. Further, sales productivity solutions/innovations herein may leverage both new and existing data streams to look for patterns within the business that correlate to success or failure in the context of the organization's sales forecasts and objectives. Implementations herein may also dynamically models way to address correlations to failure—in order to suggest changes to process and individual activities and thereby meaningfully and positively affect outcomes. This "seek, model and adapt" approach is designed to empower companies to leverage system-based pattern-detection in both their strategic and tactical decision-making, in all phases of the sales and sales-forecasting process.

It is to be understood that both the foregoing general description and the following detailed description are exemplary and explanatory only and are not restrictive of the inventions, as described. Further features and/or variations may be provided in addition to those set forth herein. For example, the present invention may be directed to various combinations and subcombinations of the disclosed features and/or combinations and subcombinations of several further features disclosed below in the detailed description.

DESCRIPTION OF THE DRAWINGS

The accompanying drawings, which constitute a part of this specification, illustrate various implementations and aspects of the innovations herein and, together with the description, help illustrate the principles of the present inventions. In the drawings:

FIGS. 9A-9C are illustrative user interfaces showing exemplary classification processing features consistent with certain aspects related to the innovations herein.

FIGS. 10A-10B are illustrative user interfaces showing exemplary classification processing features consistent with certain aspects related to the innovations herein.

FIGS. 11A-11D are flowcharts and illustrative user interface implementations showing facilitation processing consistent with certain aspects related to the innovations herein.

FIGS. 13A-13H are flowcharts and illustrative user interface implementations showing integrity resolution processing consistent with certain aspects related to the innovations herein.

FIGS. 14A-14C are flowcharts and illustrative user interfaces of illustrative dispute resolution processing and notification management processing consistent with certain aspects related to the innovations herein.

DETAILED DESCRIPTION OF ILLUSTRATIVE IMPLEMENTATIONS

Figure 1A:
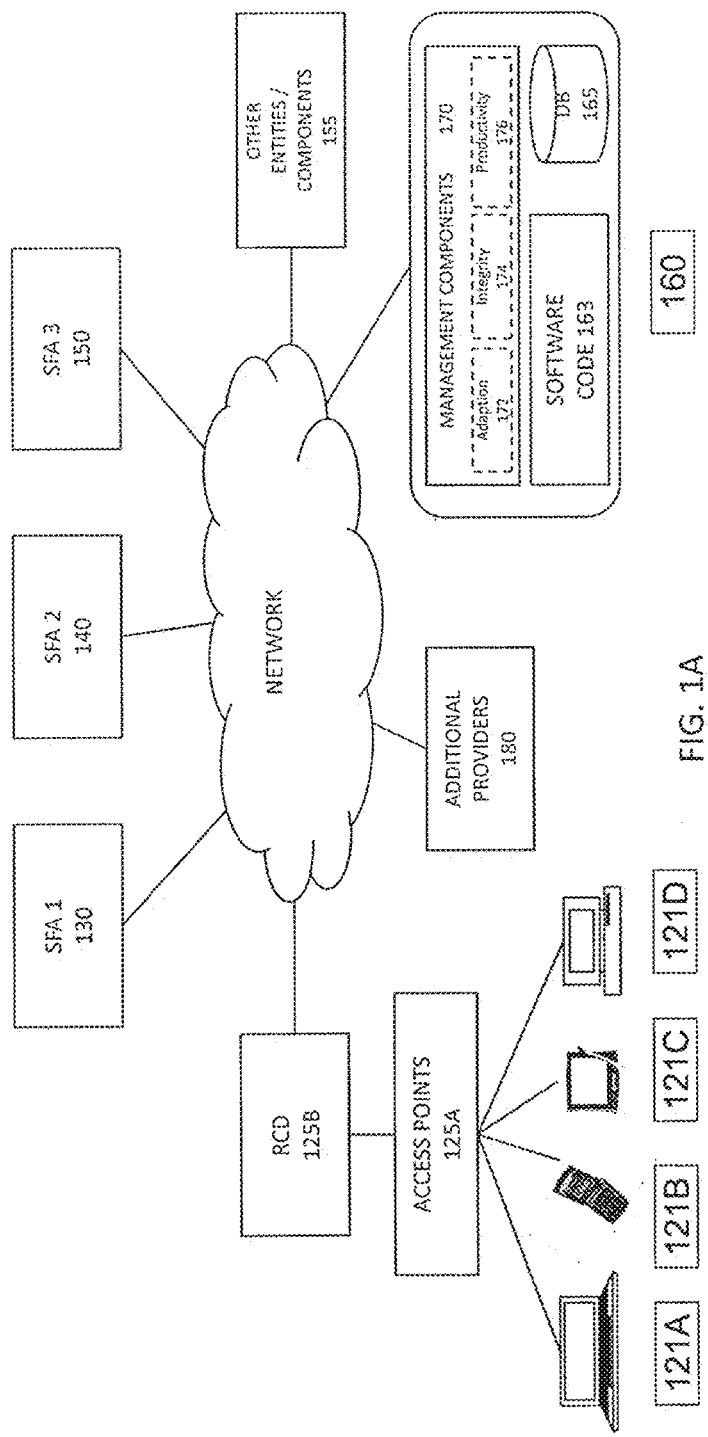
FIG. 1A is a diagram of an illustrative web or network-based implementations consistent with certain aspects related to the innovations herein.

Reference will now be made in detail to the inventions herein, examples of which are illustrated in the accompanying drawings. The implementations set forth in the following description do not represent all implementations consistent with the present inventions. Instead, they are merely some examples consistent with certain aspects related to the present innovations. Wherever possible, the same reference numbers will be used throughout the drawings to refer to the same or like parts.

Certain systems and methods herein relate to innovations characterized herein as involving aspects as described below. Various present innovations relate to the enforcement and facilitation of data entries in software systems that require systemic and methodical data entry by software users in order for such software systems to be effective. Such software systems include but are not limited to sales force automation and sales force management systems and encompass any system wherein user adoption and the honesty and integrity of user-entered data meaningfully impacts on system effectiveness (such as Business Intelligence, Analytics and Financial Services software that requires compliance).

Most software systems for managing employee efforts, activities and policy/process compliance, such as Sales Force Automation ("SFA") systems (also known as "Sales Force Management"), fundamentally rely on inputs being methodically entered into the system by sales team members as well as on the integrity of those team members. As such, the data generated by such systems has generally been incomplete (user adoption issue) and plagued by inaccurate information (user integrity issue).

The innovations contained herein include the ability to aggregate, measure, track and cross reference each person's "event data stream": including electronic calendar entries, previous CRM and Sales Force Automation system data entries, records of PBX (circuit-switched and packet-switched, directly or indirectly via Presence Manager or other systems that can provide such records) and mobile phone calls made to prospects and customers, emails, SMS messages, chat messages, fax information obtained from fax server, desktop fax software program or from the Call Detail Records ("CDR") of fax lines, credit card transaction data, Wifi and geo-location data (related to site visits and off-site meetings and other location-relevant reporting)—and to identify the points at which follow-on data entries are ordinarily required.

As such, the innovations contained herein include new approaches to the determination that an event has occurred that requires follow-on human data-entry; as well as a new classification approach to processing raw data to improve the quality of that data and prepare it for analysis. Systems and methods herein may also include processes for enforcing user adoption compliance. Here, for example, implementations may recognize external events that require human data entry, provide one or more mechanisms for displaying and classifying "unprocessed" events (e.g., raw data without context, etc.), and provide escalation thresholds based on elapsed time for processing events. Further, such escalation thresholds may vary as a function of various factors such as event type, opportunity type/size, customer value, etc and/or may include the context of the relevant person's schedule and ability to respond.

Innovations contained herein also include processes for managing user integrity in data entry; by cross-referencing machine data and other data external to the software system with user-entered data in order to identify factual discrepancies that can be classified as "Integrity events;" to provide managers with insight about events about which salespeople may be unintentionally misleading themselves or intentionally misleading the manager or company.

Innovations herein also include processes for providing automated warnings (such as those customizable by managers) to system users and an escalation process to a manager (via email, SMS or rolling data feed) based on customizable thresholds—as well as a resolution process for dealing with missing data (e.g. adoption issues) and data discrepancies (e.g. integrity issues). Present innovations may also include historical reports and/or the ability to define policy profiles and apply different policy profiles to different employees and different classes of sales opportunities and/or be configured for exception handling, such as handling discrepancies between objective data and user-reported data are disregarded if they fail to meet a customizable discrepancy threshold. Here, for example, a discrepancy of less than X minutes on the reported duration of a meeting or a call may be disregarded.

The innovations contained herein also include methods for the facilitation of user adoption of software systems—including (i) recognizing the occurrence of relevant events and providing employees with automated reminders to manually enter the appropriate data into the software system; and/or (ii) by reducing time commitment ordinarily associated with SFA data entries by auto-populating fields in the user interface with data obtained from alternate sources.

The innovations contained herein also include productivity and time-allocation tracking and analysis by through the use of machine data and other data sources. Managers and salespeople themselves can view their own productivity reports to gain insight on their time allocation via a variety of factors, as set forth in more detail below.

The innovations contained herein also include a new and differentiated approach to sales pipeline forecasting that applies "data pattern matching and modeling" analysis to sales opportunities in a sales pipeline: to identify those opportunities who's external data attributes seem to correlate to failure rather than success. For example, pipeline items will be flagged for managers if the opportunity has had fewer external data 'events' (phone calls, email exchanges, site visits, etc.) of sufficient duration than the data model suggests is correlative with a successful sales outcome, taking variables such as seasonality into account. This data model is dynamically updated as new sales take place. As a result, the analysis becomes more accurate the longer the solution is in place. This analysis is run using objective data sources (the aggregated personal data streams described above) filtered to provide data about specific sales opportunities—without the context of employee opinions (as reflected in their data entries) and without reference to their self-report characterizations of the relevant events. This modeling component provide for correlation analysis of employee projections with dynamically updated, data-driven success models—in order to assist managers to more accurately assess pipeline quality, better forecast sales revenue and offer direction for employee training and mentoring.

The innovations contained herein and their pattern-based methodologies go beyond simple business intelligence derived from user inputs; to analyze a diverse range of technologies across a diverse set of disciplines and join together a variety of complex new and existing data streams into a single framework for technology adoption analytics, factual integrity analytics and data quality enforcement, sales process and sales productivity management analytics (which includes sales territory management analytics) and sales forecast opportunity analysis.

Today, many "data processing events" are either undetected or remain unused and therefore unavailable to the legacy systems that could benefit from the data and insight they can bring. These events can be detected, captured, represented electronically and housed in a database—but the true challenge for innovators in the area of event processing is to make good use of this data. That is the challenge that drives the innovations contained herein, where both new and existing "event data streams" are aggregated, cross-referenced, correlated and synthesized within to provide meaningful business insight that can empower better business decision-making, improve the performance of existing software investments (such as SFA's) and positively impact on business outcomes, revenue and the ability to process and understand the consequences of business activities as they happen.

FIG. 1A is a diagram of an illustrative web or network-based implementations consistent with certain aspects related to the innovations herein. While the description of FIG. 1A shows various elements, the components of the system can be implemented through any suitable unitary or distributed combination of hardware, software and/or firmware. Referring to FIG. 1A, the illustrated system may include at least one Sales Force Processing ("SFP") server and/or component 160, users at access devices 121 (e.g., one or more of access devices 121A-121D), one or more connectivity components 125A/125B, as well as possibly other unitary, connected, interconnected or distributed processing entities or components such as network management components, a first sales force automation ("SFA") server/component 130, a second SFA server/component 140, a third (or more) SFA server/component 150, other third party servers or components 155, and/or additional providers 180 such as information providers, all connected over a network 170 such as a Wide Area Network, a Local Area Network, or a combination including the Internet. The Sales Force Processing server/component 160 may, in some implementations, include one or more management components 170, such as optionally an adoption management component 172, an integrity management component 174 and/or a productivity management component 176. Further, the Sales Force Processing server/component 160 may, in some implementations, be the web-based platform for handling and/or performing processing regarding various sales force management features, functionality and/or innovations herein.

Implementations herein may include various management components 170 that perform methods for managing complete and accurate data for business analysis. Such implementations may accomplish this via adoption management, integrity management and productivity management. Further implementations may be aided by data quality and process enforcement as well as facilitation of machine data. User adoption systems may be configured with features that recognize the occurrence of relevant events and providing employees with automated reminders to manually enter the appropriate data into the software system; and by reducing time commitment ordinarily associated with Sales Force Automation "SFA" data entries by auto-populating fields in the user interface with data obtained from alternate sources.

Systems and methods herein may include or involve a variety of processing components and mechanisms for performing the innovations here, such as:

Data Stream Aggregation Mechanisms: Aggregation processes run continuously across diverse devices and networks and comprise applicable data regarding all forms of network, voice and electronic data communications together with geo-location data and electronic records (such as electronic calendar data, etc.), and such records include but not limited to origination, destination/termination, user and duration attributes.

Classification Mechanisms: classification interface(s) and processes are provided that displays each user's relevant raw data as unclassified events and provides a means of classifying those events with a series of default or custom classifications based on the type of work performed if the event is work-related or, alternatively, with a series of default or custom classifications if the event is not work-related.

Facilitation Mechanisms: The innovations contained herein also include methods for the facilitation of user adoption of software systems—including (i) recognizing the occurrence of relevant events and providing employees with automated reminders to manually enter the appropriate follow-on data into the software system; and (ii) by reducing time commitment ordinarily associated with user interface data entries by auto-populating fields in the user interface with data obtained from alternate sources.

Enforcement Mechanisms: The manager sets duration interval thresholds that define how long a raw data event can remain unprocessed/pending ("pending classification") before automated, customizable reminders are sent out ("user adoption enforcement"); and configures the escalation process so that a notification is sent to or displayed for the manager when the reminders have not led the user to classify the data on time and also provides access to historical reports and the ability to define policy profiles and apply different policy profiles to different employees and different classes of sales opportunities and administrative tasks.

Integrity Incident Identification Mechanisms: The innovations contained herein also include processes for managing user integrity in data entry; by cross-referencing data obtained in the data aggregation process with user-entered data in order to identify factual discrepancies that can be classified as "Integrity incidents"—incidents which may be escalated or disregarded depending on whether they meet a customizable discrepancy threshold (for example, a manager may specify that a discrepancy of less than X % on the reported duration of an event such as a live meeting should be disregarded, whereas a discrepancy of greater than X % should be escalated).

Dispute Resolution Mechanisms: A dispute resolution and retroactive exception approval process begins when the time-limit threshold has been triggered and the manager has been alerted that a user has failed to classify an unprocessed/pending event within the specified time interval or when an integrity incident has been flagged by the system and reported to the manager; at which time the user is provided the opportunity to append an explanation to the notification in order to advise their manager(s) of extenuating circumstances so that the manager can opt to treat the event as 'compliant' for reporting purposes—or not (this 'adjusted data' can be used for reporting as a supplement/replacement for the purely factual data depending on the context in which the data is being used and whether that context needs to incorporate extenuating circumstances).

Notification Management Mechanisms—The innovations contained herein also include configuration mechanisms to limit volume of notifications to a manageable volume and to suite the particular management style of the individual manager; wherein a manager can limit user adoption enforcement and integrity incident notifications with configuration that alters what is escalated based on variables that include but are not limited to named employee, named prospect/customer, event type, size of current opportunity, dollar value of potential follow-on opportunities, size of prospect/repeat customer, dollar value of historical business customer has done with company to date, or by a variation threshold percentage (for example, do not report if discrepancy in data entry about an event's duration is less than X minutes)

Privacy Management Mechanisms: Various privacy management mechanisms may be provided. For example, users can turn off "location services" on their mobile devices to disable geo-location tracking, which will be characterized as an integrity incident if such disablement takes place during work hours that has not been designated as a personal day or approved block of personal time or time in an environment where signal access is unavailable; with the result that a notification in such circumstances will be sent to the manager after a pre-set time-interval threshold (which will specify how long an integrity incident must last before it is reported in order to avoid creating events for time spent in parking garages, elevators, tunnels and other environments without signal access).

Time Allocation and Productivity Analysis Mechanisms: The innovations contained herein also include productivity and time-allocation tracking, analysis and data modeling mechanisms for the purpose of self-assessment, comparative assessment, manager employee assessment, mentoring and territory analysis (by providing managers with data and analysis to distinguish between both 'order takers' who make little effort to obtain new business yet still make quota in territories that should be split and salespeople who intentionally slow down their sales activities to push out sales opportunities to stay below their sales quota in order to avoid a territory split—and salespeople who make heroic efforts to meet their sales quota in territories that should logically not be split); with such productivity and time allocation mechanisms leveraging and relying on the data stream aggregation mechanisms described in step 1 in order to (i) enable managers, teams and individual users to view their own productivity reports and analyze their time allocation by activity type, account value, qualified versus unqualified leads, sales funnel stage (including: prospecting, new opportunities, initial communications, fact finding, solution development, solution proposal, solution evaluation, negotiation, purchase order, etc.), time allocation on sales versus non sales (internal) activities, as well as the speed and quality of their follow-up—to both challenge their subjective perceptions, self-assess their efforts, mentor others and gain insight on what adjustments can be made to improve performance (to this end, salespeople will have the opportunity to contrast and compare their time allocation to that of another salesperson and/or a composite of the top X % of salespeople and/or to the team in general).

Forecast Analysis Mechanisms: The innovations contained herein also include a dynamically-updated data pattern matching and modeling analysis that relies on the aggregated personal data streams described above (filtered to provide data about specific sales opportunities) which correlates the spectrum of historical aggregated data stream events to historically successful sales outcomes (factoring in business seasonality) in order to identify those current opportunities in the sales pipeline whose external data attributes appear to correlate more to failure than success—with a data model that is dynamically updated as new sales take place so that the analysis becomes more accurate the longer the solution is in place.

Implementations herein also include productivity and time-allocation tracking and analysis by through the use of machine data and other data sources. Such implementations may include integrity and productivity management features. Managers and salespeople themselves can view their own productivity reports to gain insight on their time allocation by activity type (including time spent on internal and external activities as well as business related and non-business related activities, including personal calls), total account or individual sale value, qualified versus unqualified leads, sales funnel stage (including: prospecting, new opportunities, initial communications, fact finding, solution development, solution proposal, solution evaluation, negotiation, purchase order, etc.), time allocation on sales versus non sales (internal) activities, as well as the speed and quality of their follow-up. Allowing employees to see this productivity-related information allows them to both challenge their subjective perceptions to self-assess their efforts and gain insight on what adjustments can be made to improve performance. To this end, salespeople will have the opportunity to contrast and compare their time allocation to that of another salesperson and/or a composite of the top X % of salespeople and/or to the team in general. Over time, productivity modeling enables team members to process how changes in their own productive behaviors can impact on their sales performance. For the manager, productivity becomes a dashboard metric with associated alarms and configurable reports. The modeling component provides managers with valuable insights on where productive efforts should be focused in the context of specific product lines while also providing the business insight required for mentoring and assessing sales staff. Historical productivity data is also used for productivity data pattern-matching and modeling to create time allocation/optimization success models. Productivity analysis also provides insight for sales territory management by enabling managers to distinguish between 'order takers' who make little effort to obtain new business and salespeople who make heroic efforts to meet their sales quota. This distinction provides meaningful insight on when sales territories should be split and arguably provides a superior metric to the most common practice of splitting sales territories when they reach sales quota targets.

Figure 1B:
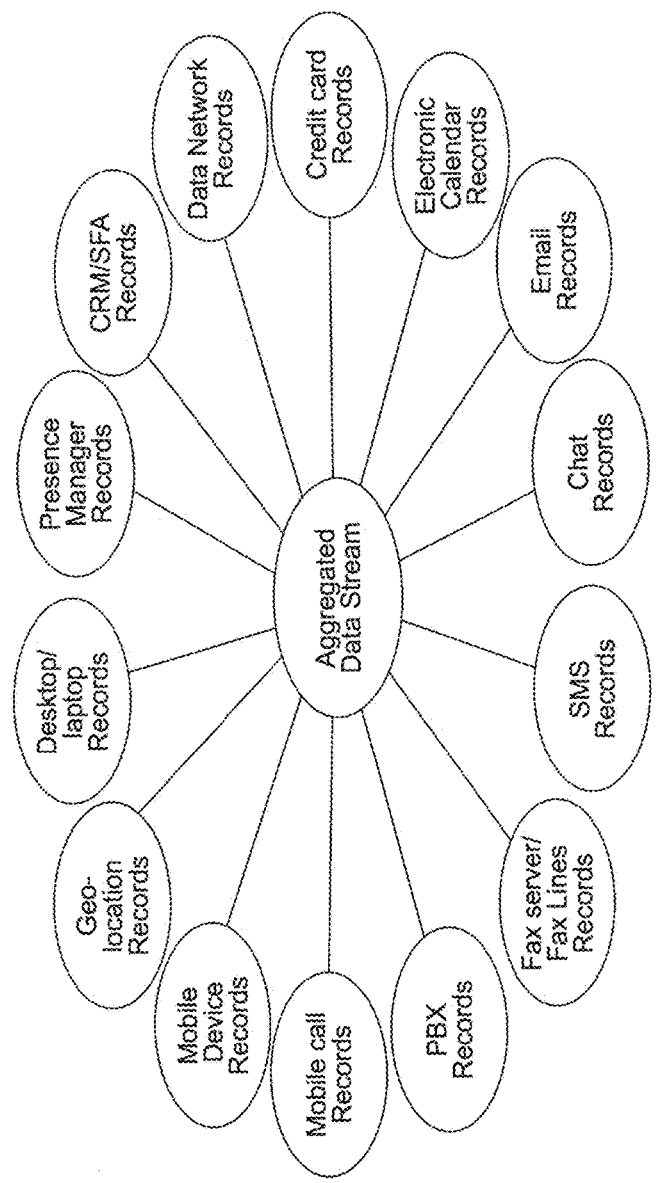
FIG. 1B is a diagram of an data aggregation implementations consistent with certain aspects related to the innovations herein.

FIG. 1B is a block diagram of the aggregated data stream 195 that aggregates data of a user/employee from a plurality of remote data streams, e.g., over various wireless and wired communication networks. The data streams may include desktop/laptop records, presence manager records, CRM/SFA records, data network records, credit card records, electronic calendar records, email records, chat records, SMS records, fax server and fax line records, PBX records, mobile call records, mobile device records, geo-location records and other records. The data from the aggregate data stream may be stored in a server, database, etc.

Figure 2A:
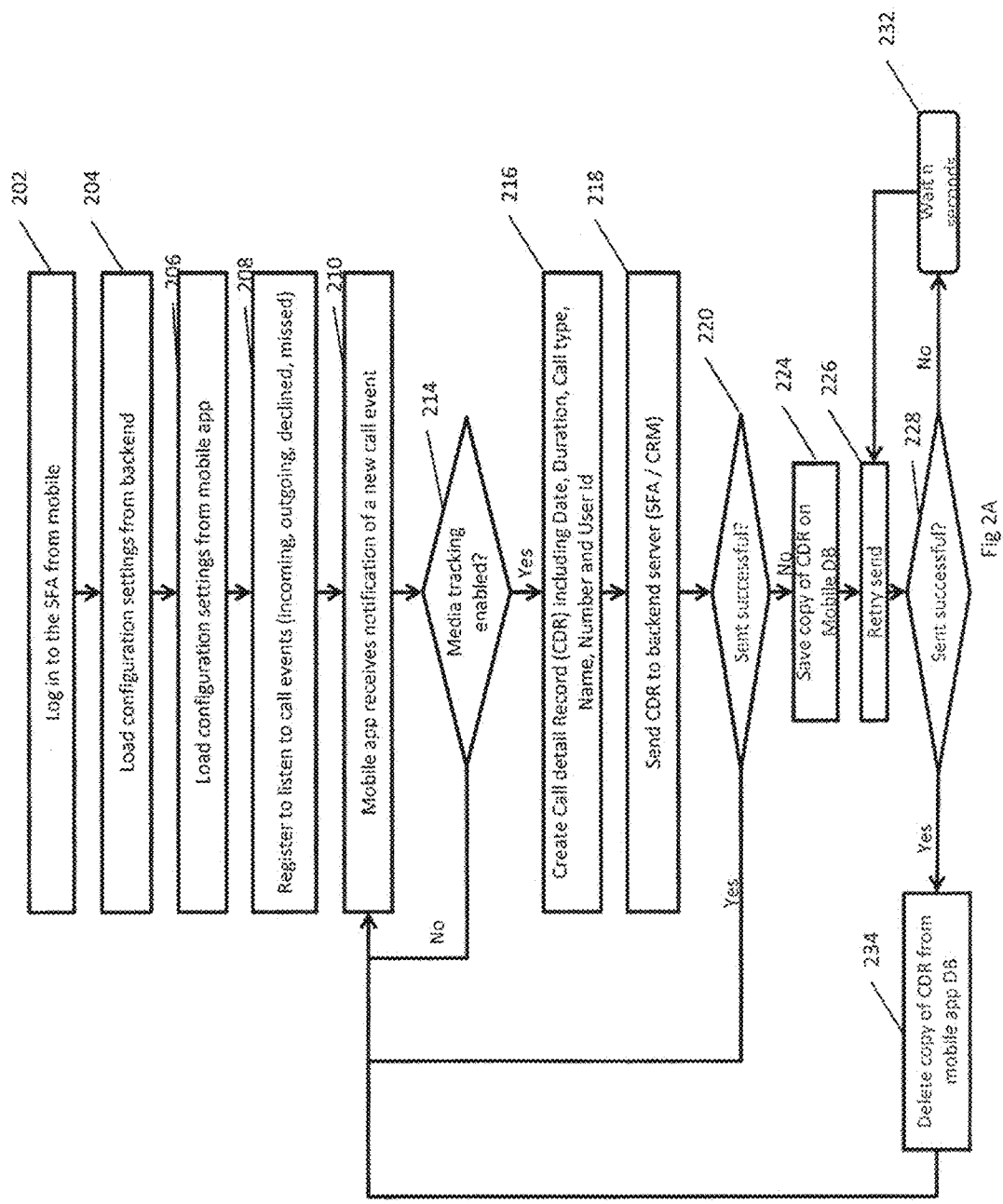
FIGS. 2A-2B are flowcharts of illustrative mobile phone capture processing consistent with certain aspects related to the innovations herein.
Figure 2B:
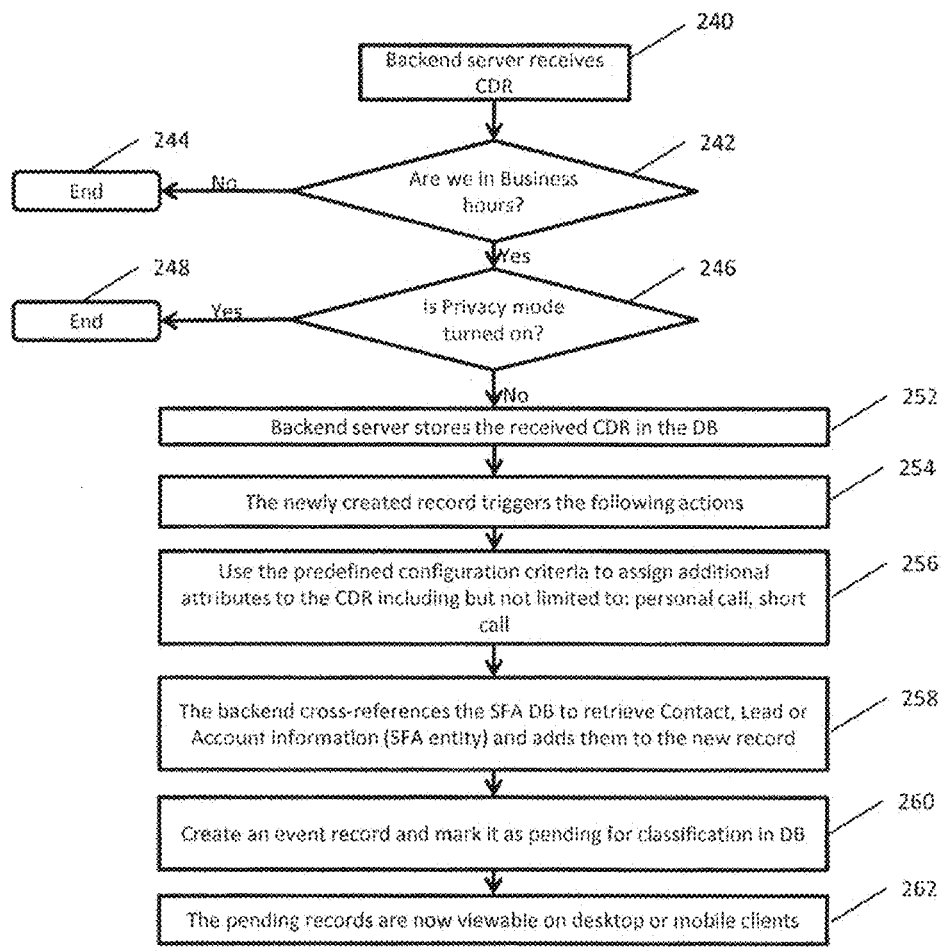

FIGS. 2A-2B are flowcharts of illustrative mobile phone capture processing consistent with certain aspects related to the innovations herein. Referring to FIG. 2A, an illustrative process of capturing a mobile phone call and/or SMS is shown. In a few optional initial steps, a salesperson may log into the Sales Force Automation SFA server from a mobile device, at 202, and/or configuration settings may be loaded from the backend, at 204. Configuration settings may then be loaded from a mobile application ("app"), at 206. The app may then be registered, at 208, to listen to call events such as incoming calls, outgoing calls, declined calls, missed calls, incoming SMS, outgoing SMS, etc. At 210, the mobile app receives notification of a new call event 210, at which point media tracking may then be enabled or not enabled, at 214. If media tracking is not enabled, the process returns to 210 to await receipt of another notification of a new call event. If, at 214, media tracking is enabled, the process then creates a call detail record (CDR), at 216, which may include data such as date, call type, name, number and/or user ID. Next, the call detail record is sent to the backend server, at 218, e.g., to a SFA server, a CRM server, or the like.

According to various implementations herein, call event notifications may be received in real-time from the underlying mobile OS or the native call application of the device. Call event notifications may also be received from third party application(s) installed in the mobile phone (Lync, Skype, Line2, etc.). Moreover, implementations may also be configured such that the Call Log may be downloaded from the mobile to the desktop and processed as a batch file. Here, for example, iTunes may be used to download the call logs to a desktop. Then, the same process described above might be applied to create all the CDR and send them to the backend server to be processed.

Further, in some embodiments, a verification step may then be performed to confirm that the call detail record was sent successfully 220. If so, the process may again return to 210 to await receipt of another notification of a new call event. If the send is not successful, a copy of the call detail record is saved in connection with the mobile device, at 224, such as in the mobile device app database. Then, a routine attempting to again send the call detail record, or wait and re-send it, is performed, at 226, 228 and 232. Once the re-send is successful, the process proceeds to a step of deleting the copy of the CDR from the mobile app database, at 234, and again returning to 210 to await receipt of another notification of a new call event. The verification step described above might be performed either synchronously or asynchronously.

Referring to FIG. 2B, an illustrative process of data treatment and storage into the database by the backend is shown. The backend receives the CDR sent by the mobile app (cf. FIG. 2A), at 232. At which point, the backend verifies that the date and time of the CDR are within business hours, at 242. If not, the CDR will not be processed, at 244. If within business hours, then the process verifies that the Privacy mode is not enabled, at 246. If enabled, the CDR will not be processed, at 248. If not enabled, the process stores the CDR in a preliminary database table, at 252, at which point a trigger is sent indicating a new record has been added and ready for processing, at 254. Additional attributes are assigned to the record if certain predefined criteria are met, at 256. A partial list of these attributes can include: Short call, Personal call, internal call, etc. The process cross-references the SFA database to retrieve any existing SFA entity records that might be associated with the CDR, such as Contact, Account, Lead and Opportunity, and adds the results to the record, at 258. The record is now ready to be added to the database table of processed records and marked as Pending, at 260. The record is now viewable on the desktop application as well as the mobile application, 262.

Figure 3A:
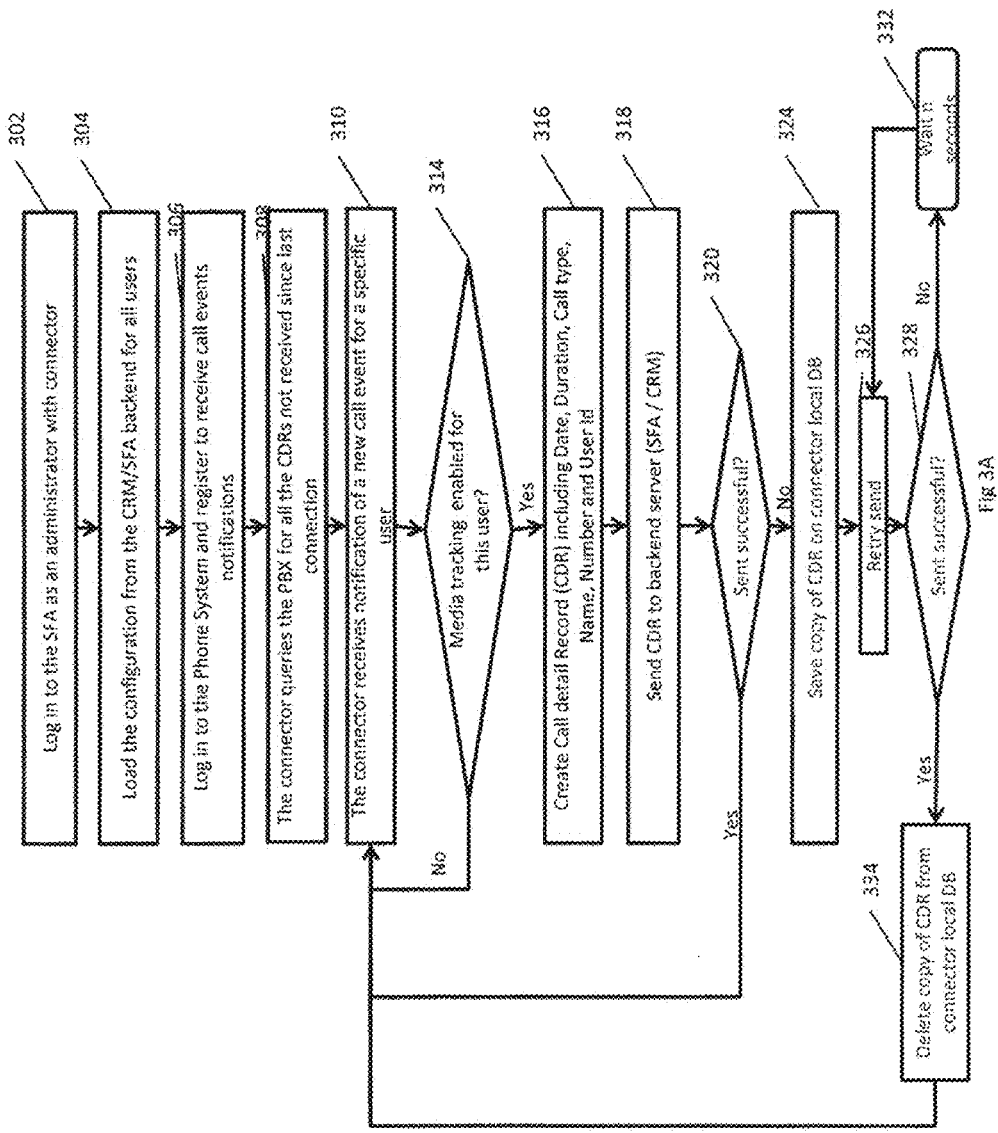
FIGS. 3A-3B are flowcharts of illustrative PBX phone call capture processing consistent with certain aspects related to the innovations herein.
Figure 3B:
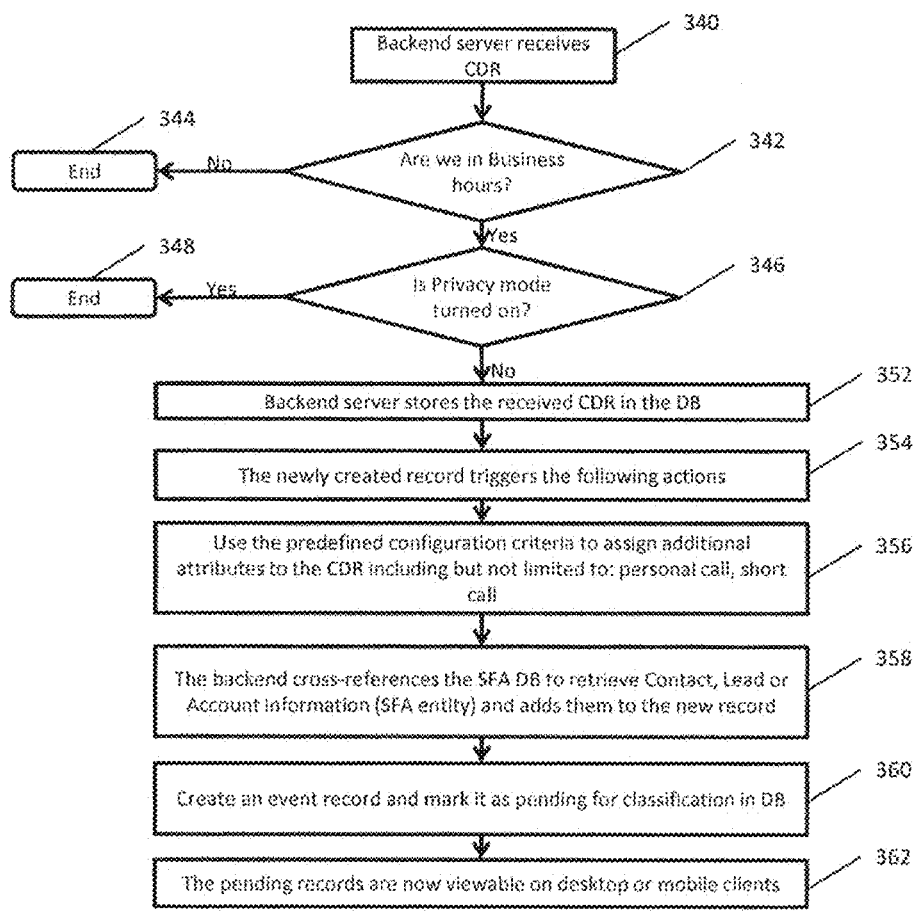

FIGS. 3A-3B are flowcharts of illustrative PBX phone call capture processing consistent with certain aspects related to the innovations herein. Referring to FIG. 3A, an illustrative process of capturing phone call data from phone systems is shown. In a few optional initial steps, a phone system connector may log into the Sales Force Automation SFA server as an administrator, at 302, and/or configuration settings may be loaded from the backend, at 304. The phone system connector is configured to log into the phone system and register to listen to call events such as incoming calls, outgoing calls, declined calls, missed calls, etc., at 306. The phone system connector can launch a query to the phone system to retrieve all the Call Detail Records not received since last connection, at 308. The retrieved CDRs can be added to the queue of new call events to be processed. The phone system connector can receive notification of a new call event for a specific user, at 310, at which point the phone system connector can verify if the media tracking is enabled or not enabled, at 314. If media tracking is not enabled, the process may return to 310 to await receipt of another notification of a new call event. If, at 314, media tracking is enabled, the process can then create a call detail record (CDR), at 316, which may include data such as date, call type, name, number and/or user ID. Next, the call detail record is sent to the backend server, at 318, e.g., to a SFA server, a CRM server, or the like.

According to various implementations herein, the process described may apply to any local phone call system (a short list of these includes Traditional PBX, virtual PBX, Key system, Call managers, Presence managers, Softswitch). Further, in some embodiments, a verification step may then be performed to confirm that the call detail record was sent successfully 320. If so, the process may again return to 310 to await receipt of another notification of a new call event. If the send is not successful, a copy of the call detail record may be saved in connection with the phone system, at 324, such as in the phone system connector local database. Then, a routine attempting to again send the call detail record, or wait and re-send it, may be performed, at 326, 328 and 332. If the re-send is successful, the process can proceed to a step of deleting the copy of the CDR from the phone system connector database, at 334, and again returning to 310 to await receipt of another notification of a new call event. The verification step described above might be performed either synchronously or asynchronously.

Referring to FIG. 3B, an illustrative process of data treatment and storage into the database by the backend is shown. The backend can receive the CDR sent by the phone system connector (cf. FIG. 3A), at 340. At which point, the backend may verify that the date and time of the CDR are within business hours, at 342. If not, the CDR will not be processed, at 344. If within business hours, then the process can verify that the Privacy mode is not enabled, at 346. If enabled, the CDR will not be processed, at 348. If not enabled, the process can store the CDR in a preliminary database table, at 352, at which point a trigger may be sent indicating a new record has been added and ready for processing, at 354. Additional attributes can be assigned to the record if certain predefined criteria are met, at 356. A partial list of these attributes includes, but is not limited to: Short call, Personal call, internal call, etc. The process can cross-reference the SFA database to retrieve any existing SFA entity records that might be associated with the CDR such as Contact, Account, Lead and Opportunity, and can add the results to the record, at 358. The record is now ready to be added to the Recorded Events database marked as Pending, at 360. The record is now viewable on the desktop application as well as the mobile application, 362.

Figure 4A:
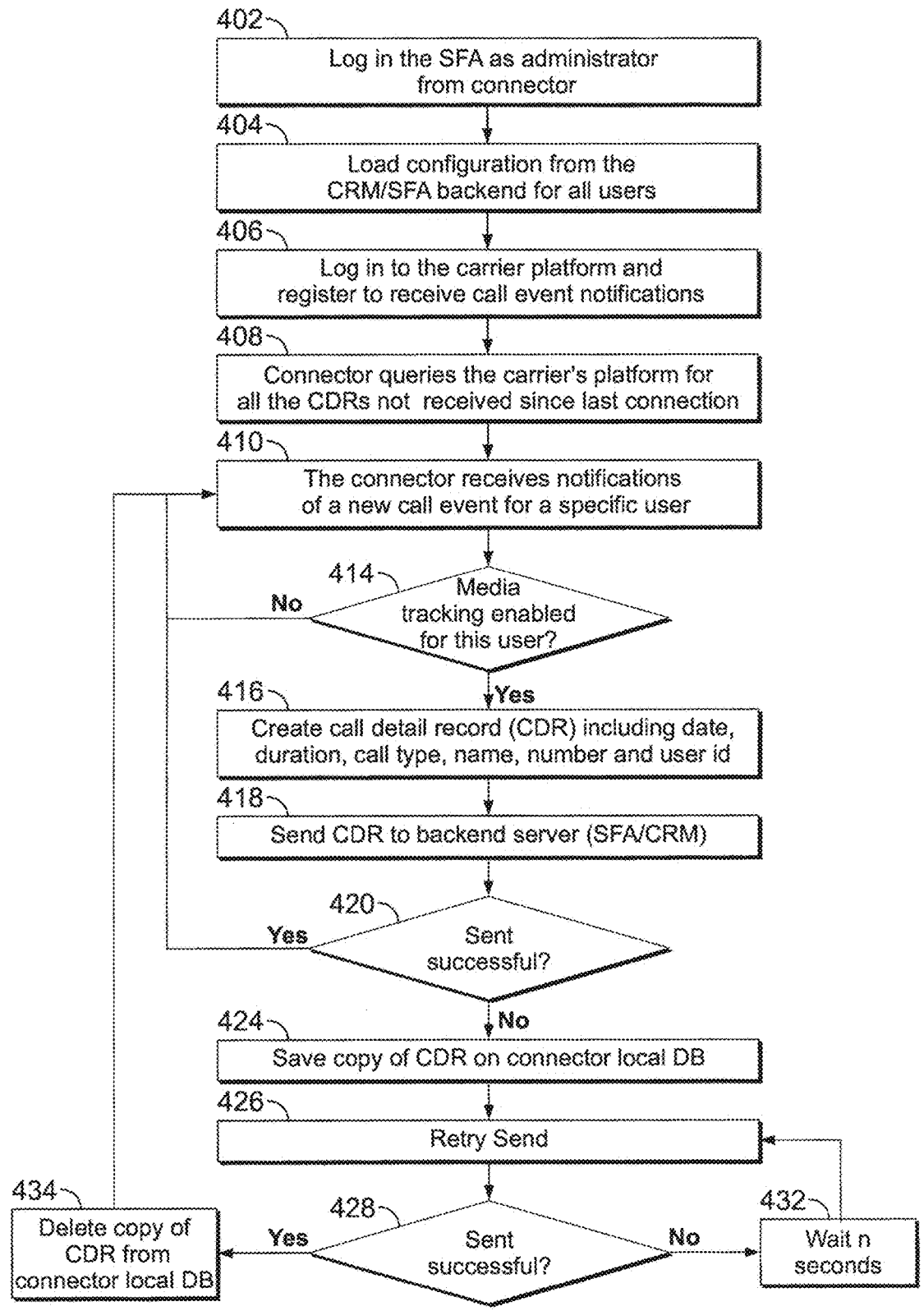
FIGS. 4A-4B are flowcharts of illustrative phone call and SMS capture processing from carriers consistent with certain aspects related to the innovations herein.
Figure 4B:
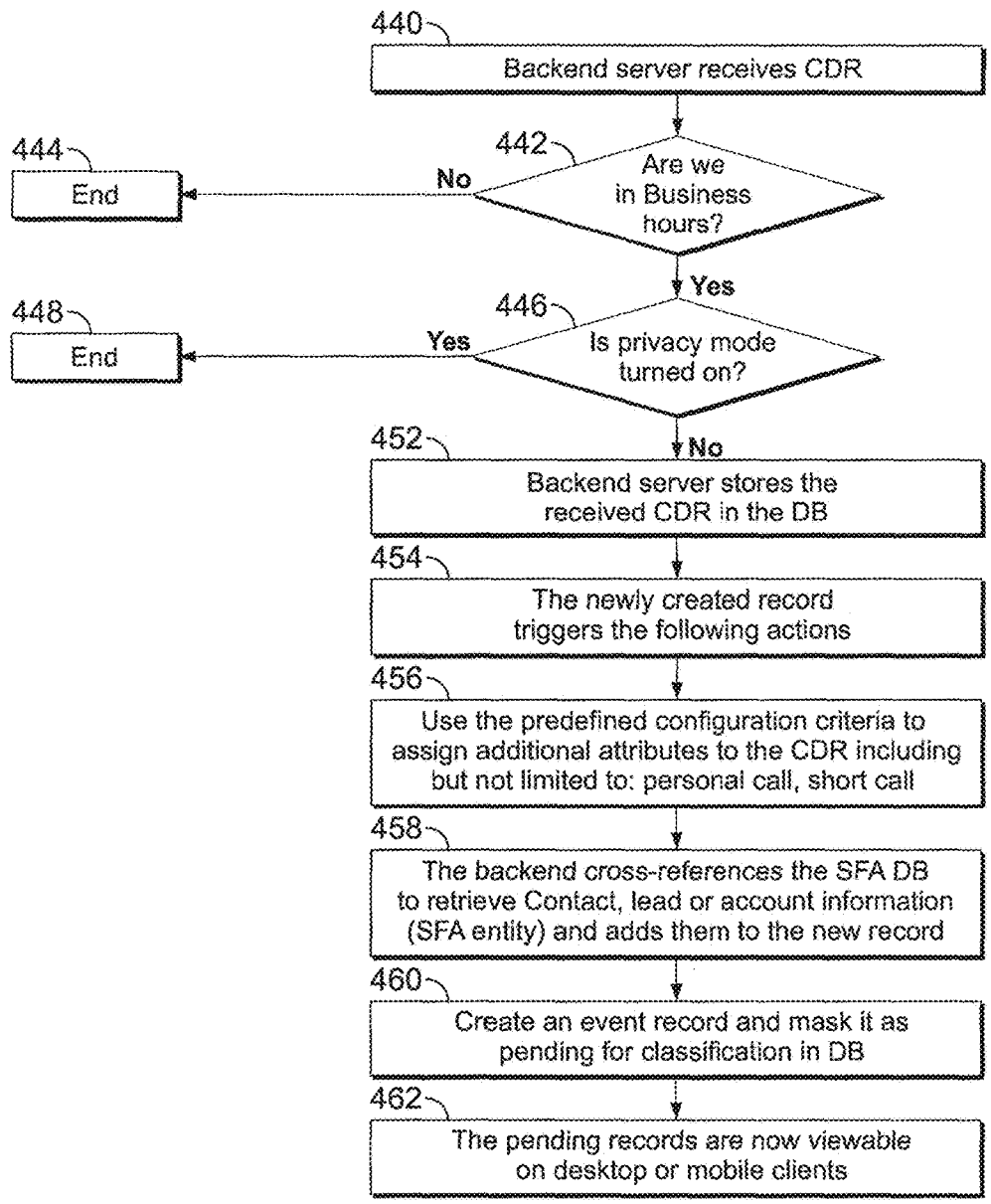

FIGS. 4A-4B are flowcharts of illustrative phone call and SMS capture processing from phone carriers consistent with certain aspects related to the innovations herein. Referring to FIG. 4A, an illustrative process of capturing phone call data from wireline, mobile and packet switched (VoIP) telephone carriers (Carrier) is shown. In a few optional initial steps, a phone system connector may log into the Sales Force Automation SFA server as an administrator, at 402, and/or configuration settings for all users may be loaded from the backend, at 404. The phone system connector can log into the Carrier's platform and register to receive call event notifications such as incoming calls, outgoing calls, declined calls, missed calls, incoming SMS, outgoing SMS, etc., at 406. The phone system connector can launch a query to the Carrier platform to retrieve all the Call Detail Records not received since last connection, at 408. The retrieved CDRs may be added to the queue of new call events to be processed. The phone system connector can receive notification of a new call event for a specific user, at 410, at which point the phone system connector can verify if the media tracking is enabled or not enabled, at 414. If media tracking is not enabled, the process returns to 410 to await receipt of another notification of a new call event. If, at 414, media tracking is enabled, the process can then create a call detail record (CDR), at 416, which may include data such as date, call type, name, number and/or user ID. Next, the call detail record may be sent to the backend server, at 418, e.g., to a SFA server, a CRM server, or the like.

According to various implementations herein, data provided from the carrier may cover, for example, mobile phone calls, SMS and landline calls, among others.

Further, in some embodiments, a verification step may then be performed to confirm that the call detail record was sent successfully 420. If so, the process may again return to 410 to await receipt of another notification of a new call event. If the send is not successful, a copy of the call detail record is saved in connection with the phone system, at 424, such as in the local phone system connector database. Then, a routine attempting to again send the call detail record, or wait and re-send it, is performed, at 426, 428 and 432. If the re-send is successful, the process proceeds to a step of deleting the copy of the CDR from the phone system connector database, at 434, and again returning to 410 to await receipt of another notification of a new call event.

Referring to FIG. 4B, an illustrative process of data treatment and storage into the database by the backend is shown. The backend can receive the CDR sent by the phone system connector (cf. FIG. 4A), at 440. At which point, the backend can verify that the date and time of the CDR are within business hours, at 442. If not, the CDR will not be processed, at 444. If within business hours, then the process verifies that the Privacy mode is not enabled, at 446. If enabled, the CDR will not be processed, at 448. If not enabled, the process stores the CDR in a preliminary database table, at 452, at which point a trigger may be sent indicating a new record has been added and ready for processing, at 454. Additional attributes are assigned to the record if certain predefined criteria are met, at 456. A partial list of these attributes may include but is not limited to: Short call, Personal call, internal call, etc. The process cross-references the SFA database to retrieve any existing SFA entity records such as Contact, Account, Lead and Opportunity, and adds the results to the record, at 458. The record is now ready to be added to the Recorded Events database marked as Pending, at 460. The record is now viewable on the desktop application as well as the mobile application, 462.

Figure 5A:
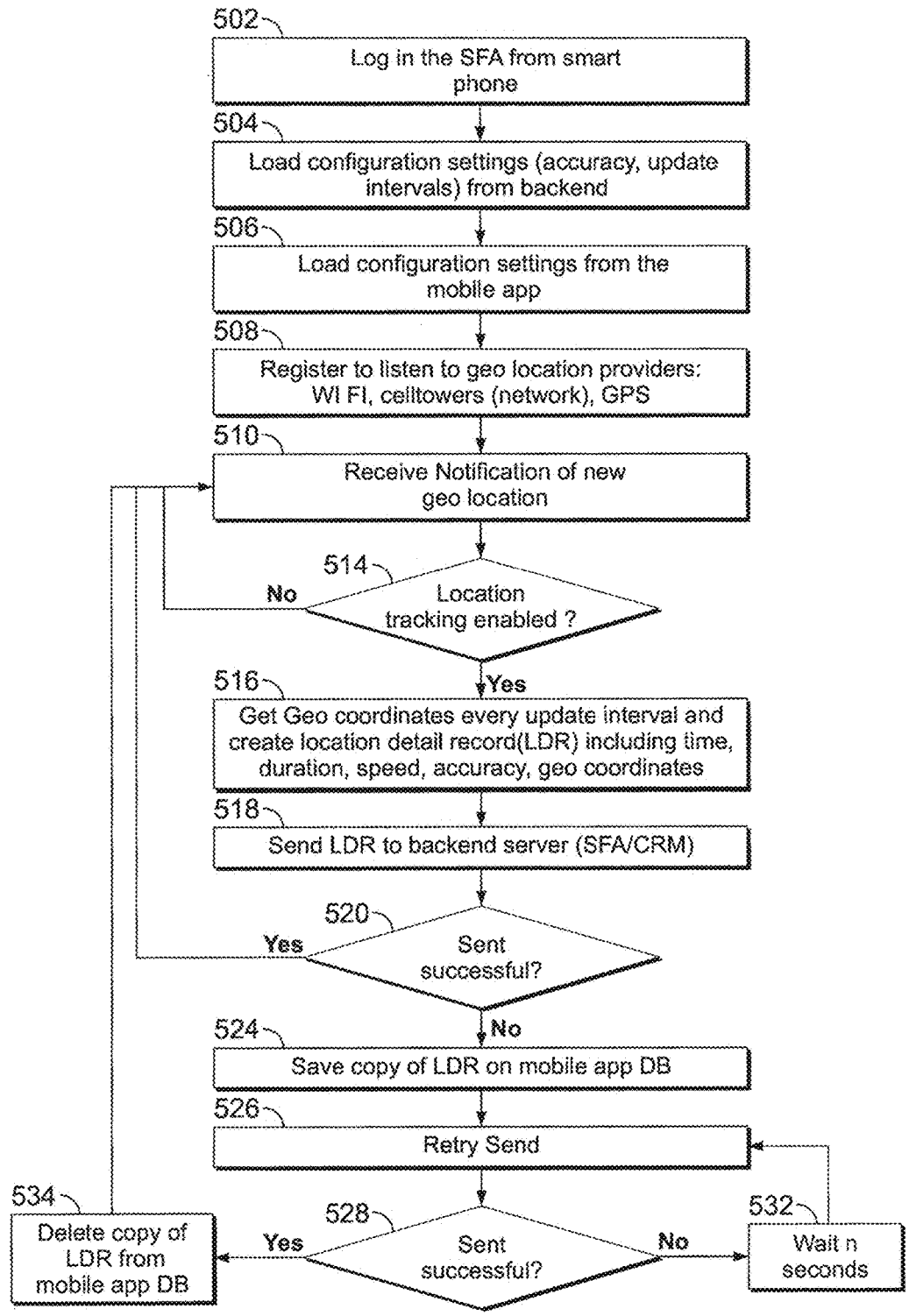
FIGS. 5A-5C are flowcharts of illustrative geo location capture processing from mobile devices consistent with certain aspects related to the innovations herein.
Figure 5B:
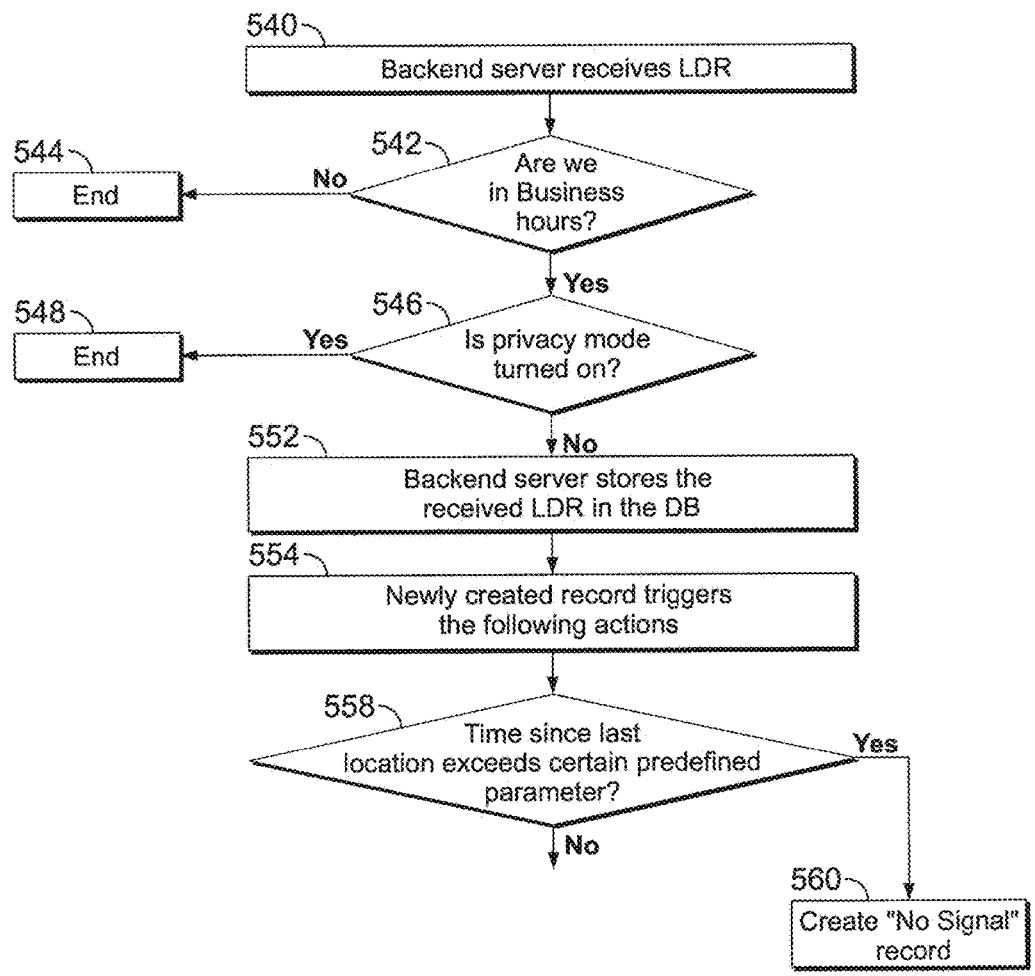
Figure 5C:
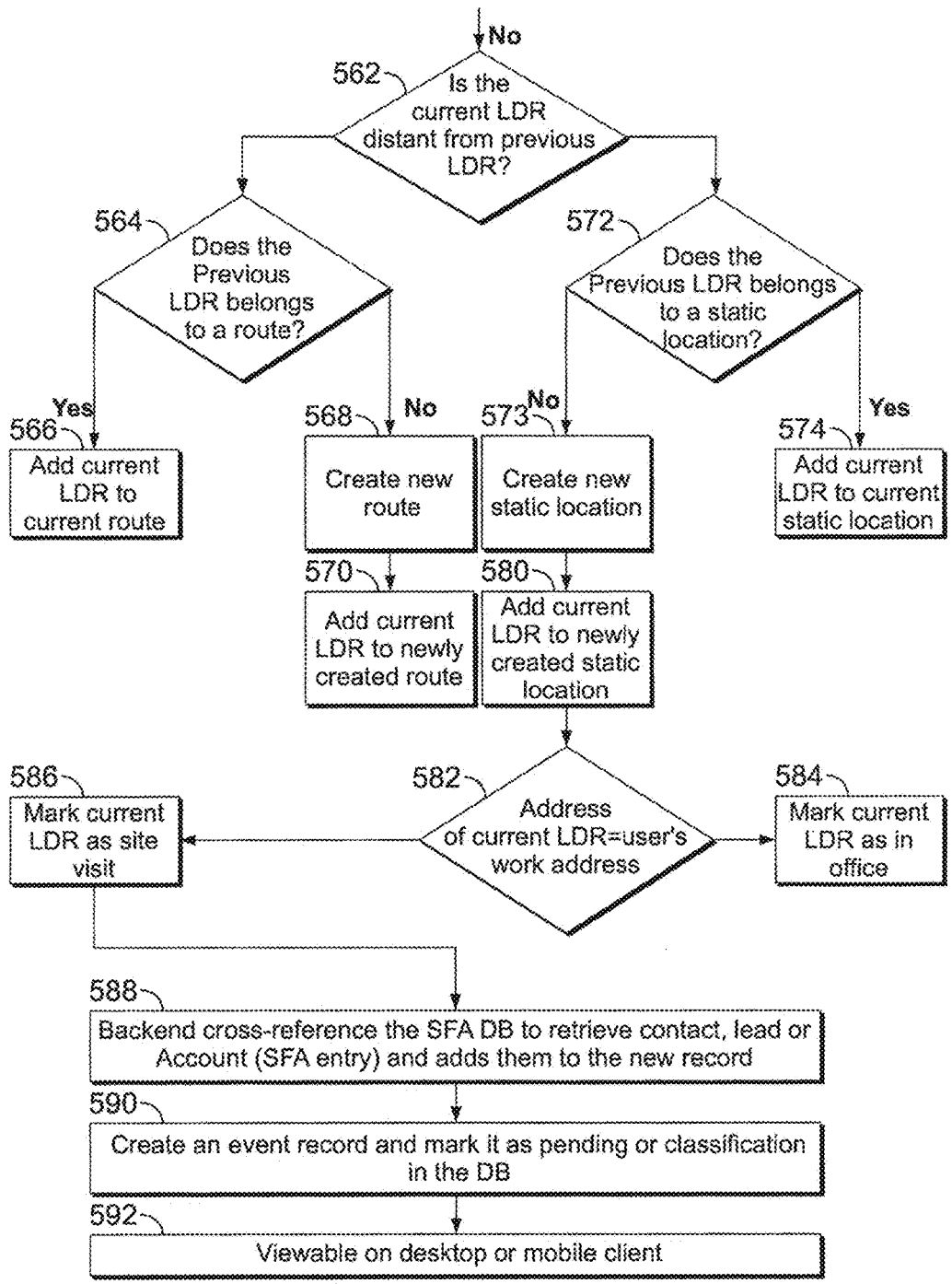

FIGS. 5A-5C are flowcharts of illustrative geo location capture processing from mobile devices consistent with certain aspects related to the innovations herein. Referring to FIG. 5A, an illustrative process of capturing geo location from smartphone devices is shown. In a few optional steps, the mobile app logs into the Sales Force Automation SFA server from a mobile device, at 502, and/or configuration settings may be loaded from the backend, at 504. Configuration settings may then be loaded from a mobile application ("app"), at 506. The app may then be registered, at 508, to listen to geo location providers such as, for example: Wi-Fi, Cell towers (network) and GPS satellites, among others. The mobile app receives, at 510, a new geo location notification, at which point the Location Tracking option may be enabled or not enabled, at 514. If Location Tracking is not enabled, the process returns to 510 to await receipt of another notification of a new geo location event. If, at 514, Location Tracking is enabled, the process then creates a Location Detail Record (LDR), at 516, which may include data such as date and time, duration, speed, accuracy, longitude, latitude and altitude. Next, the call detail record is sent to the backend server, at 518, e.g., to a SFA server, a CRM server, or the like.

Further, in some embodiments, a verification step may then be performed to confirm that the Location Detail Record was sent successfully 520. If so, the process may again return to 510 to await receipt of another notification of a new geo location event. If the send is not successful, a copy of the Location Detail Record may be saved in connection with the mobile device, at 524, such as in the mobile device app database. Then, a routine attempting to again send the call detail record, or wait and re-send it, may be performed, at 526, 528 and 532. If the re-send is successful, the process proceeds to a step of deleting the copy of the LDR from the mobile app database, at 534, and again returning to 510 to await receipt of another notification of a new call event. The verification step described above might be performed either synchronously or asynchronously.

Referring to FIGS. 5B and 5C, an illustrative process of data aggregation and storage into the database by the backend is shown. The backend receives the CDR sent by the mobile app (cf. FIG. 5A), at 540. At which point, the backend may verify that the date and time of the LDR are within business hours, at 542. If not, the LDR will not be processed, at 544. If within business hours, then the process may verify that the Privacy mode is not enabled, at 546. If enabled, the CDR will not be processed, at 548. If not enabled, the process may store the LDR in a preliminary database table, at 552, at which point a trigger may be sent indicating a new record has been added and ready for processing, at 554.

A process of geo location aggregation of the data received may be performed that can allow differentiating when the series of consecutive geo locations data received describes a Route or a Static Location. The process may verify, first, if the signal is arriving regularly by comparing the time elapsed since previous LDR with a predefined parameter, at 558. If the time elapsed exceeds that parameter, the process may create a No Signal record, at 560, containing the Date and Time and the duration of the no signal period. If the time elapsed is within the predefined parameter, then the process may use the Speed data information received and/or the distance between the current LDR and the previous LDR with a predefined parameter, factoring in the precision and accuracy of the received geo location data to determine if the user is moving or not from previous location, at 562. If he is moving, the process may check if it is a new route by checking if the previous LDR belongs already to a route, at 564. If so, the current LDR may be added to the existing route, at 566, if not, the process may create a new route, at 568 and add the current LDR to the newly created route, at 570. If test at 562 is negative (current LDR not distant from previous LDR), the process checks if the previous LDR was in a static location, at 572. If so, the process may add the current LDR to the existing Static Location, at 574, and if not, the system may create a new Static Location record, at 578, and add the current LDR to this existing Static Location, at 580.

After the geo location aggregation process, the process may compare the address of the current LDR to the user's work address, at 582, to determine whether the user is In Office or on Site Visit. If In Office, the current LDR may be marked "In Office", at 584. If in Site Visit, the current LDR may be marked as "Site Visit", at 588, the process then creates a new event record and marks it as Pending for classification in the database, at 590. The final Event Record is viewable from the desktop application as well as the mobile application.

Figure 6A:
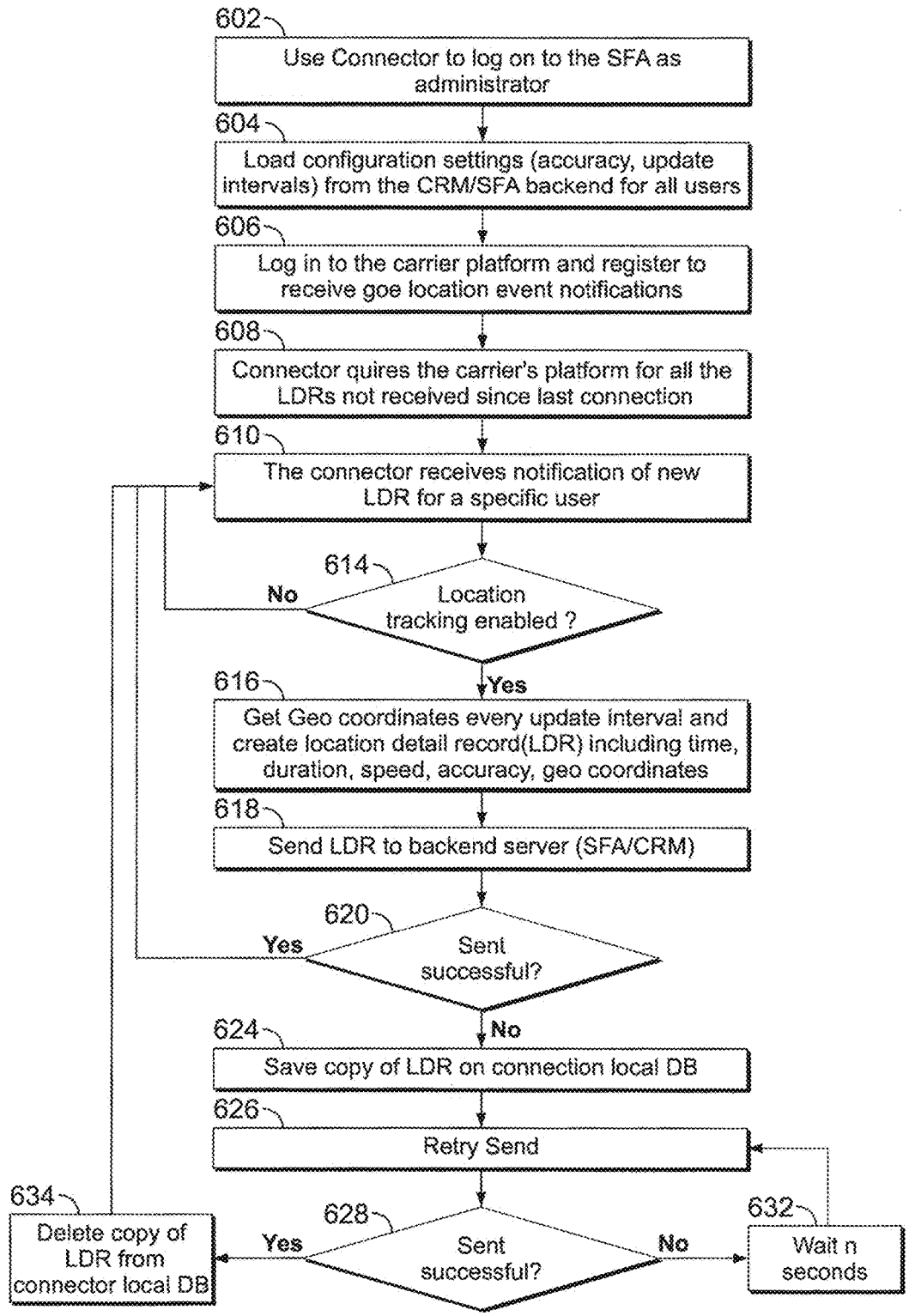
FIGS. 6A-6C are flowcharts of illustrative geo location capture processing from phone carriers consistent with certain aspects related to the innovations herein.
Figure 6B:
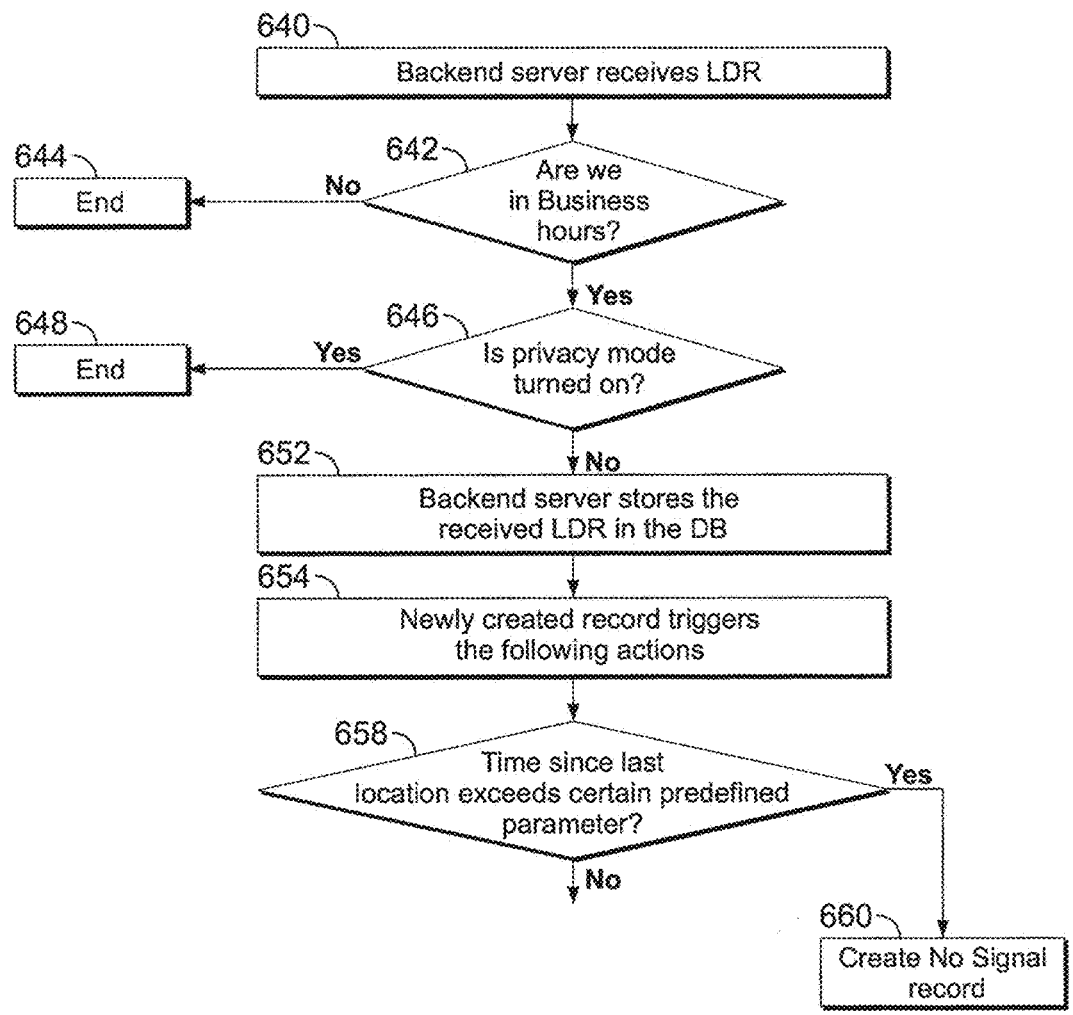
Figure 6C:
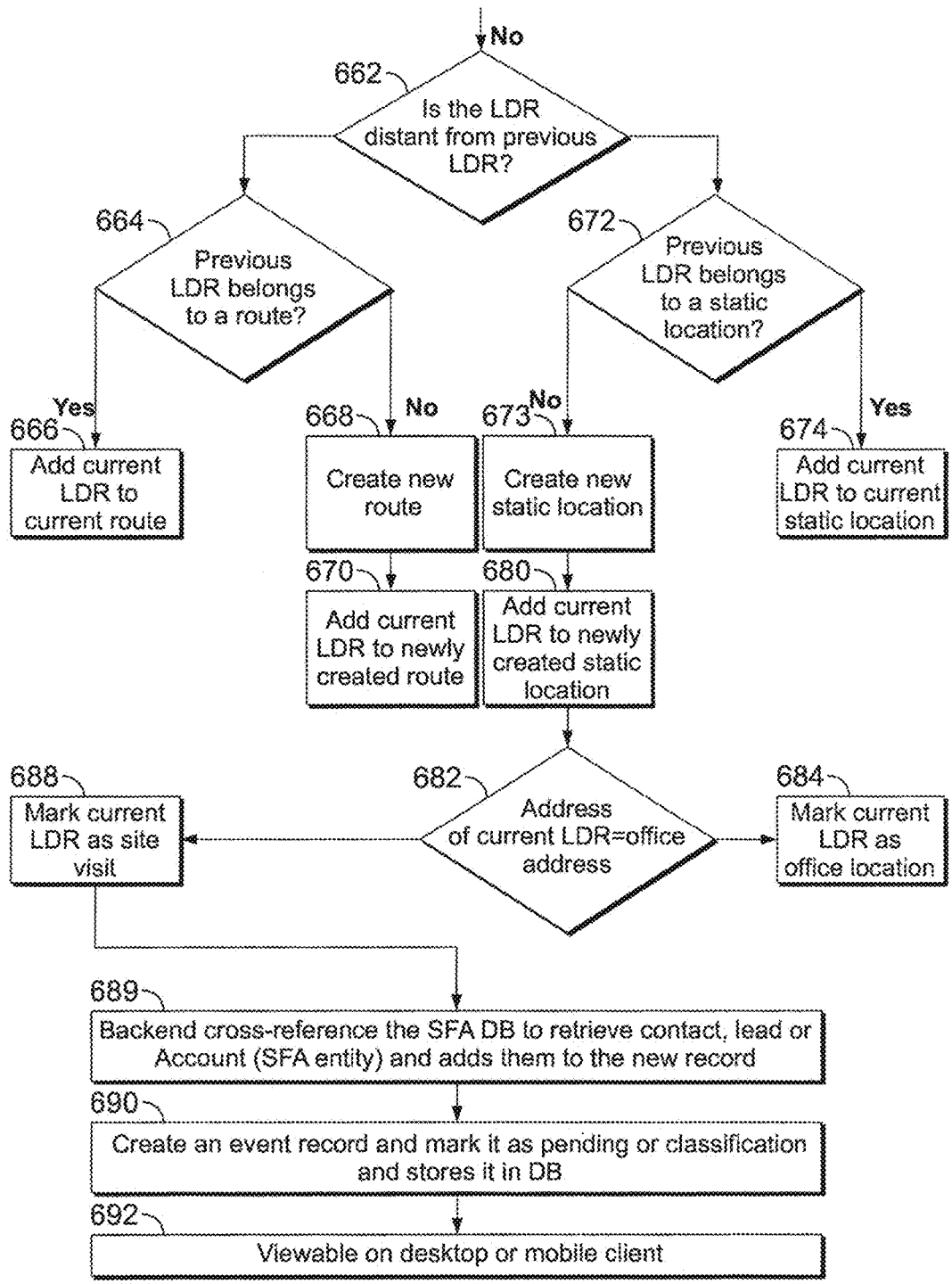

FIGS. 6A-6C are flowcharts of illustrative geo location capture processing from phone carriers consistent with certain aspects related to the innovations herein.

Referring to FIG. 6A, an illustrative process of capturing geo location from mobile telephone carriers (Carrier) is shown. In a few optional steps, the mobile app may log into the Sales Force Automation SFA server from a mobile device, at 602, and/or configuration settings may be loaded from the backend, at 604. The phone system connector may log into the Carrier's platform and registers to receive geo location event notifications, at 606. The connector may receive, at 610, a new geo location notification, at which point the Location Tracking option may be enabled or not enabled, at 614. If Location Tracking is not enabled, the process returns to 610 to await receipt of another notification of a new geo location event. If, at 614, Location Tracking is enabled, the process may then create a Location Detail Record (LDR), at 616, which includes data such as date and time, duration, speed, accuracy, longitude, latitude and altitude. Next, the call detail record may be sent to the backend server, at 618, e.g., to a SFA server, a CRM server, or the like.

Further, in some embodiments, a verification step may then be performed to confirm that the Location Detail Record was sent successfully 620. If so, the process may again return to 610 to await receipt of another notification of a new geo location event. If the send is not successful, a copy of the Location Detail Record may be saved in connection with the phone system connector, at 624, such as in the phone system connector local database. Then, a routine attempting to again send the call detail record, or wait and re-send it, may be performed, at 626, 628 and 632. Once the re-send is successful, the process may proceed to a step of deleting the copy of the LDR from the mobile app database, at 634, and again returning to 610 to await receipt of another notification of a new call event. The verification step described above might be performed either synchronously or asynchronously.

Referring to FIGS. 6B and 6C, an illustrative process of data aggregation and storage into the database by the backend is shown. The backend may receive the CDR sent by the mobile app (cf. FIG. 5A), at 640. At which point, the backend may verify that the date and time of the LDR are within business hours, at 642. If not, the LDR may not be processed, at 644. If within business hours, then the process may verify that the Privacy mode is not enabled, at 646. If enabled, the CDR may not be processed, at 648. If not enabled, the process stores the LDR in a preliminary database table, at 652, at which point a trigger may be sent indicating a new record has been added and ready for processing, at 654.

A process of geo location aggregation of the data received may be performed that allows differentiating when the series of consecutive geo locations data received describes a Route or a Static Location. The process may verify, first, if the signal is arriving regularly by comparing the time elapsed since previous LDR with a predefined parameter, at 658. If the time elapsed exceeds that parameter, the process may create a No Signal record, at 660, containing the Date and Time and the duration of the no signal period. If the time elapsed is within the predefined parameter, then the process may use the Speed data information received and/or the distance between the current LDR and the previous LDR with a predefined parameter, factoring in the precision and accuracy of the received geo location data to determine if the user is moving or not from previous location, at 662. If he is moving, the process may check if it is a new route by checking if the previous LDR belongs already to a route, at 664. If so, the current LDR may be added to the existing route, at 666, if not, the process may create a new route, at 668 and add the current LDR to the newly created route, at 670. If test at 662 is negative (current LDR not distant from previous LDR), the process checks if the previous LDR was in a static location, at 672. If so, the process adds the current LDR to the existing Static Location, at 674, and if not, the system may create a new Static Location record, at 678, and adds the current LDR to this existing Static Location, at 680.

After the geo location aggregation process, the process may compare the address of the current LDR to the user's work address, at 682, to determine whether the user is In Office or on Site Visit. If In Office, the current LDR may be marked "In Office", at 684. If in Site Visit, the current LDR may be marked as "Site Visit", at 688, the process may then create a new event record and marks it as Pending for classification in the database, at 690. The final Event Record may be viewable from the desktop application as well as the mobile application.

Figure 7:
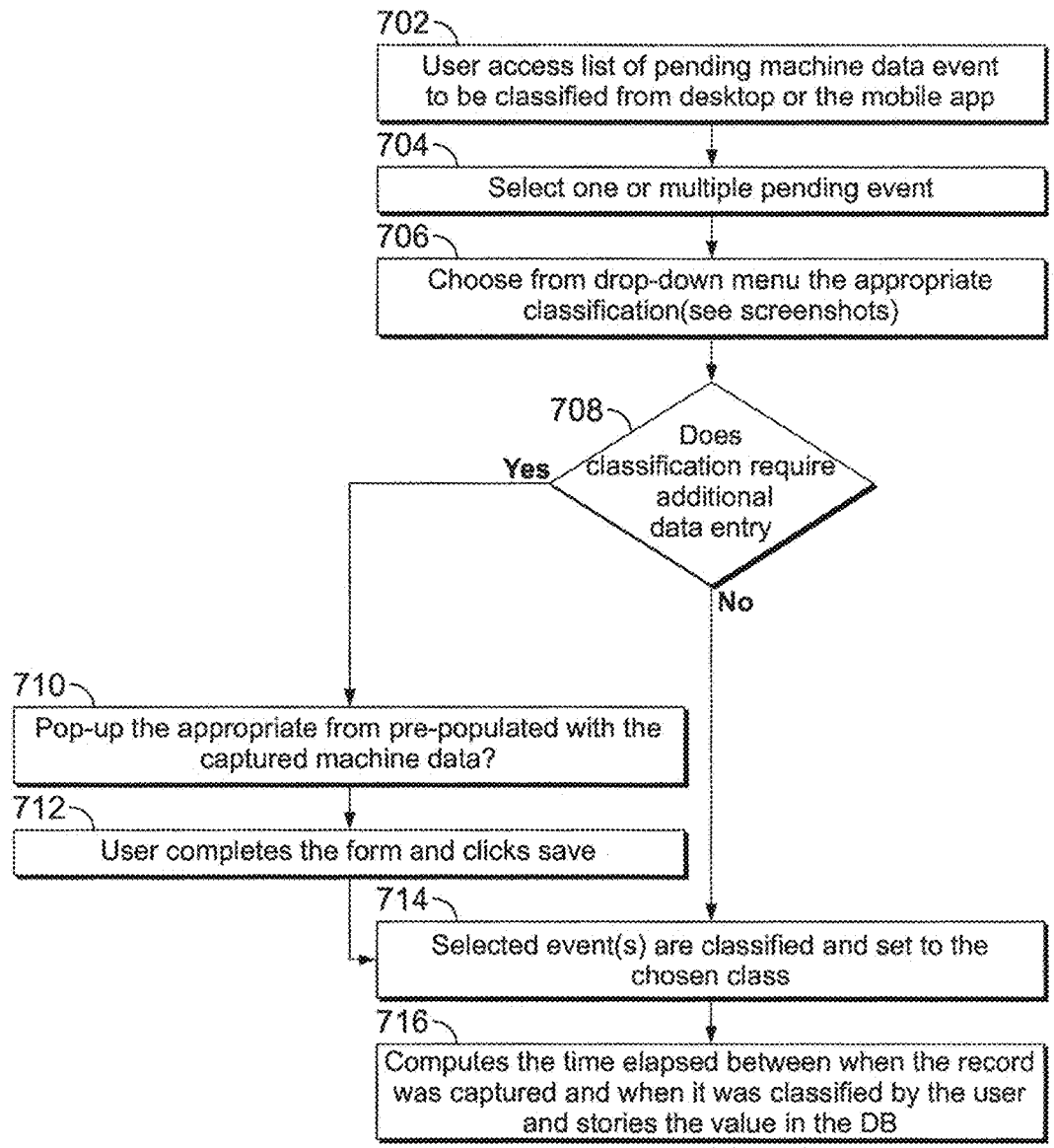
FIG. 7 is a flowchart of illustrative user 4 classification processing consistent with certain aspects related to the innovations herein.

FIG. 7 is a flowchart of illustrative user classification processing consistent with certain aspects related to the innovations herein. Referring to FIG. 7, an illustrative User Classification Process is shown. Here, the user can access directly to the list of Pending events that require the user to enter a note and/or additional information, at 702. The user can select one or multiple events, at 704, and select from one of the two drop-down menus the appropriate classification that qualifies the type of event selected, at 706. In some implementations, the choice for classification falls in 2 main categories, as shown in 820 FIG. 8A, as Work Related and Not Work Related, and within each of these 2 categories, a configurable set of sub-categories predefined in compliance with the company's profile, as shown in 822 FIGS. 8A and 830 FIG. 8B. In case additional information is required, at 708, a pop-up form will pop-up with pre-populated fields from the information captured in the pending event, at 710. The user completes the form by adding a note and/or additional information and clicks save to record the activity in the SFA/CRM, at 712. The selected events are marked with the classification entered by the user, at 714, and the time elapsed since the time the record was captured and the time it was classified is stored in the database.

Figure 8A:
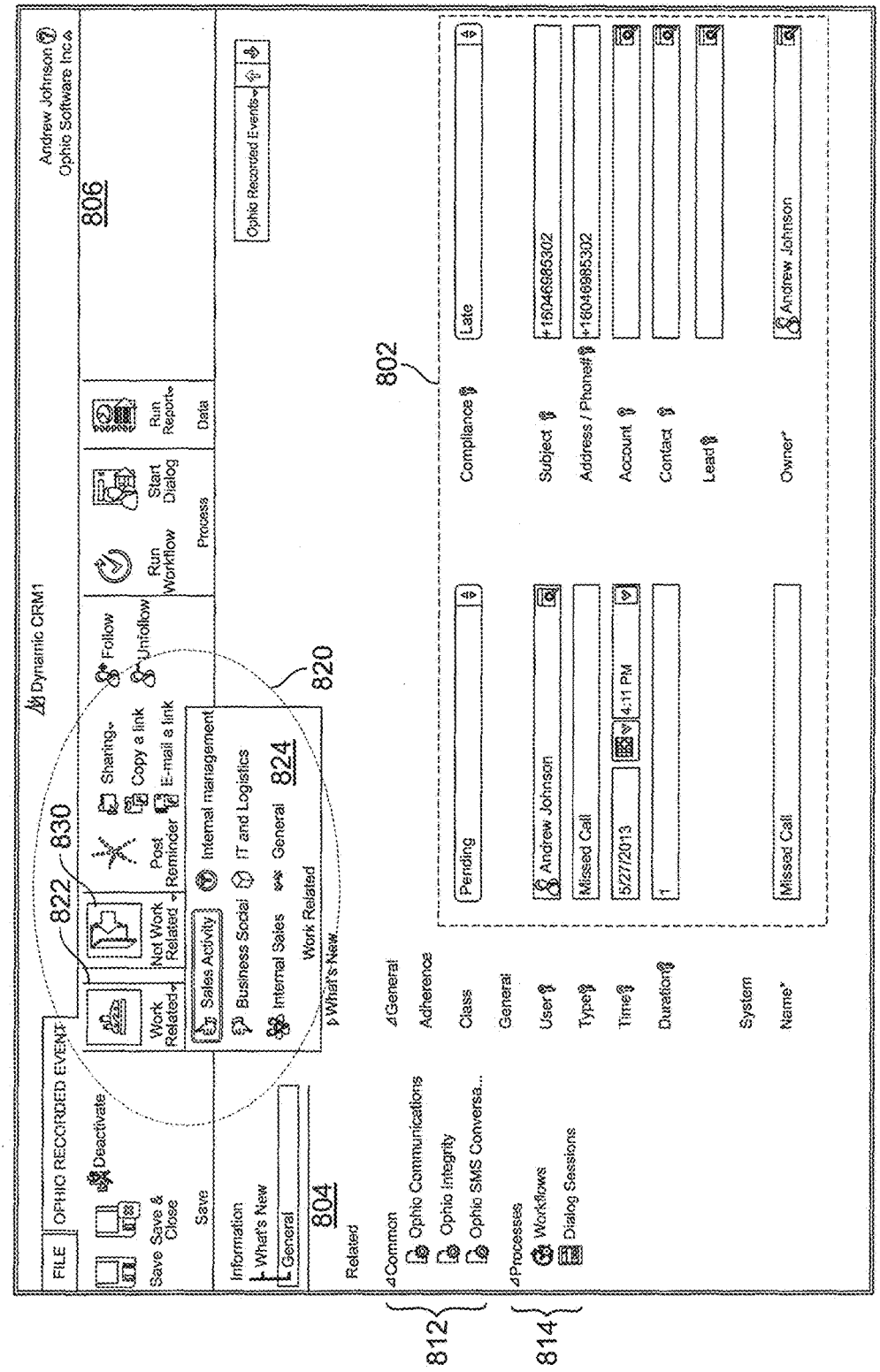
FIGS. 8A-8B are illustrative user interfaces showing exemplary classification processing features consistent with certain aspects related to the innovations herein.
Figure 8B:
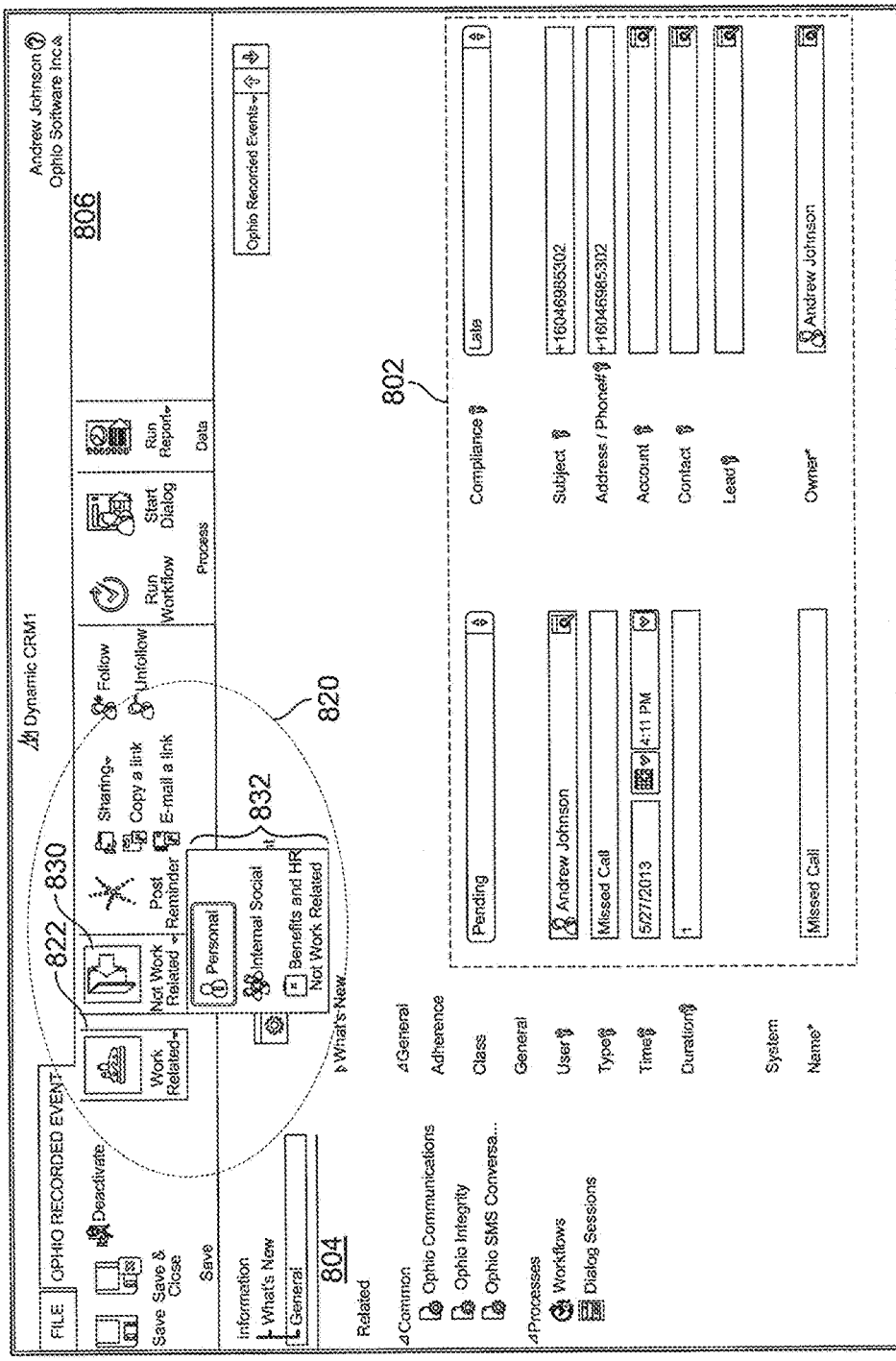

FIGS. 8A and 8B are illustrations of an embodiment of a classification process. The user GUI 806 displays the event data 802 pre-populated into the GUI 806. In this case, the event data 802 is a missed call pending classification. The highlighted section 820 indicates a menu for classifying the pending event data 802 into different categories such as work related 822 and not work related 830. Once a user selects either of these categories, then a corresponding sub-menu appears for the user to select a more specific description. The sub-menu 824 includes work related activities such as sales activity, internal management, business social, IT and logistics, internal sales and general. The sub-menu 832 includes personal, internal social, and benefits and HR classifications. Sidebar 804 allows a user to quickly select options such as common tasks 812 and processes 814.

Figure 9A:
Figure 9B:
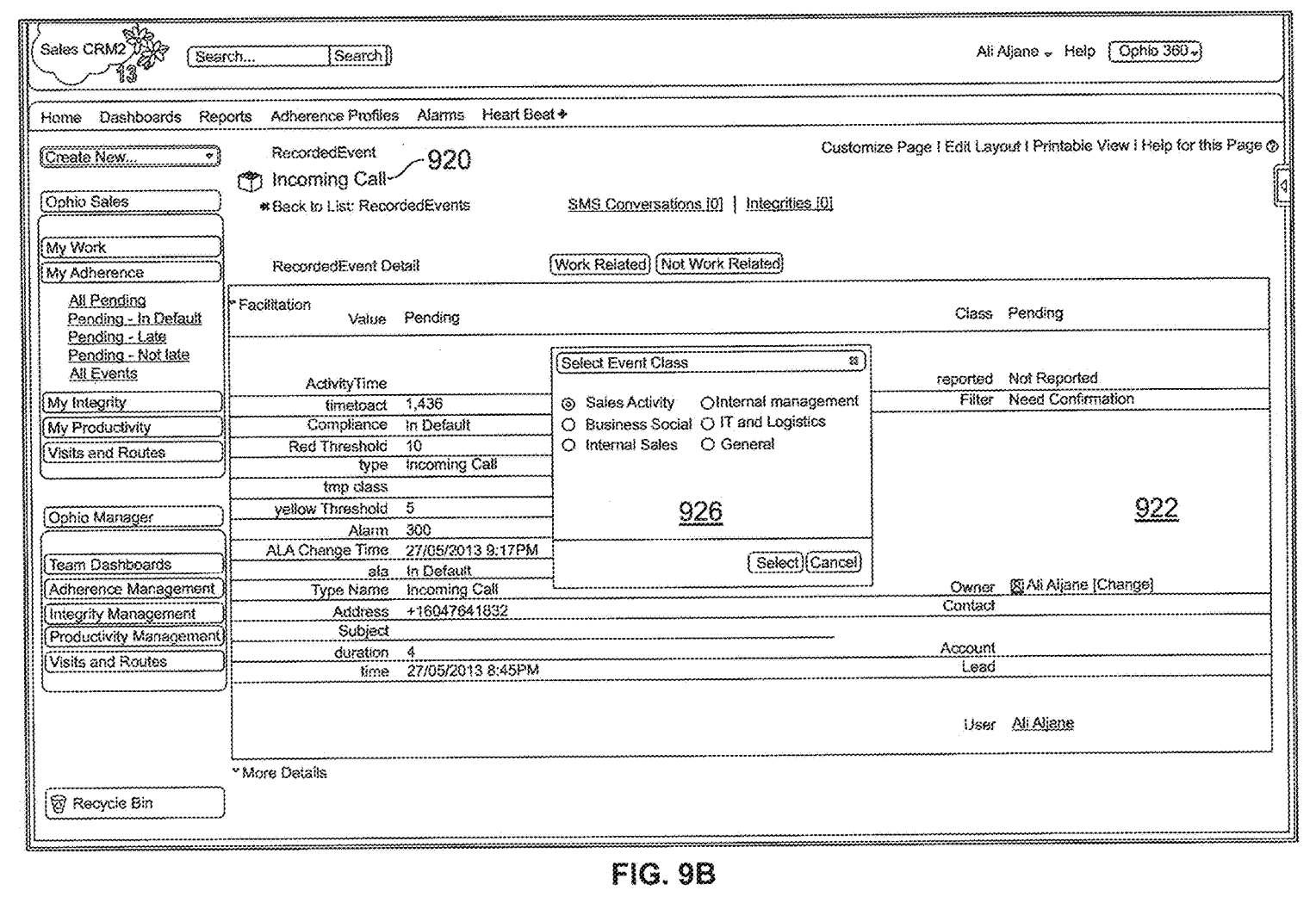
Figure 9C:
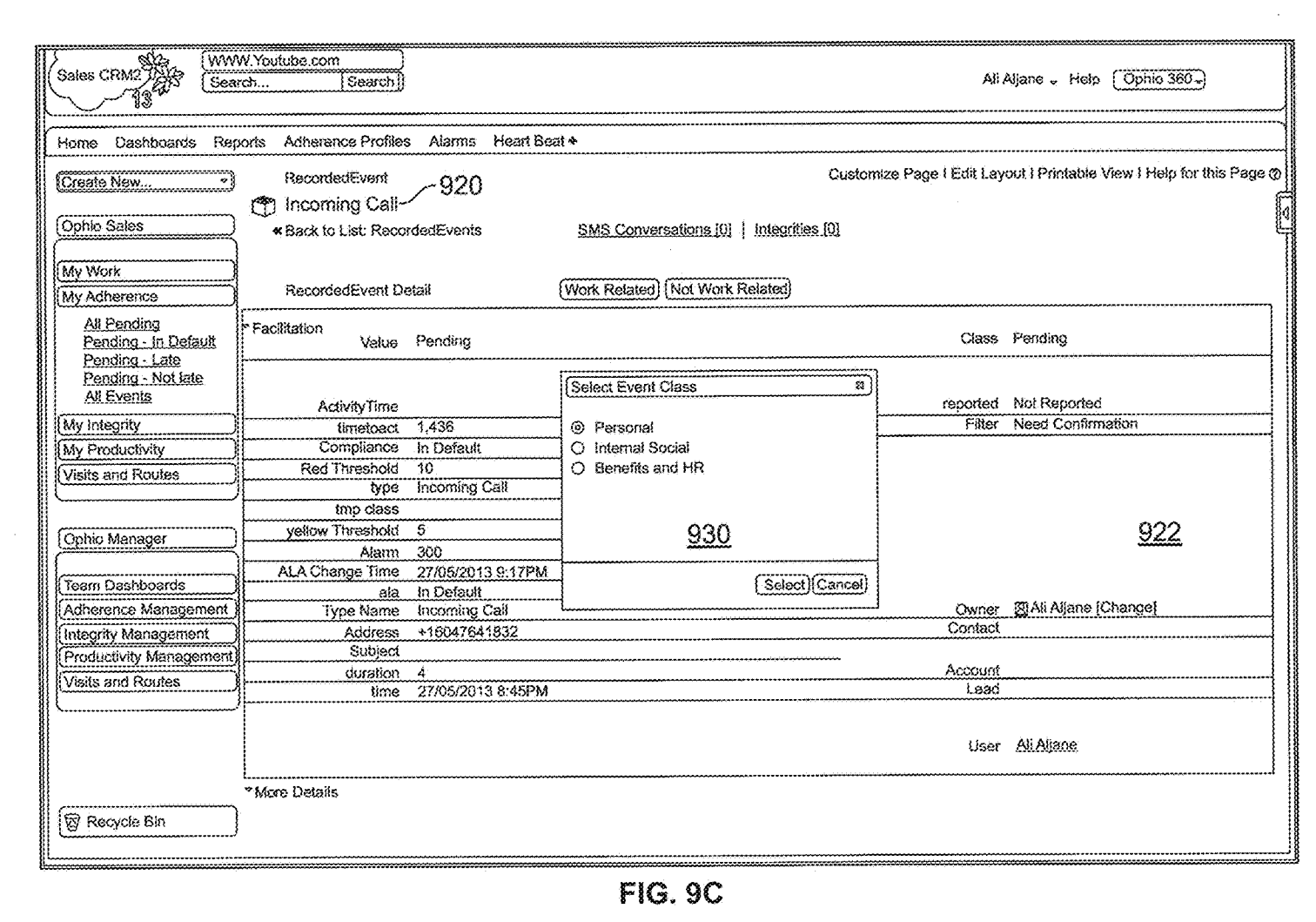

FIGS. 9A, 9B and 9C are illustrations of another embodiment of a classification process. The user GUI 902 displays a set of event data 914 including a selected and highlighted incoming call 916. A sidebar 904 is provided and includes a sales menu 908 and manager menu 910. After the incoming call 920 event data 916 is selected in FIG. 9B, a detailed display 922 of the event data information is provided. Detailed event data 924 includes call details and compliance status. A classification selection menu 926 is also displayed to prompt a user to classify the incoming call. FIG. 9C is similar to FIG. 9B and provides a display 922 with a classification selection menu 930 including different categories than menu 926.

FIGS. 10A and 10B are illustrations of yet another embodiment of a classification process operating on a mobile device. Event data 1002 includes information such as event type, time and a user input explanation regarding the event. Event data 1006 displays geolocation event data where user input has not been entered. Selections 1004 are displayed where a user classifies the event as work related and more specifically, as a sales event. Selections 1008 illustrates a not work related classification for a personal event.

In order to provide purely data-driven, actionable business insights regarding Sales Productivity and Forecasting as well as Technology Adoption and Adherence, some implementations herein may aggregate and/or cross-references data streams and sources such as Presence Management Systems/"Multiple Points of Presence" ("MPOP") data, mobile phones, local PBXs (whether circuit or packet-switched/Voice over IP/"VoIP"), VoIP phone services, computing devices such as desktop computers, laptop computers, smart phones, tablets, servers, databases, networks, network components, etc., Geo-location (GPS) data, Sales Force Management/Sales Force Automation SFA systems, CRM system data, electronic calendar data and/or credit card transaction data, among other inputs.

Certain implementations herein may be broken down into and/or involve one or more of three key aspects (each of which address the core issues of adoption, data integrity and productivity. The first is alarms (and associated alarm notification mechanisms). The second is reports. The third is extrapolated insights, which includes but is not limited to pattern matching and modeling.

Implementations herein may leverage the data streams noted above and cross reference them to identify discrepancies between factual, mined data versus data entered by staff; and they may generate alarms when lead generation and sales processes are not followed. Such event processing may be (i) used to generate alarms; (ii) available in historical reports, and; (iii) used to provide extrapolated insights regarding individual productivity, group productivity and productivity modeling.

The innovations contained herein include user adoption facilitation and enforcement mechanisms that provide customizable, automated alarm reminders to users that escalate with the passage of time, ultimately triggering a different alarm for the salespersons' manager once the lack of compliance reaches a preset, customizable threshold. This alarm can be displayed in the user interface or sent by email, SMS text message and other methods.

Certain systems and methods herein also include productivity oversight, data quality and/or user adoption monitoring and enforcement mechanisms. Here, for example, implementations may include alarms when discrepancies between relevant data streams and self-reported data are identified so that managers can be alerted to "Integrity Incidents" wherein salespeople may be unintentionally misleading themselves or intentionally misleading others. These discrepancies may be event-specific, such as the length of site-visits and other meetings or the duration or quantity of phone calls or emails. They can also identify leads that have not in fact been pursued in accordance with prescribed sales methodologies, if at all. Integrity can also be managed from the perspective of absences from work (for both office and home-based employees) in that such absences can be tracked via geo-location and cross referenced with electronic calendar and other systems to identify cases where absences have not been listed as vacation or personal days. Also, the integrity of mileage expense reports and expensed client dinners are analyzed (for example, were they actually there on the day listed on the receipt?) which are now subject to verification on an automated basis. Since employees always have the ability to turn off geo-location tracking on their mobile devices (and they can also turn off CDR [Call Detail Record] tracking of telephone calls on their mobile phones via our mobile application for jurisdictions where this may be legally mandated), the system will detect that such tracking has been disabled, check the relevant electronic calendar to determine whether the employee has taken personal time or is travelling by air, and if appropriate, will alarm managers (in software dashboard notifications and/or email and/or SMS), and in report form, that user tracking has been disabled. (These alarms may result in follow-on investigation if warranted). If tracking is done via the carrier the system will nevertheless track when location services or CDRs are disabled and enabled for purpose of data filtering within the system. Managers can also set time-interval thresholds for disabled tracking notifications, to ensure that moments of signal loss (such as in elevators or parking garages) do not generate unnecessary notifications. Productivity alarms include manager and user notification when activities fall below a defined threshold. In the case of Sales Force Management and Sales Force Automation systems, these productivity alarms can be configured to monitor and alarm productivity deviations from prescribed policy in all stages of the sales process, which can be defined on a custom basis or by default include but are not limited to: new opportunities, initial communications, the fact-finding phase, the solution development phase, the solution proposal phase, the negotiation phase, the purchase order phase and account maintenance phase. If productivity as defined by the manager in terms of sales related activities tracked by the system (as described herein) do not meet the defined threshold for a given phase in the sales process, then the manager may also receive alarm notification in the form described above. Further, productivity alarms may also be defined in the context of overall time allocation tracked by the system (as described herein), such that neglected activities will also trigger alarms in the form described above.

In addition to such alarms, sales managers also have access to detailed compliance dashboards and displays and detailed reports including but not limited to user adoption, productivity, sales process adherence and user integrity. Additional details on these processes are included below.

Systems and methods herein may include user adoption monitoring and enforcement mechanisms such as implementations that may include reports and alerts that flag non-compliance with policies regarding timely data entry following activities such as live meetings (via geo-location and electronic calendar and/or SFA information), phone calls (mobile or PBX—including packet-switched voice over IP "VoIP"), SMS exchanges, email exchanges, faxes sent or received and/or chat sessions. These monitoring and enforcement mechanisms may also be applied to timely data entry regarding meeting cancellations, the time-lag between events requiring data entry and the follow-up data entry. Failure to enter data into Sales Force Automation and other systems can be followed up by automated warnings and Manager alerts. More detail regarding adoption enforcement and facilitation this as well as notification and other configuration options are set forth elsewhere herein.

Systems and methods herein include extrapolated insights regarding the quality of leads in the pipeline at each stage of the sales process. For example, by correlating the number and length of live meetings (via geo-location), phone calls, emails and chat sessions with a dynamically-updated, data-driven model of sales cycle assumptions (which are dynamically updated with real-world data on successful sales processes), conclusions may be drawn about the likelihood of a successful sales outcome for a prospect in a salesperson's sales pipeline. Pipeline verification analysis advises when the amount of communication to date relative to the success model conflicts with salesperson optimism—to invite further exploration by sales managers.

Systems and methods herein include time allocation analysis of individuals and groups analyzed in the context of dynamic success modeling. Managers and salespeople themselves can view their own productivity reports to gain insight on their time allocation by activity type, account value, qualified versus unqualified leads, sales funnel stage (including: prospecting, new opportunities, initial communications, fact finding, solution development, solution proposal, solution evaluation, negotiation, purchase order, etc.), time allocation on sales versus non sales (internal) activities, as well as the speed and quality of their follow-up. Allowing employees to see this productivity-related information allows them to both challenge their subjective perceptions to self-assess their efforts and gain insight on what adjustments can be made to improve performance. To this end, implementations may provide salespeople the opportunity to contrast and compare their time allocation to that of another salesperson and/or a composite of the top X % of salespeople and/or to the team in general. Over time, productivity modeling can enable salespeople to process how changes in their own productive behaviors can impact on their sales performance. For the manager, implementations can enable productivity to become a dashboard metric with associated alarms and configurable reports. The modeling component provides managers with valuable insights on where productive efforts should be focused in the context of specific product lines while also providing the business insight required for mentoring and assessing sales staff. Implementations of productivity analysis can also provide insight for more effective sales territory management by enabling managers to distinguish between 'order takers' who make little effort to obtain new business and salespeople who make heroic efforts to meet their sales quota. This distinction can provide meaningful insight on when sales territories should be split and arguably provides a superior metric to the most common practice of splitting sales territories when they reach sales quota targets.

Systems and methods herein include cross-referencing of individual and group time-allocation analysis with a dynamically-updated, data-driven success model of sales process effectiveness to identify time allocation inefficiencies. This success model may be derived from the analysis of successful sales events and includes an analysis of the number of communications with the prospects and their duration, including phone calls, chat sessions and emails, as well as the number and duration of live meetings, expensed business meals (business lunches/dinners), the number and duration of communications following significant milestones in the sales process (such as the response to a Request for Proposal), as well as the duration of time elapsed between communications.

Systems and methods here include time allocation analysis to monitor time spent on sales activities relative to the size of the initial sales opportunity and/or the size of the potential opportunity in the future; (with data related to time spent derived by analyzing the number and length of live meetings, phone calls, emails and chat sessions as well as internal communications related to sales opportunities). Implementations with time allocation analysis features may also provide actionable insight to managers regarding excessive personal communication by staff during business hours. Embodiments including time allocation analysis can also provide actionable insight on time spent on internal activities versus customer-facing revenue-producing activities—to draw attention to time management issues as well as staffing shortages (for example in product managers, sales engineers, etc.) that are diverting salespeople from a singular focus on revenue production.

Systems and methods herein may be configured for identification of neglected opportunities by cross-referencing prospect inquiries and lead lists with actual follow-up by sales staff across all communications channels: phone calls, emails, fax, chats and live meetings.

Systems and methods include integrity monitoring and enforcement mechanisms. Here, for example, implementations may include cross referencing of data entries with live meetings (via geo-location), phone calls (which in all cases herein include mobile phone calls or PBX phone calls—including packet-switched Voice over IP ["VoIP"] phone calls), faxes, email exchanges and chat session/SMS analysis to advise management of potentially inaccurate or wrong information contained in user data entries. Implementations can also include cross referencing data entries with live meetings (via geo-location), phone calls (mobile or PBX including packet-switched voice over IP "VoIP"), faxes, email exchanges and chat session/SMS analysis to advise management of potentially inappropriate communication with competitors. In addition, implementations can include geo-location tracking analysis cross-referenced with mileage expense report submissions to determine the true level of reimbursement that is warranted. Implementations may also include geo-location tracking analysis to track inappropriate absences from work (long lunches, personal time not entered as 'personal days', too much time spent in offices of people with whom the employee has no professional interaction, too many outdoor breaks, etc.). Implementations can also include the ability to detect and identify an absence of any work-related activity: such as live meetings (via geo-location), internal or customer phone calls, faxes, email exchanges or chat sessions; in order to to identify employees that may be intentionally slowing down sales to avoid a territory split or who are simply derelict in the professional responsibilities.

Systems and methods herein include various features that provide value-add for purposes of employee adoption of SFA systems. Among other things, implementations herein provide for increase in adoption by reducing data entry requirements. Further, adoption is also increase by alerting managers regarding non-compliance. The fact that non-compliance itself can now be tracked will in and of itself impact on user adoption process adherence. According to some systems and methods, alarms are provided when communications or meetings are not followed up with notes in the CRM system, and some implementations utilize various colors and/or changes in color levels as time elapsed. Reports may also be generated including information as to how long the person waited before entering the data, as time lag correlates inversely with accuracy. Alarms are also provided for missing data entries. Here, for example, alerts may be issued to managers regarding events such as calls, chats and meetings not entered into SFA.

Systems and methods herein include various features that provide value-add with respect to productivity, such as via various productivity alarms. In some implementations, reports and/or alarms may be generated when discrepancies arise between hard data and employee data entries. Here, for example, such reports and/or alarms may be generated when discrepancies regarding time spent on opportunities are detected, when prospects/leads have not actually been called, and/or when differences between actual versus reported time spent prospecting to fill the sales funnel are noted. Reports and alarms may also be generated for questionable data entries. Here, for example, such indicators may flag accounts where the amount of communication to date seems to conflict with salesperson optimism. Additionally, these contrasts may be further extrapolated, such as by generating data-driven conclusions with sales force data-entry projections. Here, for example, sales pipeline verification analysis can include how many calls, length of calls, number of visits, length of site visits, etc. Reports and alarms may also be generated to help management become aware of inappropriate communication with or visits to competitors or headhunters, and implementations herein may detect such events regardless of which email client is used. Alarms and warnings may also be generated for excessive personal communications during business hours. Additionally, reports and alarms may be generated to flag time actually spent in internal meetings vs revenue production.

Systems and methods herein include innovations that provide for high integrity and analytics, such as features offered by features of the big data analytics herein. Here, implementations may identify conflicts between personal data streams and self-reported data, and may present such information both as manager alarms and as data available in reports. For example, reports may include time spent on opportunities, leads not called, prospecting/cold calls not done, etc.

Systems and methods herein may also include or involve innovations associated with other integrity related alarms and reports. Implementations may include virtual punch clock features (e.g., via geo-location), offsite lunch duration tracking, mileage expense analysis (e.g., true miles travelled versus submitted mileage expense report), and/or absences not listed as vacation or personal days. Implementations may also involve features of personal communications analysis (e.g., personal calls, Internet data chat sessions, etc.), personal Web-surfing time analysis, and/or personal web usage analysis (e.g., personal versus business use). Further embodiments may include functionality related to headhunter call tracking (e.g., to identify at-risk employees), competitor call tracking (e.g., communications with competitors), and/or contact with other parties of concern. Integrity management features herein may also be configured to detect data indicating that an intentional sales process slowdown (usually because quota has been reached). Additionally, systems and methods may include features that track the integrity of entertainment expenses (e.g., to track expenses as well as location and time, etc). Here, for example, implementations may be configured with features monitoring geo-location and performing credit-card analysis, which help eliminate the issue of restaurant receipts submitted for different days than the actual restaurant visits (e.g., able to demonstrate that a business meal with a prospect may not have taken place, etc).

Systems and methods herein may also be configured to perform various organizational behavior barometrics and analytics. Here, for example, implementations may analyze aggregate communications traffic within organizations to flag when internal/external call traffic ratios suggest that employees are commiserating in an unusual traffic pattern, e.g., suggesting that there are company rumors that need to be addressed internally for productivity to be restored to standard levels.

Present systems and methods may also be configured for implementation via various deployment models. For example, the innovations herein may be offered both as a premises-based solution(s) for large enterprises and/or as hosted SaaS ("Software As A Service") solution(s) to empower companies of all sizes to leverage system-based pattern-detection in both their strategic and tactical decision-making, in all phases of the sales and sales-forecasting process. For those operating in the SaaS model, an anonymous comparative analysis opt-in program may allow workgroups to compare their performance and success models with other workgroups similarly tasked in similar organizations.

Systems and methods may also configured with features to innovatively process various data streams. For example, implementations may analyze a set of data streams which may be called Personal Event Data Streams ("PEDS") and a proprietary Data Stream Event Processor ("DSEP") to process and extrapolate insights regarding individual performance, productivity, potential fraud and adherence to company policies regarding software adoption. As part of this process, the aggregate data streams from multiple new and existing data streams may store the resulting "big data" in a dedicated event-stream repository (a dedicated set of database tables).

Personal Event Data Stream processing is achieved via algorithms that look at a variety of variables including (a) identifier(s), (b) regular hours of activities, (c) locations of users, such as those obtained via geo-location (e.g., via dedicated apps installed on company mobile devices), integration with premises security system to cross reference use of physical security badges, Wifi hotspot, IP address, etc., (d) calls, including but not limited to mobile phone, IP phone, office phone, logs of phone provider, etc., (e) electronic conversations, including but not limited to chat, mail, Instant Message, etc., (f) presence status, (g) computers activity tracking, including but not limited to key loggers, tasks manager, etc., (h) electronic agenda, CRM, and Sales forces management type data, including but not limited to contacts, opportunities, accounts, leads, appointments, calls, etc., and (i) business credit card logs.

In systems and methods herein, users may enter their activities using different CRM, Sales Force Management ("SFM") or electronic calendar software. In addition, users may declare holidays or sick days on ERP and/or calendar software. Each of these is a data stream resource for the solution.

Implementations may be configured for use with additional systems or devices such that a company may deploy, manage systems and allocate professional devices to improve the efficiency of their employees. Such systems and devices include but are not limited to mobile phones, office PBX and/or IP phones, desktop and laptop computers, tablets and smartphones, presence management systems, email servers, GPS, and business credit cards.

Systems and methods herein may be configured to collect and process data from user devices and company software in order to generate user PEDS (Personal Event Data Streams) and store them in the database(s). Present implementations may also collect user's "declared activities" (information entered by the user) from relevant software (SFM, electronic calendars, ERP . . . ). Further, PEDS may be stored into Analytics database tables. Embodiments herein may extrapolate from PEDS (for example, true duration of all customer meetings in the sales process, number and duration of all phone calls, etc.—to identify, among other issues, questionable sales projections based on a dynamically updated model of the typical sales process for a given product or service. Such processing may also be used to identify fraudulent entries in the sales force management software. A Data Stream Event Processor ("DSEP") may also be utilized for performing these extrapolations. Further, reports and alarms may be derived or extrapolated from these PEDS. In some implementations, the DSEP may construct a "success model" by analyzing successful sales transactions in the pipeline as reflected in the Sales Force Automation system and cross-referencing them against the "big data" in the PEDS to create dynamically-updated PEDS success models. In other words, such processing may identify opportunities in the sales pipeline where there have been insufficient numbers of communications (in calls, emails, live meetings and site visits, etc.) to justify the optimism of the salesperson from a statistical correlation perspective.

In still other implementations, such as when companies opt-in to the "industry comparative analysis modeling" program, systems and methods herein may be configured to anonymously contrast individual (by role) and/or group performance data with counterparts at other companies of comparable size in comparable industries.

Figure 11A:
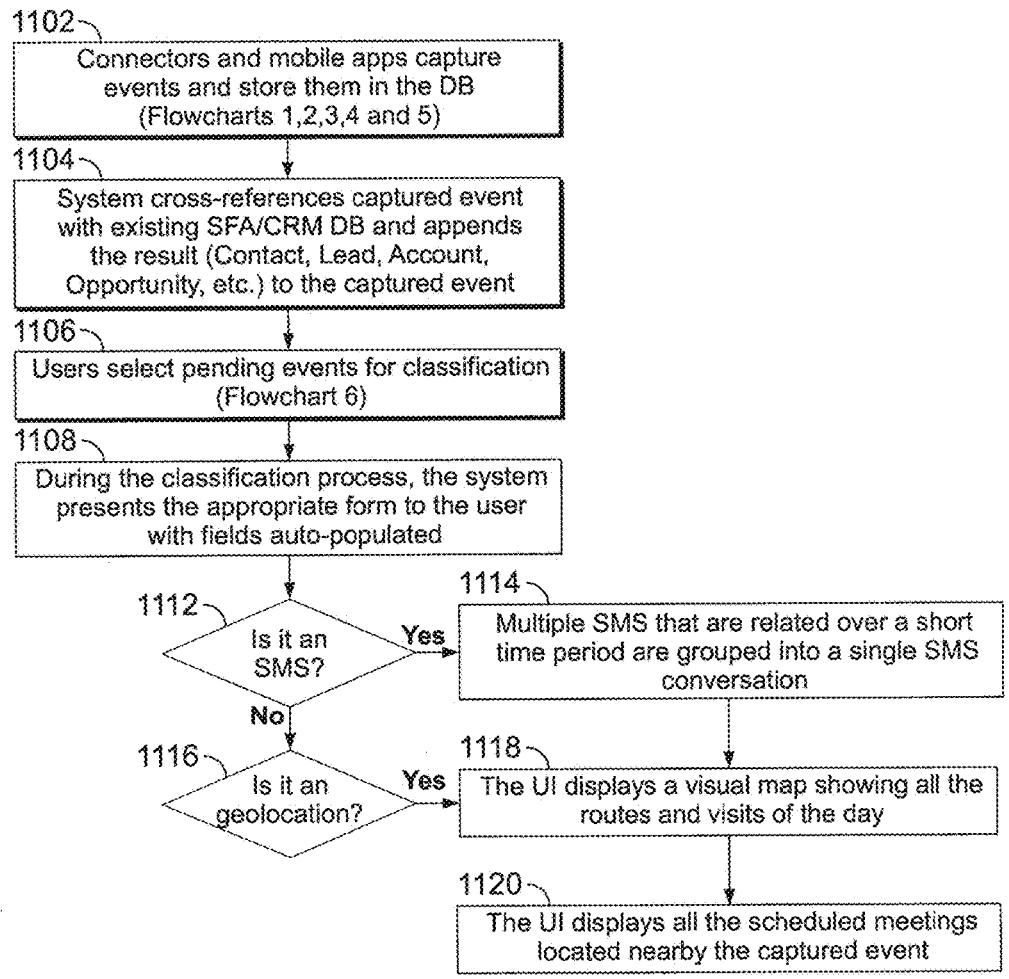

FIG. 11A is a flowchart illustrative of Adherence facilitation mechanism processing consistent with certain aspects related to the innovations herein. An illustration of facilitation mechanism process is shown in FIG. 11A. Events related to sales activity are captured through Connectors and/or mobile apps, and stored in the database, at 1102, as shown in FIGS. 2A, 2B, 3A, 3B, 4A, 4B, 5A, 5B, 5C, 6A, 6B and 6C. When an event is captured, the process cross-references it with existing SFA/CRM database in order to find additional information regarding the event. The results, (Contact, Lead, Account, Opportunity or any SFA/CRM entity), will be added to the captured event, at 1104. When the user selects the captured event to classify it, at 1106, following the process shown in FIG. 7, the process will be able to auto-populate the fields with the information contained in the captured event, at 1108, including the results from cross-referencing with SFA database. This will allow the user to save time and avoid human error. In the next optional steps, the process checks if the event is an SMS, at 1112, and if so performs a process of aggregation which purpose is to group all consecutive SMS with same recipients into a single SMS conversation, at 1114. SMS are subject of repeated messages sent back and forth that are all related into the same conversation and the aggregation process avoids the user to deal with a multitude of SMS to classify. The process further checks if it is a geo location, at 1116, and if so, the UI will display a visual map showing all the routes and visits of the day, at 1118, allowing the user to easily recognize the meeting he needs to classify. The process will look in the scheduled events if matching meetings located nearby exist and list them next to the captured visits and routes, at 1120.

Figure 11B:
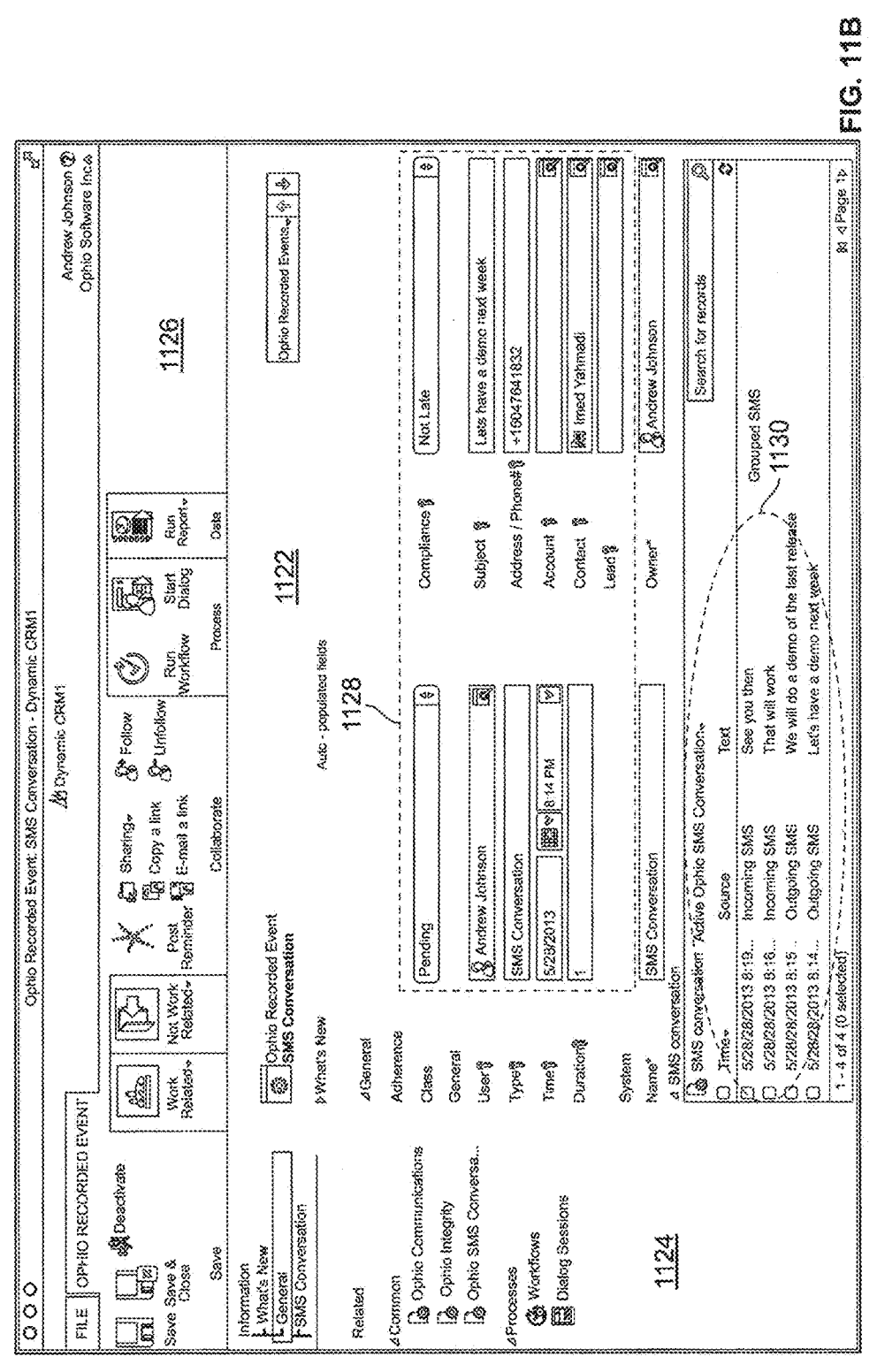
Figure 11C:
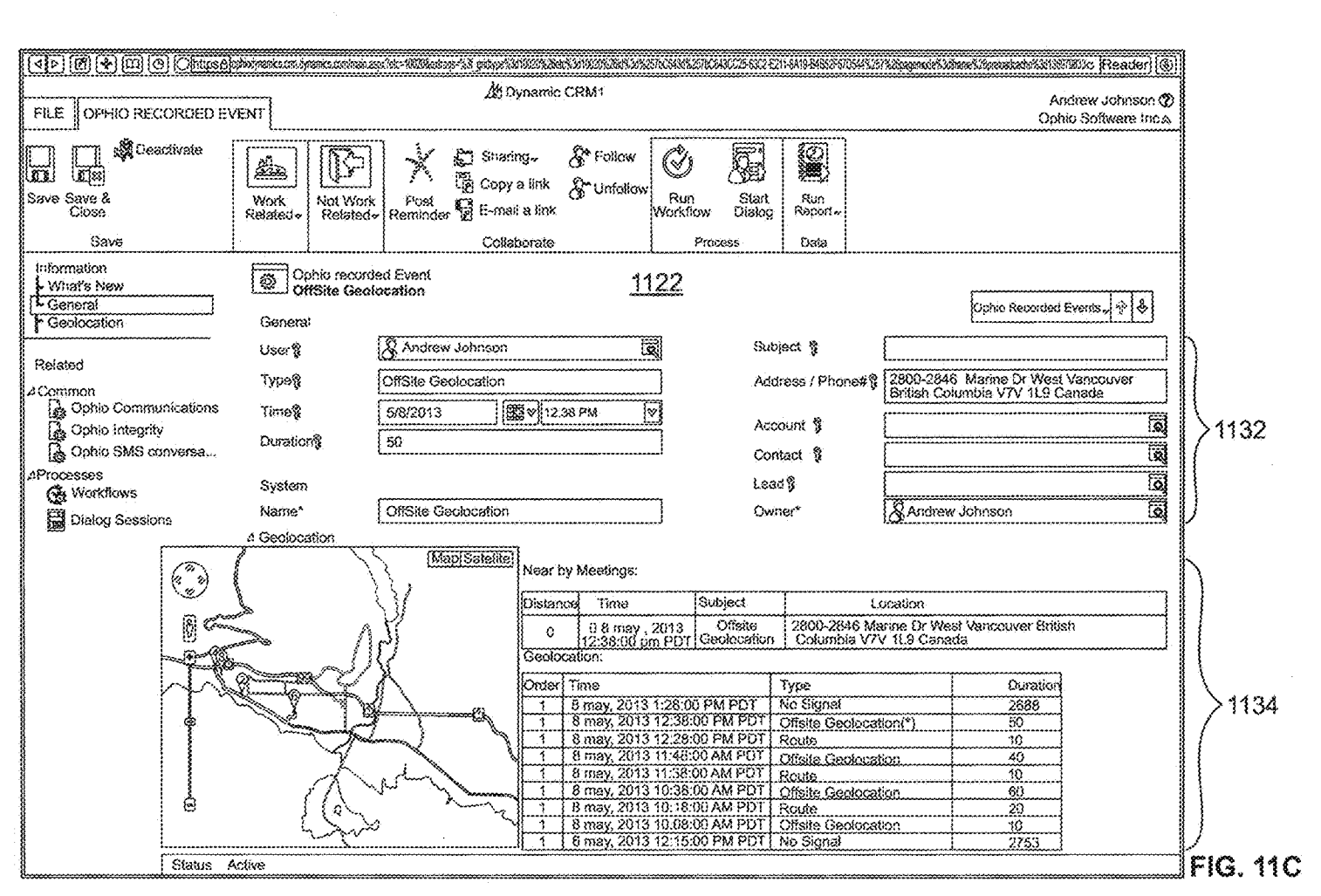

FIGS. 11B-11C are illustrative user interface showing exemplary facilitation mechanism processing features consistent with certain aspects related to the innovations herein. FIG. 11B shows the auto-populated feature, at 1128. The fields shown in 1128 have been populated with the information contained in the captured event, allowing the user to save time and avoiding human error. The SMS conversation is shown at 1130, where all the consecutive SMS displayed in the Active Ophio SMS conversation list. FIG. 11C shows the auto-populated fields for a geo location, at 1132, and a visual map of routes and visits, at 1134, as well as the nearby scheduled meetings.

Figure 11D:
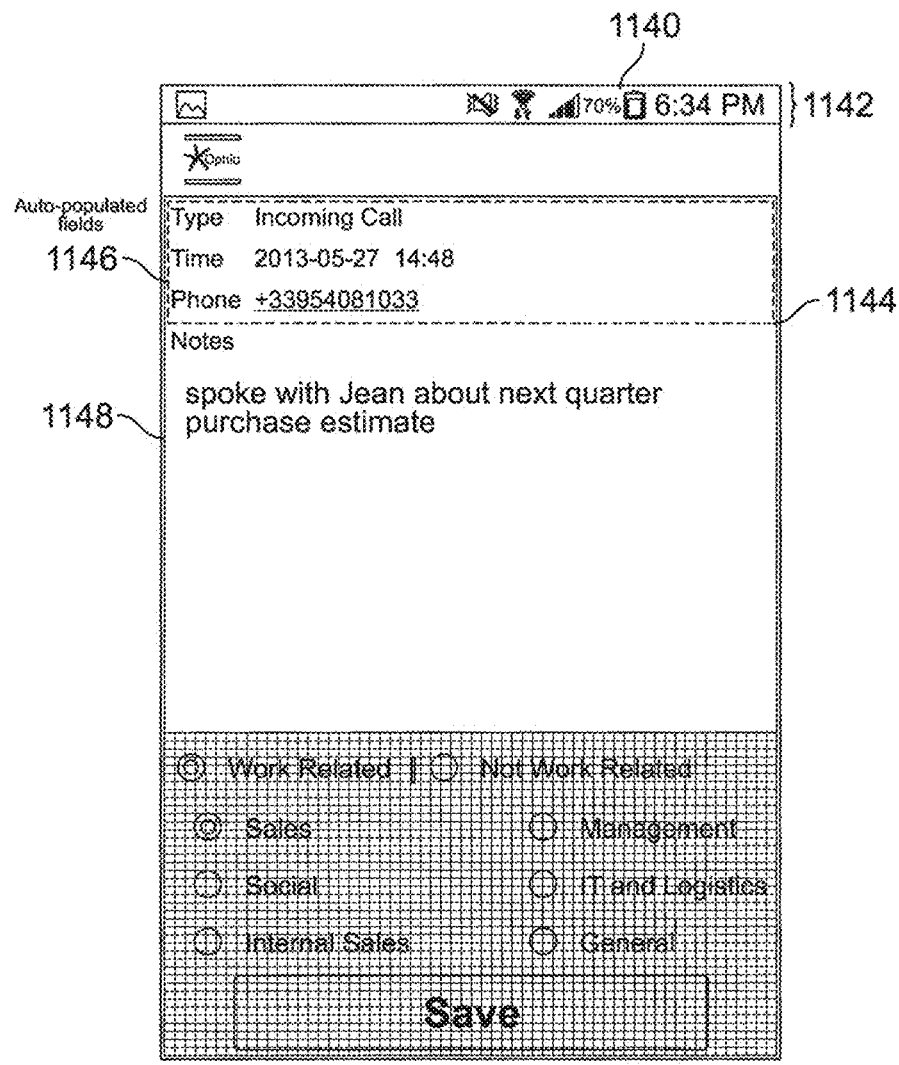

FIG. 11D is an illustrative user interface showing exemplary facilitation mechanism processing features consistent with certain aspects related to the innovations herein. FIG. D shows how facilitation is performed on a mobile application, at 1140. The auto-populated fields are shown at 1146. The user enters the note in an appropriate field at 1148.

Figure 12A:
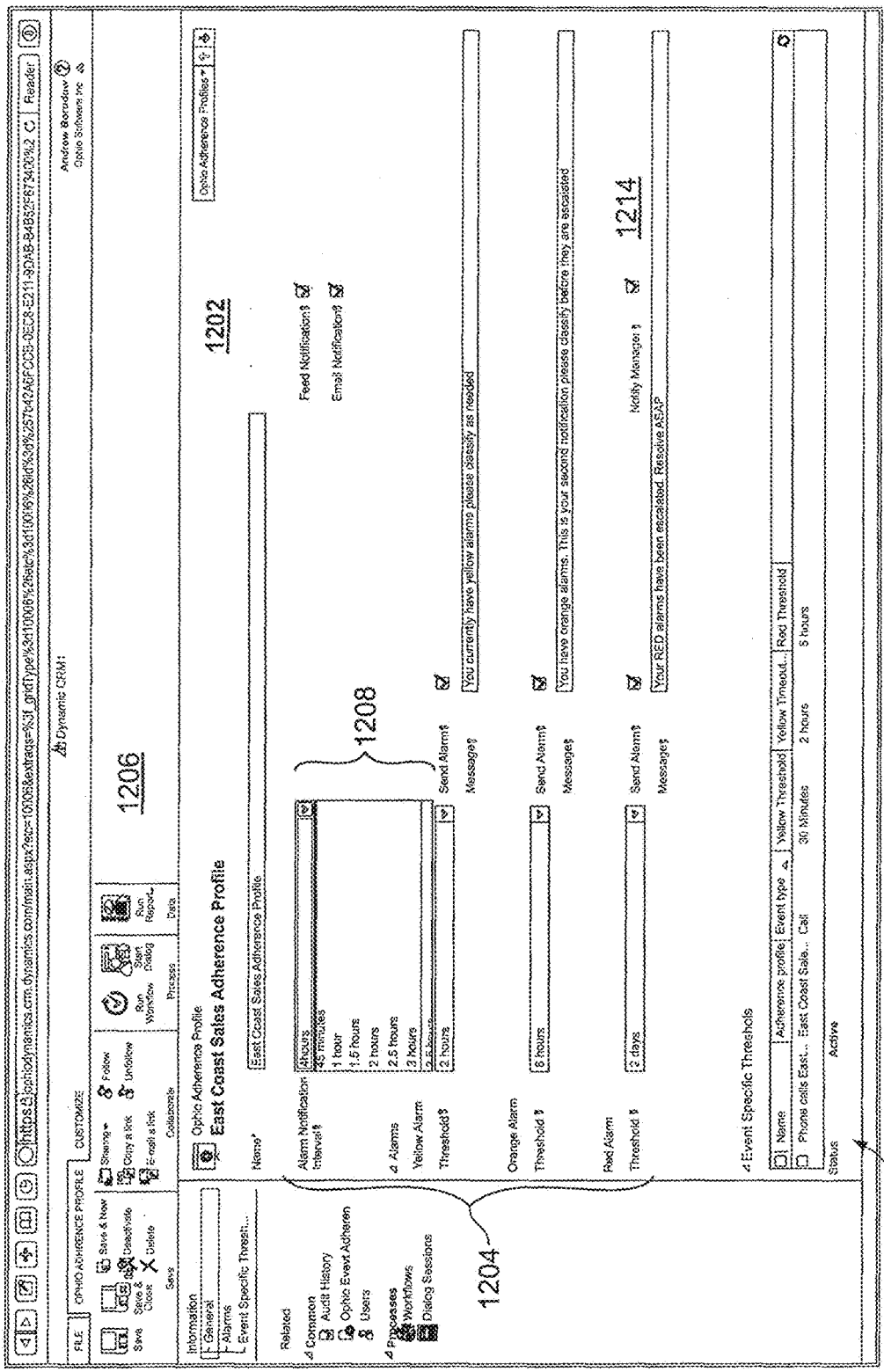
FIGS. 12A-12E are flowcharts and illustrative user interface implementations showing enforcement processing consistent with certain aspects related to the innovations herein.

FIG. 12A is an illustrative user interfaces showing exemplary enforcement mechanisms processing. Referring to FIG. 12A, an exemplary embodiment of how enforcement mechanisms may be performed in the Microsoft Dynamics environment is shown. As set forth, herein, if a user has recorded events that require classification the user can be prompted to classify these events in a timely manner. Preconfigured adherence profiles may be utilized to configure Adherence alarms and notifications for users and Managers. For example, various adherence profiles may allow an administrator to specify: 1. The Alarm notification interval i.e. how often to send an alert to the user once an alarm has been triggered (1208); 2. The different levels of escalation, such as via colors, for example, Yellow, Orange and Red and their respective default thresholds (1204); 3. If a notification should be sent for a specific level of escalation (1210); 4. The means to use for notifications (Feeds or email) (1202); 5. The list of recipients for notifications (1214); and/or 6. individual time thresholds per event type that overwrite the default (1212). Administrators and/or management entities may create multiple Adherence profiles and assign different users to different profile for maximum flexibility.

Figure 12B:
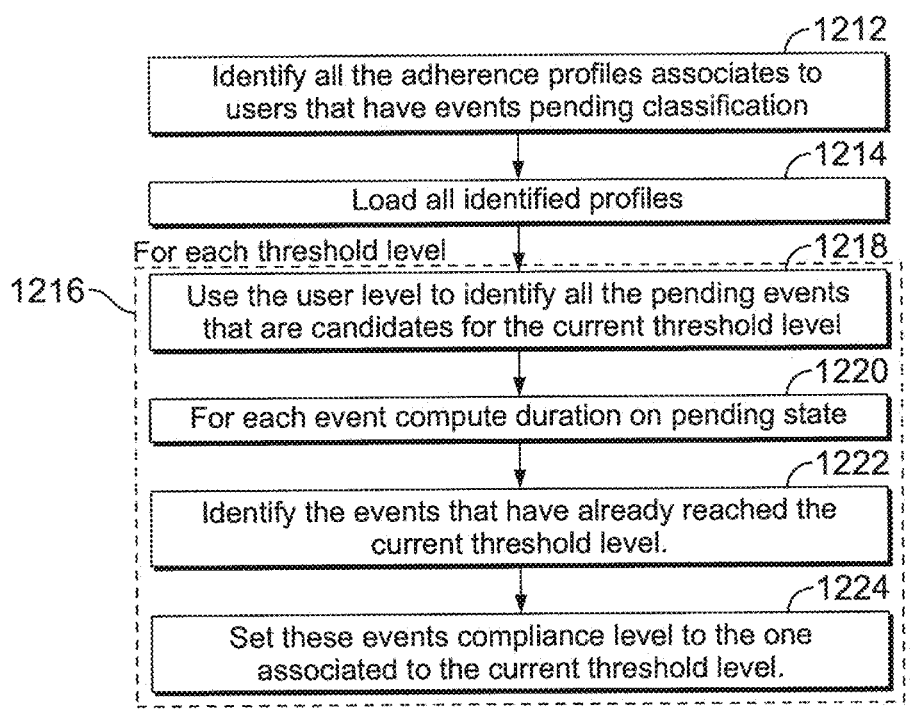
Figure 12C:
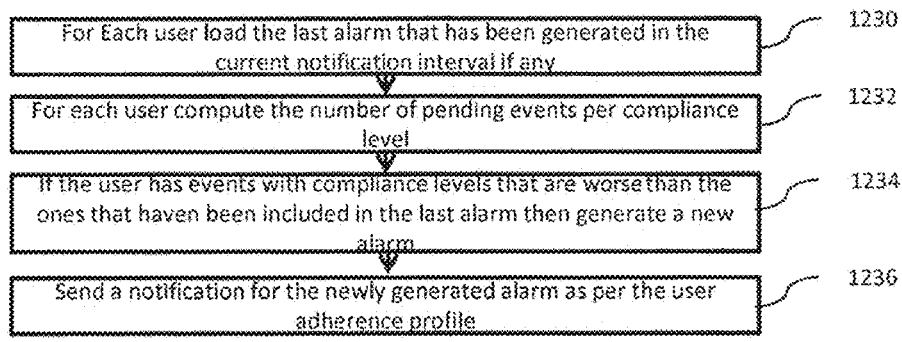

FIGS. 12B-12C are flowcharts of illustrative adherence enforcement processing consistent with certain aspects related to the innovations herein. Referring to FIG. 12B, an illustrative process of adherence enforcement is shown. In a few optional steps, the process identifies all the adherence profiles associated to the users that have events pending classification, at 1212. This will limit the number of profile to use in the following process. The process loads these profiles at 1214. A system administrator may define as many levels of escalation as needed. This process uses profiles to identify compliance levels for each event in pending state, at 1216. A pending event can move from a lower level of compliance to a higher level of compliance as defined by profile. The process uses the user profiles to identify all the pending events that are candidates to be set to the current threshold level, at 1218. Then, for each event, the process computes duration on the pending state, at 1220. The process identifies the events that have already reached the current threshold level, at 1222. Once these event are identified we set the compliance level to the one associated to the current threshold level 1224. Referring to FIG. 12C, an illustrative process to generate new alarms is shown. One aspect of this process is to control the number of generated alarms for each user. The user profile defines a time interval for generating alarm. The process will not generate an alarm with the same or lower level than the last sent alarm within the time interval. The process starts by loading the current alarms for all user candidates to receive new alarms 1230. Current alarms may be all alarms that are still with the time interval. For each user the process computes the number of pending events per compliance level 1232. If the user has events with compliance levels that are worse than the ones that have been included in the last alarm, then the process generates a new alarm, at 1234. The process will send a notification for the newly generated alarm as per the user adherence profile 1236. Eventually, his or her manager will get the same notification.

Figure 12D:
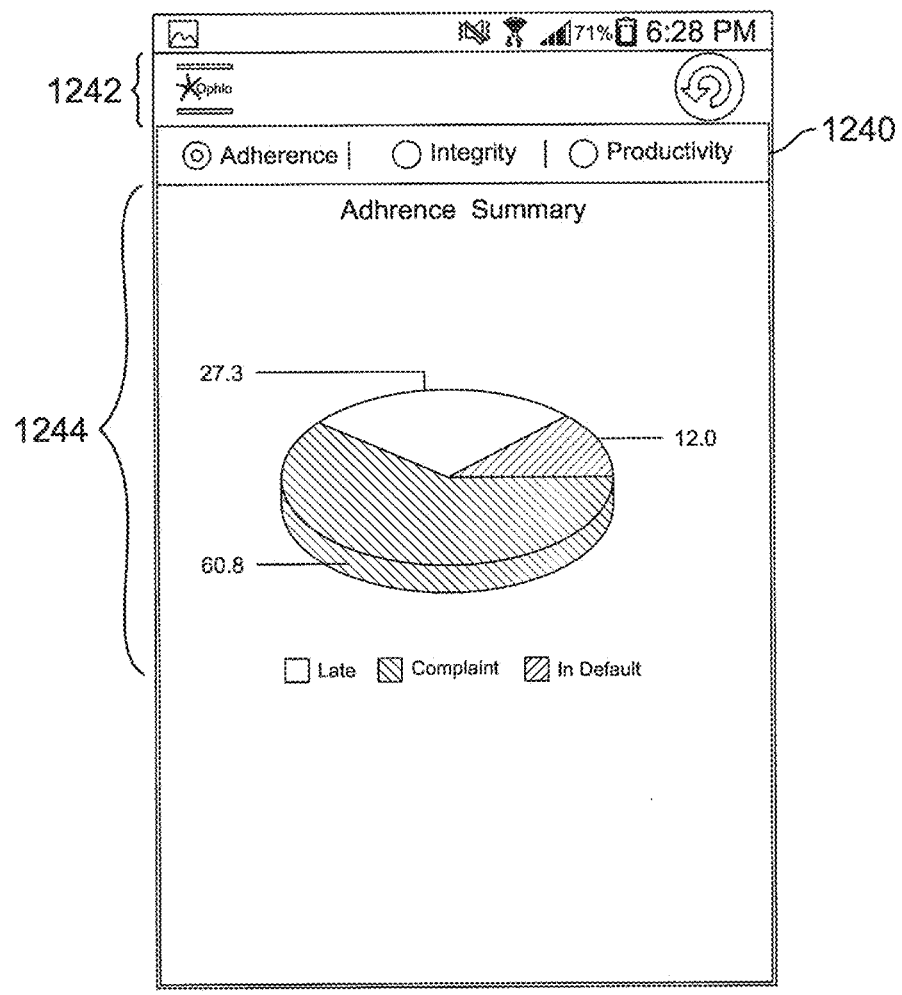
Figure 12E:
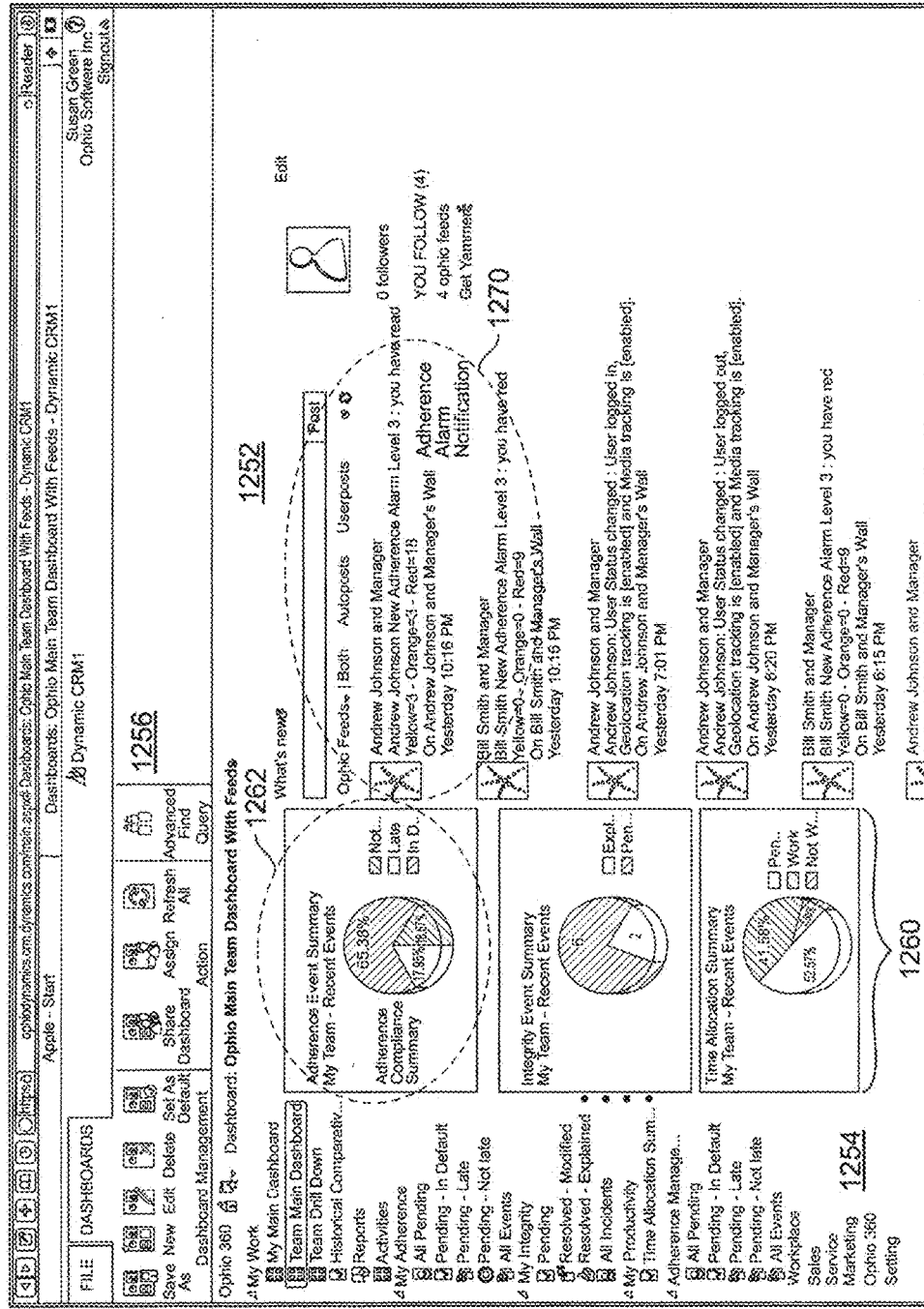

FIG. 12D is an illustrative user interface showing exemplary facilitation mechanism processing features consistent with certain aspects related to the innovations herein. FIG. 12D shows enforcement mechanism processing performed on the mobile app by showing a pie chart of the adherence level of the user, at 1244. The pie chart shows the percentage of each pending events per threshold level (in this case, Not late, Late and In default) giving a quick and straightforward summary of the user's compliance with the company's Adherence policy. FIG. 12E is an illustrative user interface showing exemplary facilitation mechanism processing features consistent with certain aspects related to the innovations herein. FIG. 12E shows how enforcement mechanism is performed on the desktop application within Microsoft Dynamics by showing a pie chart of the adherence level of the user, at 1262. The pie chart shows the percentage of each pending events per threshold level (in this case, Not late, Late and In Default) giving a quick and straightforward summary of the user's compliance with company's adherence policy. An example of enforcement notification is shown at 1270 where the user is being warned through the Feeds that he has reached level Alarm3 inviting him to take necessary action.

Figure 13A:
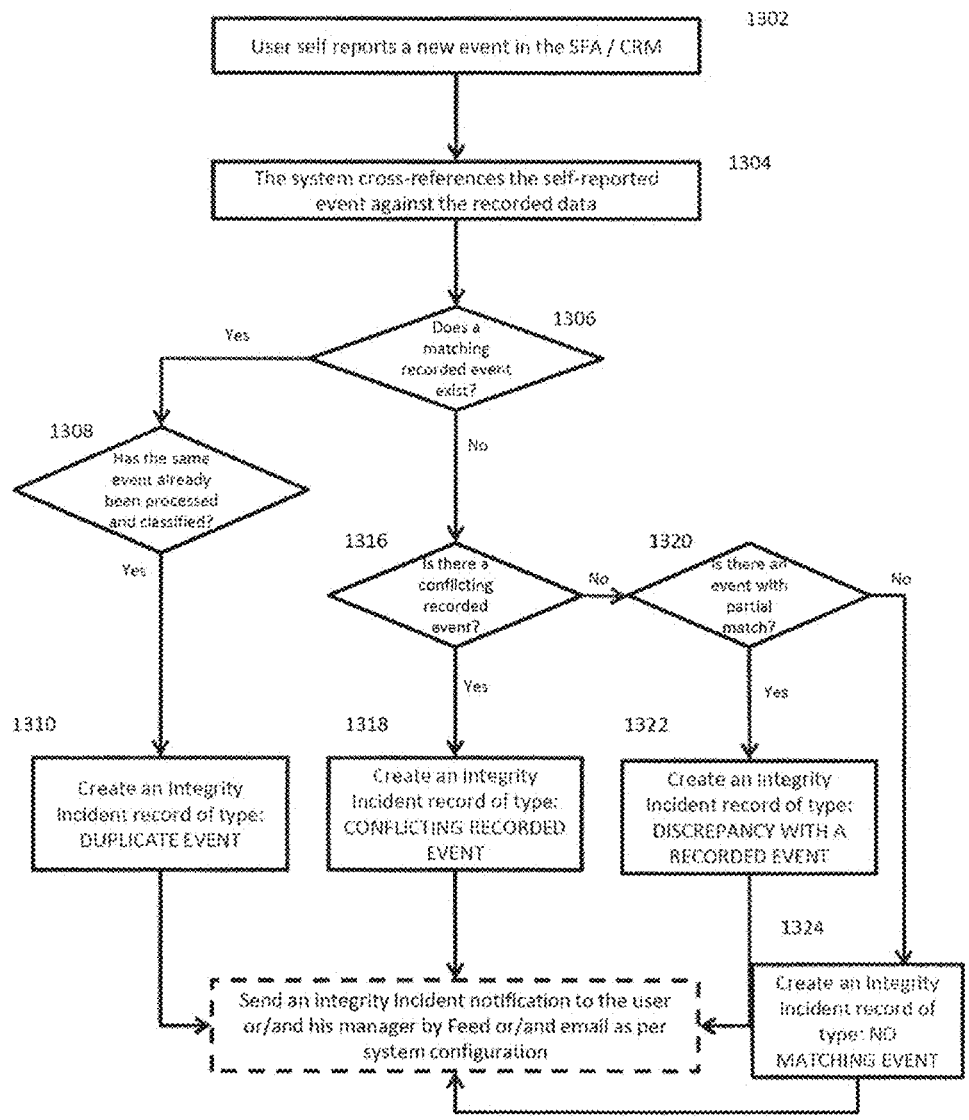

FIG. 13A is a flowchart illustrating an exemplary set of integrity incident identification mechanisms. At 1302, the integrity incident identification mechanism begins with a user self-reporting a new event in a software system that typically relies upon manual data entries, such as a CRM or sales force automation/salesforce management system. At 1304, the system then cross-references that self-reported data against the aggregated data derived by the methods and processes described in Step 1. At 1306, the system first determines whether a matching recorded event has already been created and added to the list of events that require manual processing of the data in accordance with step 2 herein. At 1308, if a matching recorded event exists in the aggregated data and has already been created and added to the list of events that require manual processing of the data in accordance with step 2 herein, the system then determines if manual processing and classification has already taken place or not. If no manual processing and classification has already taken place and the self-reported event matches a recorded event, then the self-reported event is compliant and no further action is warranted. At 1310, if (following 1308) manual processing and classification has already taken place then a "DUPLICATE EVENT" Integrity Incident is created and the user and/or his manager will be notified of the duplication by the method configured by the manager, which may include email and or SMS and/or a notification in the scrolling feed of the user and/or the manager. At 1316, if a matching recorded event does not exist in the aggregated data and has therefore not already been created and added to the list of events that require manual processing of the data in accordance with Step 2 herein, the system then determines whether a different conflicting event has been recorded in the aggregated data (derived by the methods and processes described in Step 1) that contradicts the self-reported data. (For example, a self-reported data entry of a call with a prospect between 9 am and 10 am would be contradicted by recorded event of a personal call that took place between 9:00 am and 9:45 am that same morning. Another theoretical example would be a self-reported event of a meeting with a prospect at their offices at the same time as the geolocation data places the employee at the baseball stadium). At 1318, if a contradicting event does exist, then a "CONFLICTING RECORDED EVENT" Integrity Incident is created and the user and/or his manager will be notified of that Integrity Incident by the method configured by the manager, which may include email and or SMS and/or a notification in the scrolling feed of the user and/or the manager. At 1320, if a matching recorded event does not exist in the aggregated data and has not already been created and added to the list of events that require manual processing of the data in accordance with step 2 herein, and the system determines that a different conflicting event has not been recorded in the aggregated data (derived by the methods and processes described in Step 1), then the system will determine whether a partial match exists. See 1322 for an example of a partial match. At 1322, if a partial match exists (for example, the data shows that a call took place with the specified party at the specified time, but the call duration was only 5 minutes and NOT the 50 minutes that the user manually entered into their system), then a "Discrepancy With A Recorded Event" Integrity Incident is created and the user and/or his manager will be notified of that Integrity Incident by the method configured by the manager, which may include email and or SMS and/or a notification in the scrolling feed of the user and/or the manager. At 1324, if a partial match does not exist, then a "NO MATCHING EVENT" Integrity Incident is created and the user and/or his manager will be notified of that Integrity Incident by the method configured by the manager, which may include email and or SMS and/or a notification in the scrolling feed of the user and/or the manager.

Figure 13B:
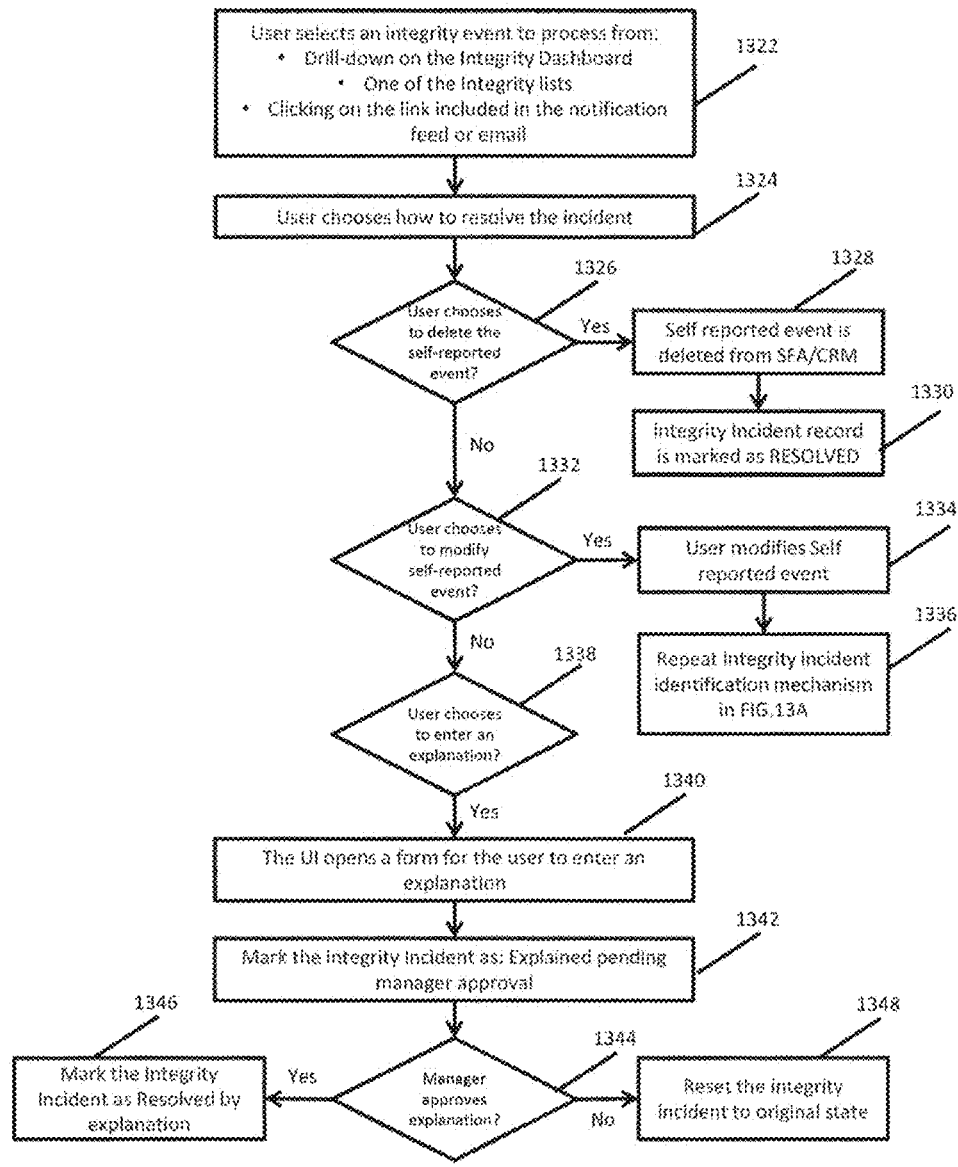
Figure 13C:
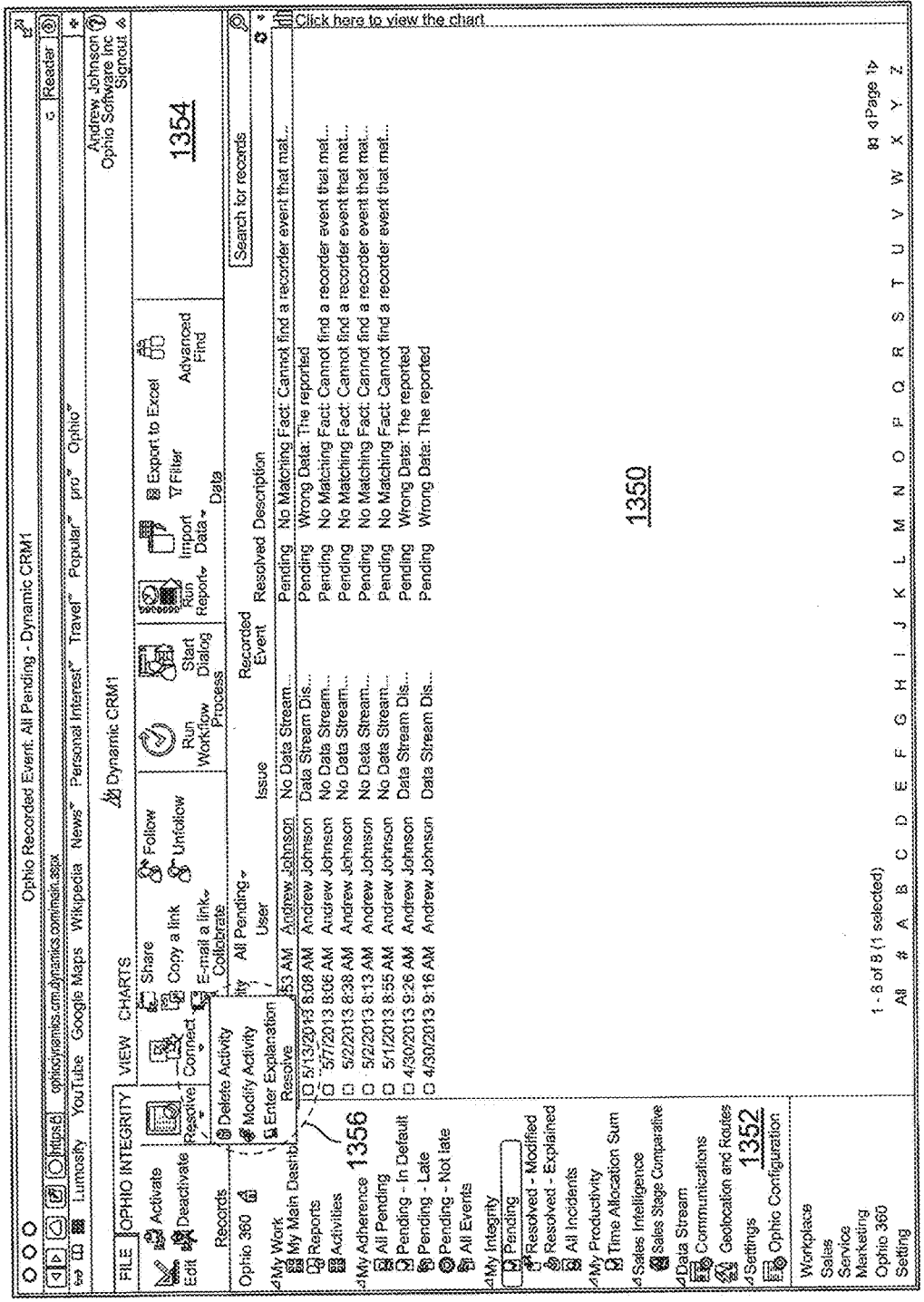
Figure 13D:
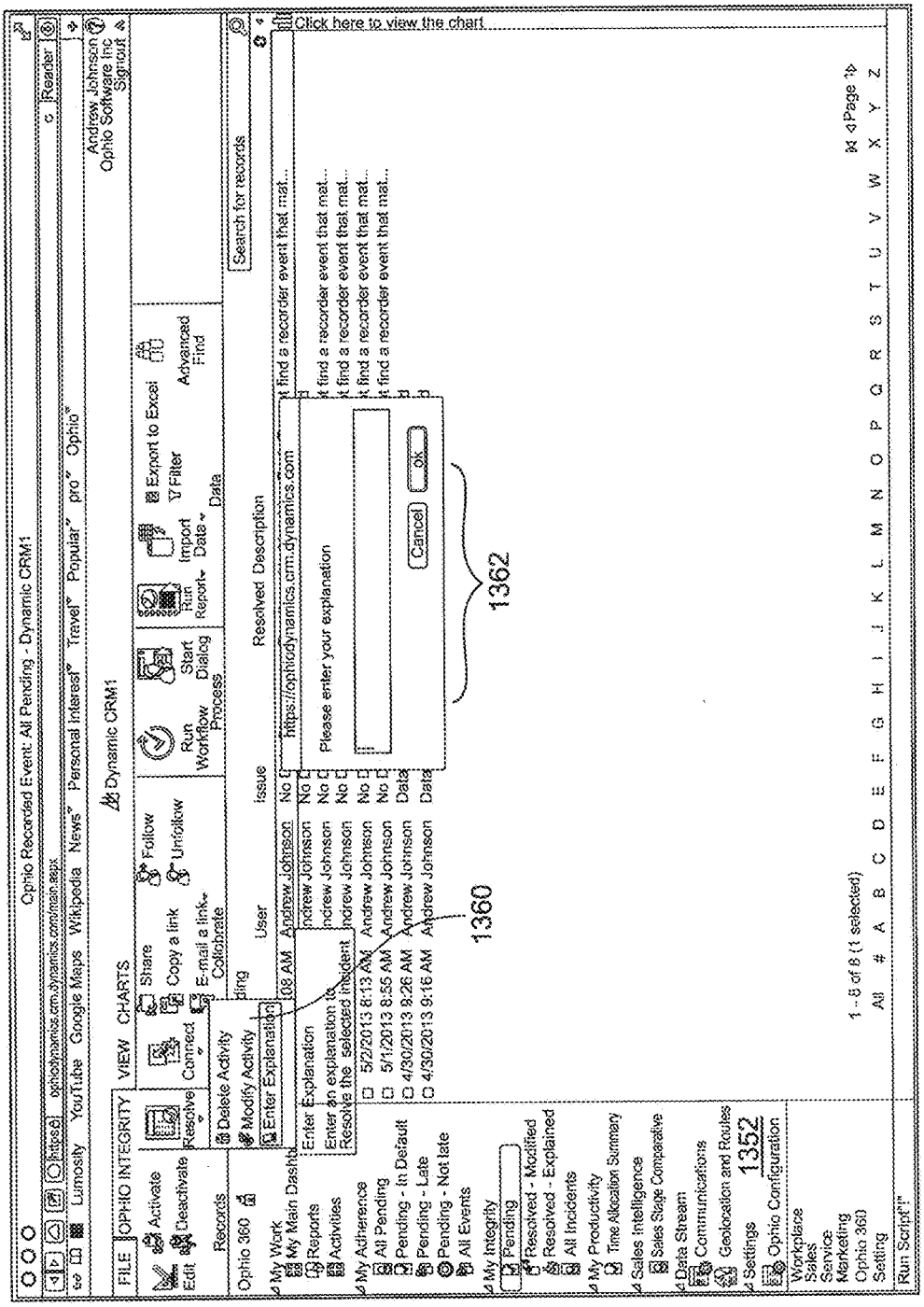
Figures 13E, 13F:
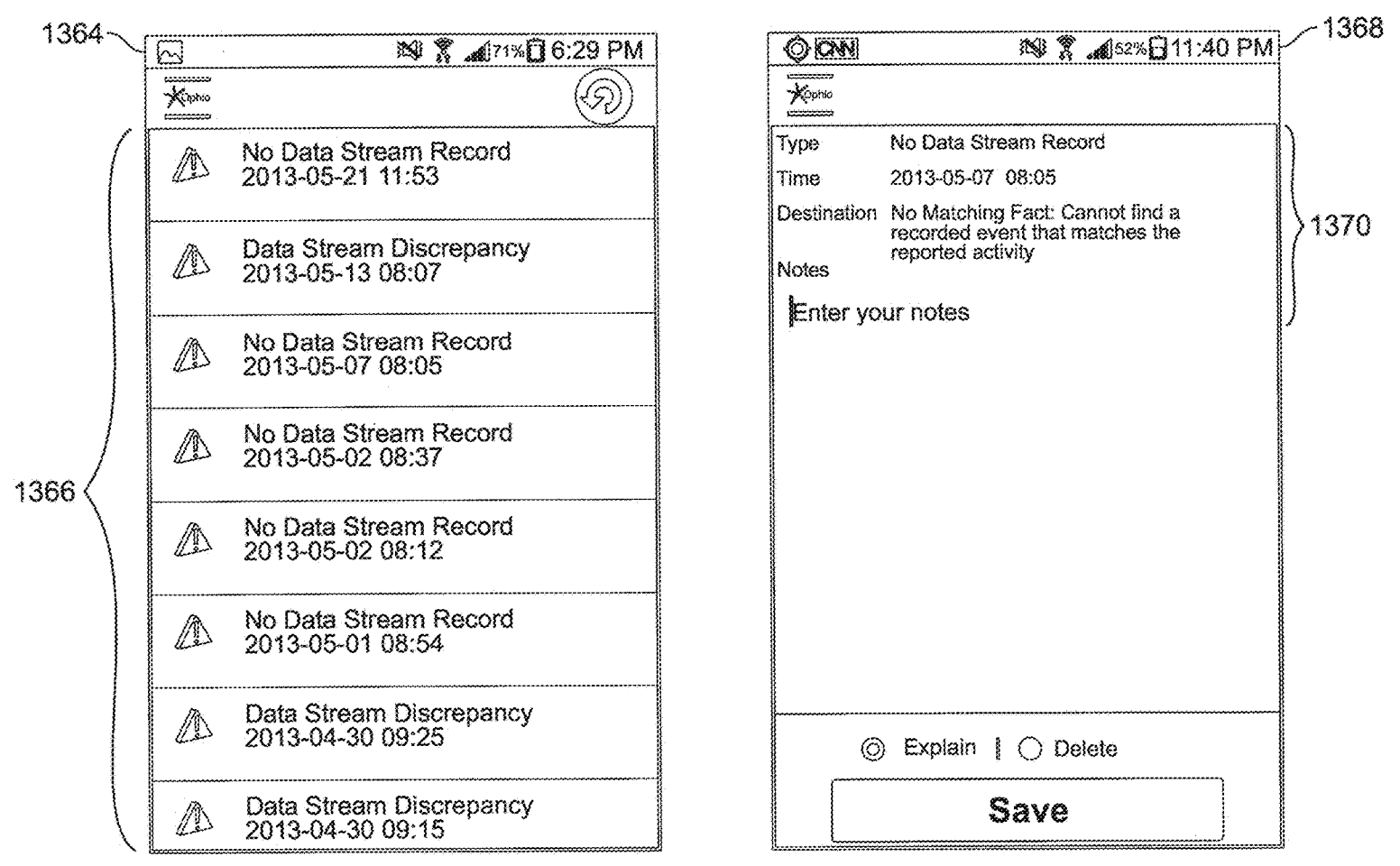
Figure 13G:
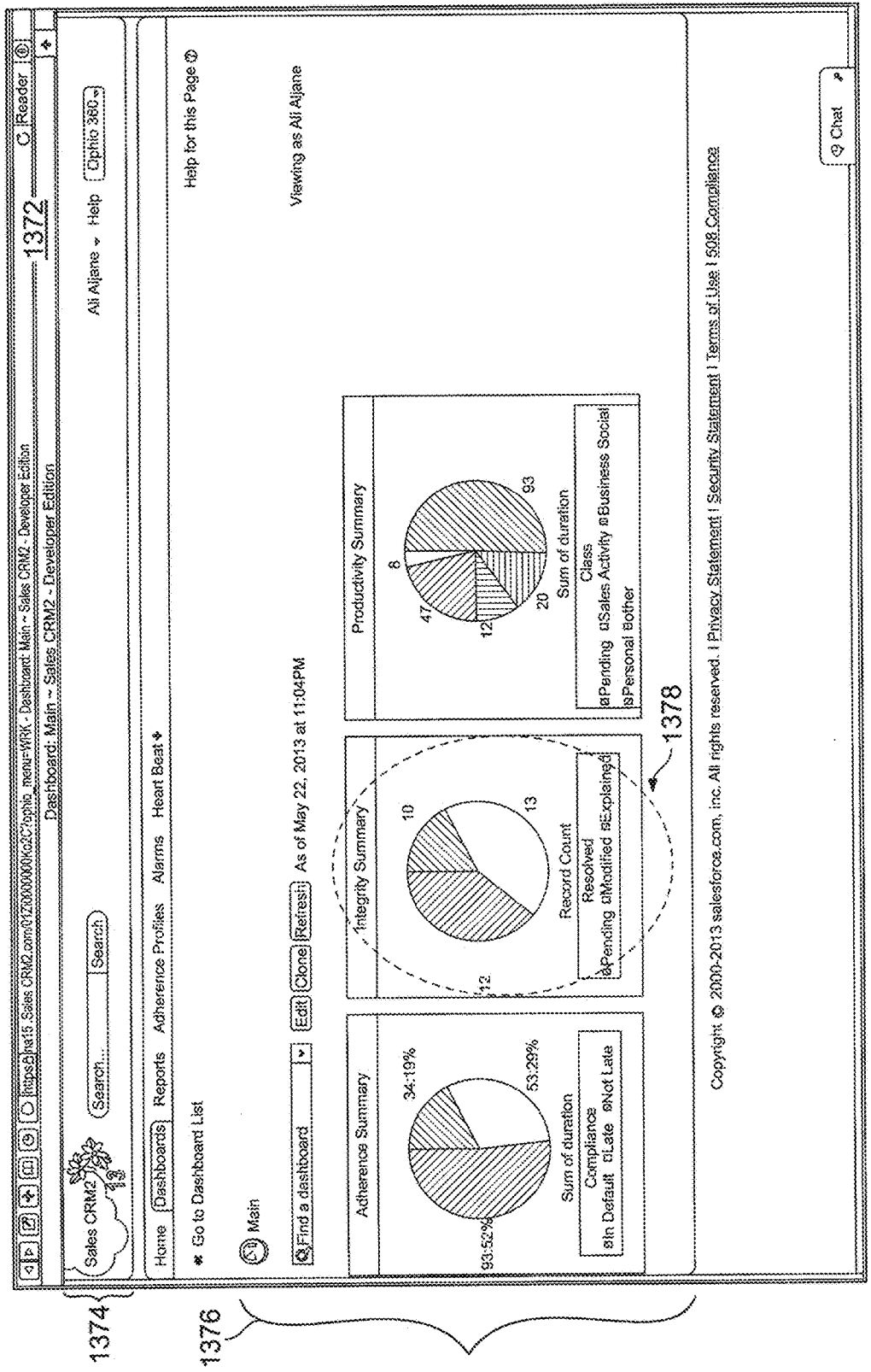
Figure 13H:
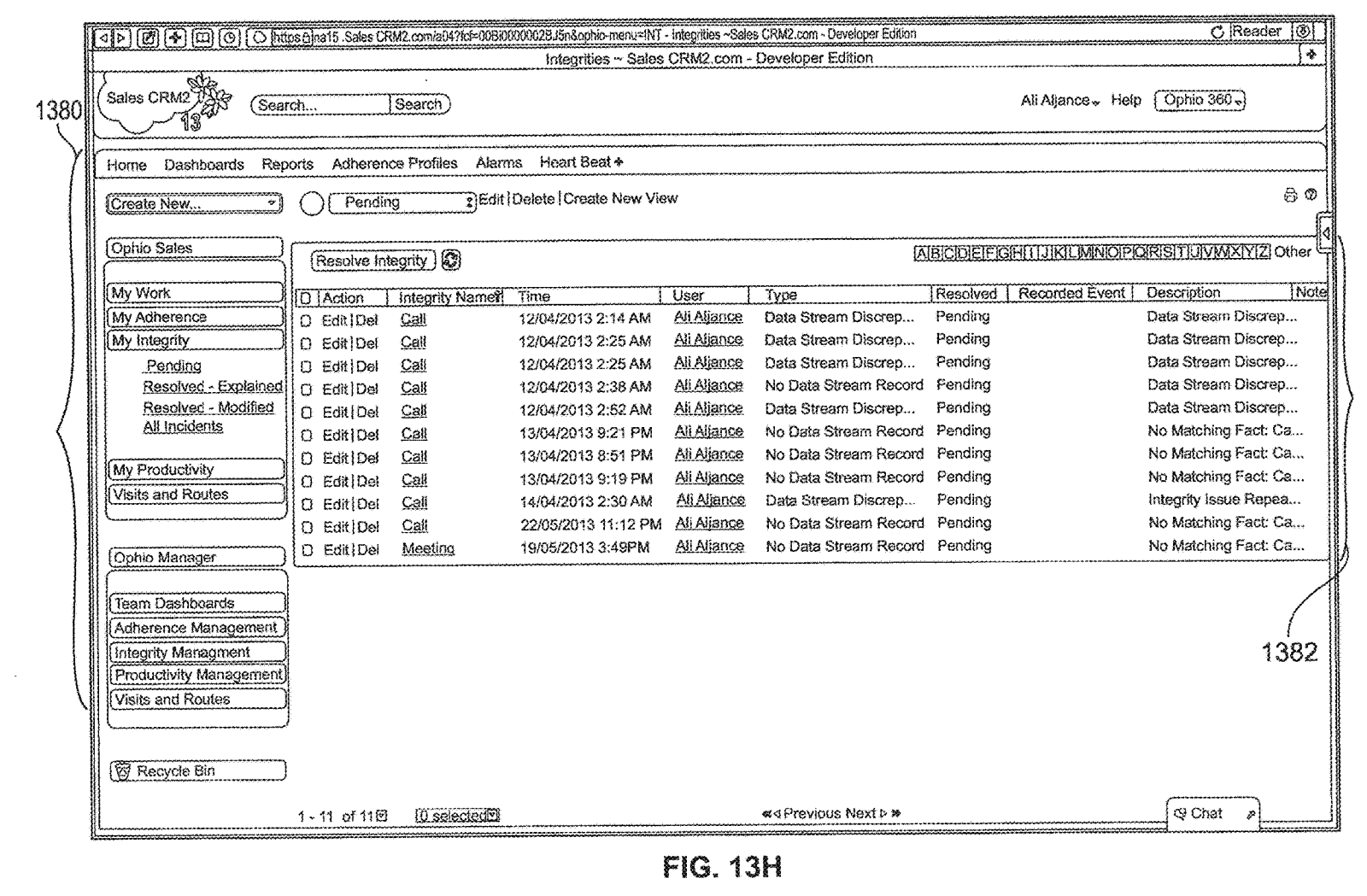

FIG. 13B is another flowchart illustrating an exemplary set of integrity incident resolution mechanisms. At 1322, the user selects and integrity event to process from their integrity—four or one of their integrity event lists or by clicking on a link included in the notification all the integrity event sent to them in their data feed or email or SMS text message. At 1326, the user has the option to delete the self-reported event that triggered the integrity incident. At 1328/1330, if the user chooses to delete the self-reported event that triggered the integrity incident, then that self-reported event is deleted and the integrity incident record is marked as "Resolved." At 1332/1334/1336, if the user chooses not to delete the self-reported event that triggered the integrity incident but to modify it instead, then modification is entered and the integrity incident identification mechanism's process (in FIG. 13A) is repeated. At 1338/1340/1342, if the user chooses not to delete the self-reported event that triggered the integrity incident and does not modify it, the user is provided with an opportunity to enter an explanation that will be appended to the incident record that will be sent to the manager. The user interface provides a form for the user to enter that explanation. Once appended with that explanation, the integrity incident is marked as "EXPLAINED PENDING MANAGER APPROVAL." At 1344/1346, if the manager approves the explanation, then the Integrity Incident is marked as "Resolved By Explanation." At 1348, if the manager does not approve the explanation then the integrity incident record is reset to its original state as set forth in connection with FIG. 13A.

Figure 14A:
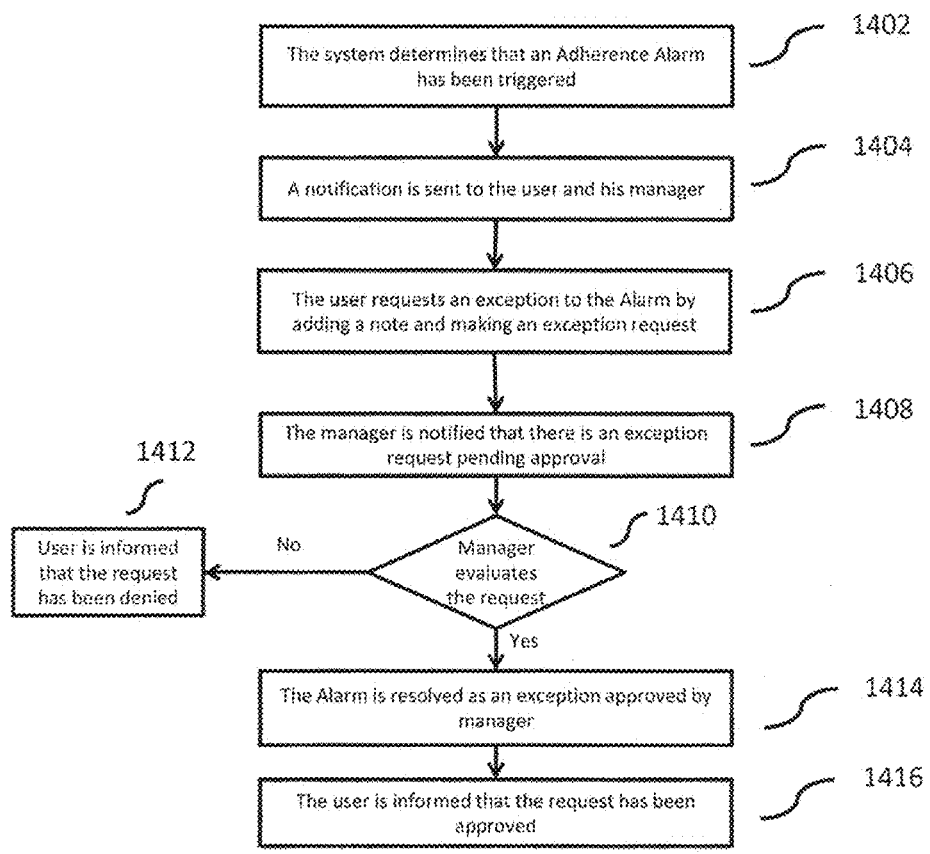
Figure 14B:
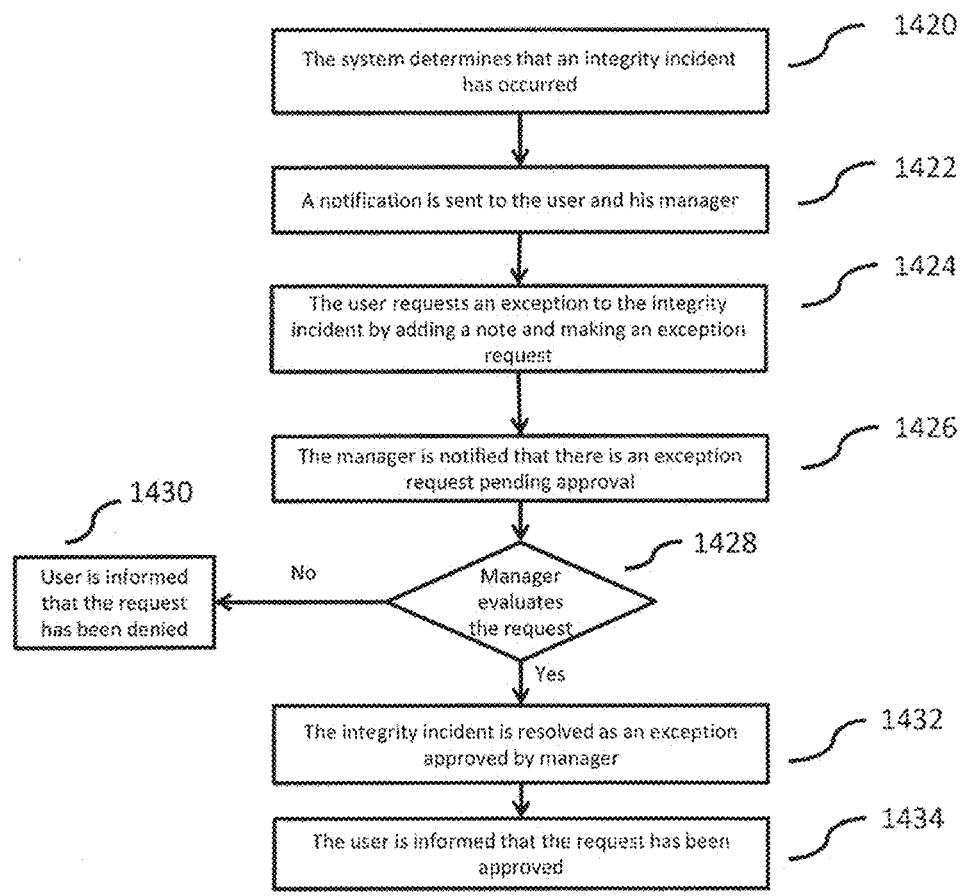

FIGS. 14A-14B are flowcharts of illustrative processing consistent with certain aspects related to the innovations herein. In the adherence alarm exception request processing of FIG. 14A, at 1402, the system determines that an Adherence Alarm has been triggered. The Adherence Alarm occurs when a user fails to follow company policy for example if a phone call from a lead is not classified within 24 hours, an Adherence Alarm will be created. At 1404, a notification can be sent to either the user or the user and his manager depending on the user's profile configuration. At 1406, when the user reviews the alarms that he has triggered (either by navigating to the appropriate tab on the CRM or mobile client or by receiving a specific Adherence Alarm. The user may submit a request that an exception be made because there is a valid explanation. The user must enter the reason and request that the manager review the request. The user may submit the request through the User interface or mobile client. At 1408, when the manager receives the exception request, he must review the request and decide whether or not to accept the user's reasoning. If the manager does not respond to the request in the timeframe specified in his profile, the manager will receive notifications that the exception request is pending. At 1410, the manager can decide to approve or reject the request at his discretion but the record remains in the database. At 1412, if the manager rejects the explanation the record of the alarm stands. At 1414, if the manager accepts the users request the Alarm record is closed with an exception approved by manager and this will not appear in the alarm reports. At 1416, the user is informed that the request was accepted and no further action is required.

Referring to the integrity incident processing of FIG. 14B, at 1420, the system determines that an integrity incident has occurred. The integrity incident occurs when user reported data is in conflict with machine reported data. For example an integrity event can be due to the user reporting a call to an opportunity but the call was made from a 3rd party phone or the user reported a site visit duration of an hour when the geo-location data reports that the visit was actually only 30 minutes. At 1422, a notification can be sent to either the user or the user and his manager depending on the user's profile configuration. At 1424, when the user reviews his assigned incidents (either by navigating to the appropriate tab on the CRM or mobile client or by receiving a specific integrity incident notification. The user may submit a request that an exception be made because there is a valid explanation. The user must enter the reason and request that the manager review the request. The user may submit the request through the User interface or mobile client. At 1426, when the manager receives the exception request, he must review the request and decide whether or not to accept the user's reasoning. If the manager does not respond to the request in the timeframe specified in his profile, the manager will receive notifications that the exception request is pending. At 1428, the manager can decide to approve or reject the request at his discretion but the record remains in the database. At 1430, if the manager rejects the explanation the integrity event stands but the user can still resolve the integrity event in the usual manner described in FIG. 13B. At 1432, if the manager accepts the user's request the incident is closed with an exception approved by manager and this incident will not trigger alarms or notifications and will not appear in integrity reports as an integrity event. At 1434, the user is informed that the request was accepted and no further action is required.

Figure 14C:
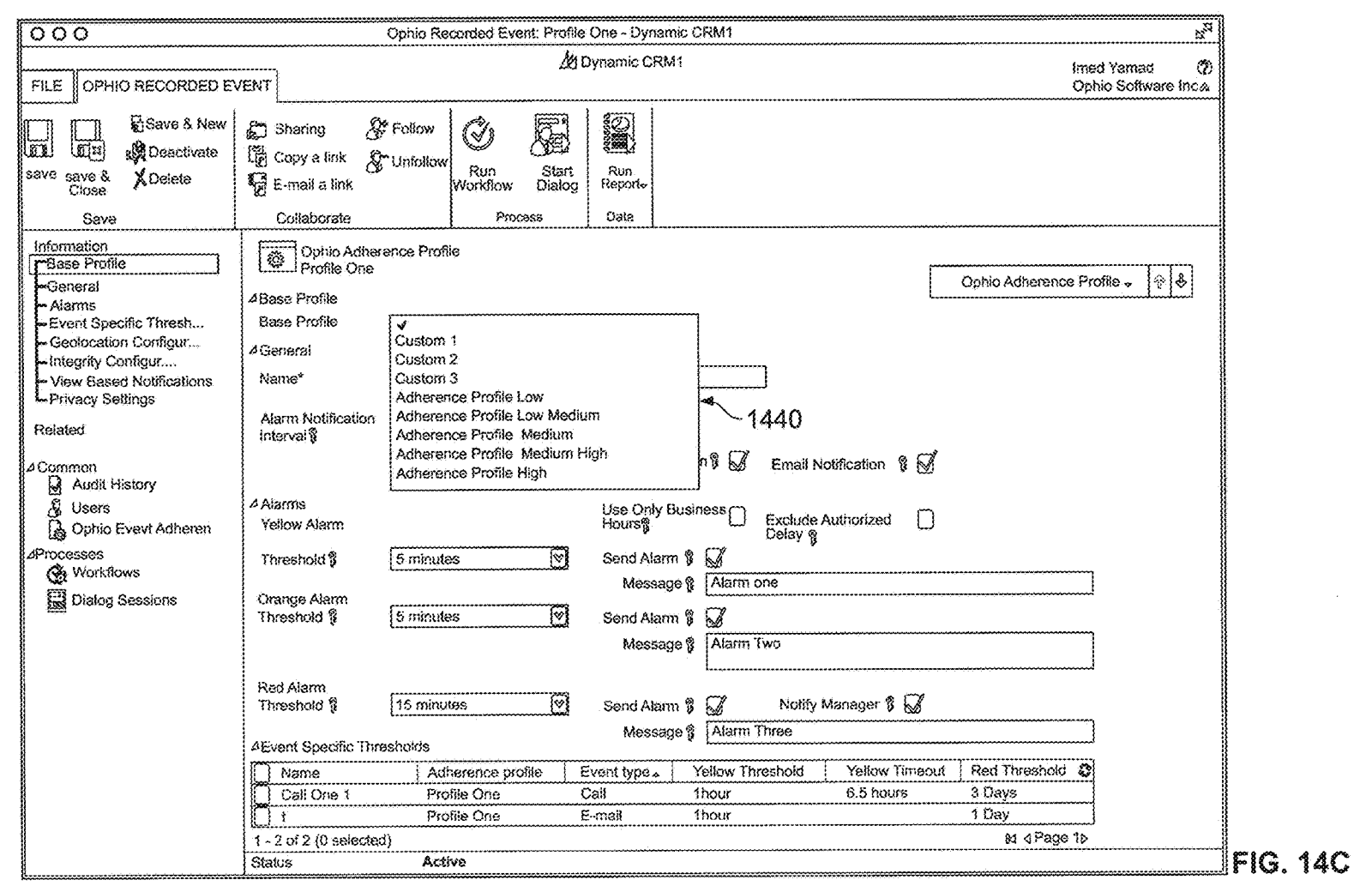

Systems and methods herein may also be configured with mechanism for notification management. FIG. 14C illustrates an exemplary user interface showing adherence policy features and functionality. In some implementations, systems may be configured with 5 default adherence profiles, though systems are also configurable to customize those 5 policy adherence profiles or add an unlimited number of additional custom policy adherence profiles, at 1440. An aspect of such policy adherence profiles is to define the quantity and types of alerts that are escalated to the manager. A policy adherence profile is a defined set of configurations of the policy definition, escalation and notification processes, which determine the quantity and variety and velocity of notifications that will be sent to the manager. Each of these policy adherence profiles elicit different triggers for alerts and different frequencies for notifications and alarms. A policy adherence profile can include all of the configuration options referenced herein and can be applied in defined circumstances including by named employee, by named prospect or customer, by event type, by opportunity type/size, by total historical customer value, by immediate and long-term opportunity value and many other parameters.

In the illustrative (default) implementation, a first default policy adherence profile essentially turns off the alarms and notifications. The user can view dashboards at his leisure to verify his assumptions about his progress. The system then acts as a tool that is used by the user to increase awareness and help in the sales process but it does not continually alert the user or the manager of the tasks that need attention. Here the system is restricted to being a tool to advise users of events rather than a method to monitor and to control their compliance with policies on how those events should be followed up on. The manager will nevertheless be capable of accessing data generated or aggregated by the system as well as access the tools based on that data. The second default policy adherence profile turns off the notifications to the manager but leaves the rest of the system processes for adoption enforcement and facilitation, integrity management and productivity analysis in place. Here the manager will periodically rely on reports to understand and evaluate user adoption, integrity and productivity but will not manage user activity on an event-by-event basis. Each of the remaining profiles sequentially increases the number of triggers for manager and/or user notifications; reduces or increases the time duration interval for a notification to be initiated; and reduces or increases the frequency of user and manager notifications. The last profile has the greatest number of alarm and notification triggers. Users and managers are prompted at shorter intervals throughout the day as to how many tasks require completion. Managers receive updates throughout the day providing many more details about the user activities, adherence delays and generated integrity issues. Here the application is used primarily as a tool to consistently manage users activities and compliance and enforce company policies regarding every event.

An administrator or manager can apply each of the 5 policy adherence profile levels in their default state or they can be modified for a particular circumstance as noted above or for all instances in which the profile has been applied. As the manager uses the system and becomes more aware of which notifications he wishes to receive and how often he wishes to receive the relevant notifications, the manager can modify which modified or unmodified policy adherence profiles should apply in each circumstance. The adherence profile definition can also leverage and be based on the data views available in the SFA/CRM. These data views provide a flexible and powerful method to further define the criteria and conditions that will trigger notifications and alarms. (For example, a manager can choose to use a system data view to filter all the opportunities with an estimated closing date for the current quarter and an estimated deal value that is greater than one million dollars in order to have greater insight and enforce alarms and notifications on those specific opportunities).

Figure 15:
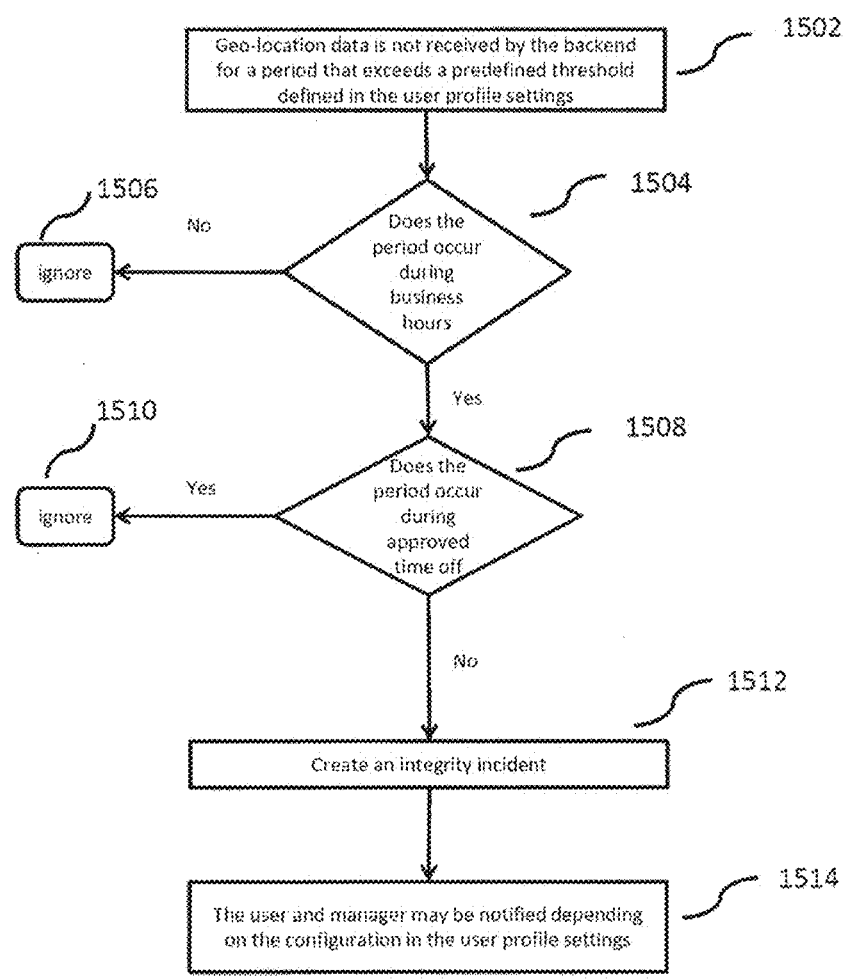
FIG. 15 is a flowchart of illustrative privacy management processing consistent with certain aspects related to the innovations herein.

Systems and methods herein may also include privacy management mechanisms. Here, for example, implementations may have a mechanism to identify when a geo-location device has gone silent. There are many possible reasons that this may occur: no cellular service, travel on an airplane or if a user opts to disable geo-location tracking. Referring to the exemplary process regarding such situations shown in FIG. 15, at 1502, the server detects that a user's geo location device has stopped transmitting for a period that exceeds a predefine threshold. At 1504, the system evaluates if this incident happened during business hours for example between 9 am and 5 pm. At 1506, if not during business hours this incident is ignored. At 1508, the system evaluates if this incident happened during approved time off, for example a sick day. At 1510, if the incident occurred during an approved time off this incident is ignored. At 1512, if the incident occurred during business hours and not during an approved time off than an incident is created. At 1514, depending on the user profile a notification may be sent to the user and/or his manager.

Figure 16A:
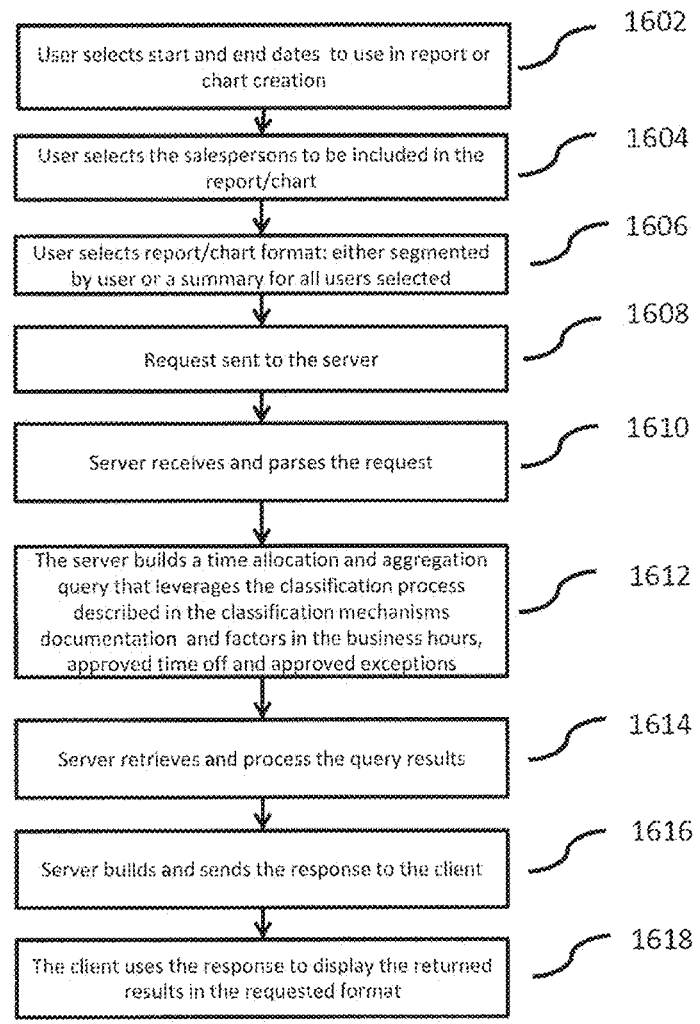
FIGS. 16A-16F are flowcharts and illustrative user interface implementations showing time allocation and productivity analysis processing consistent with certain aspects related to the innovations herein.
Figure 16B:
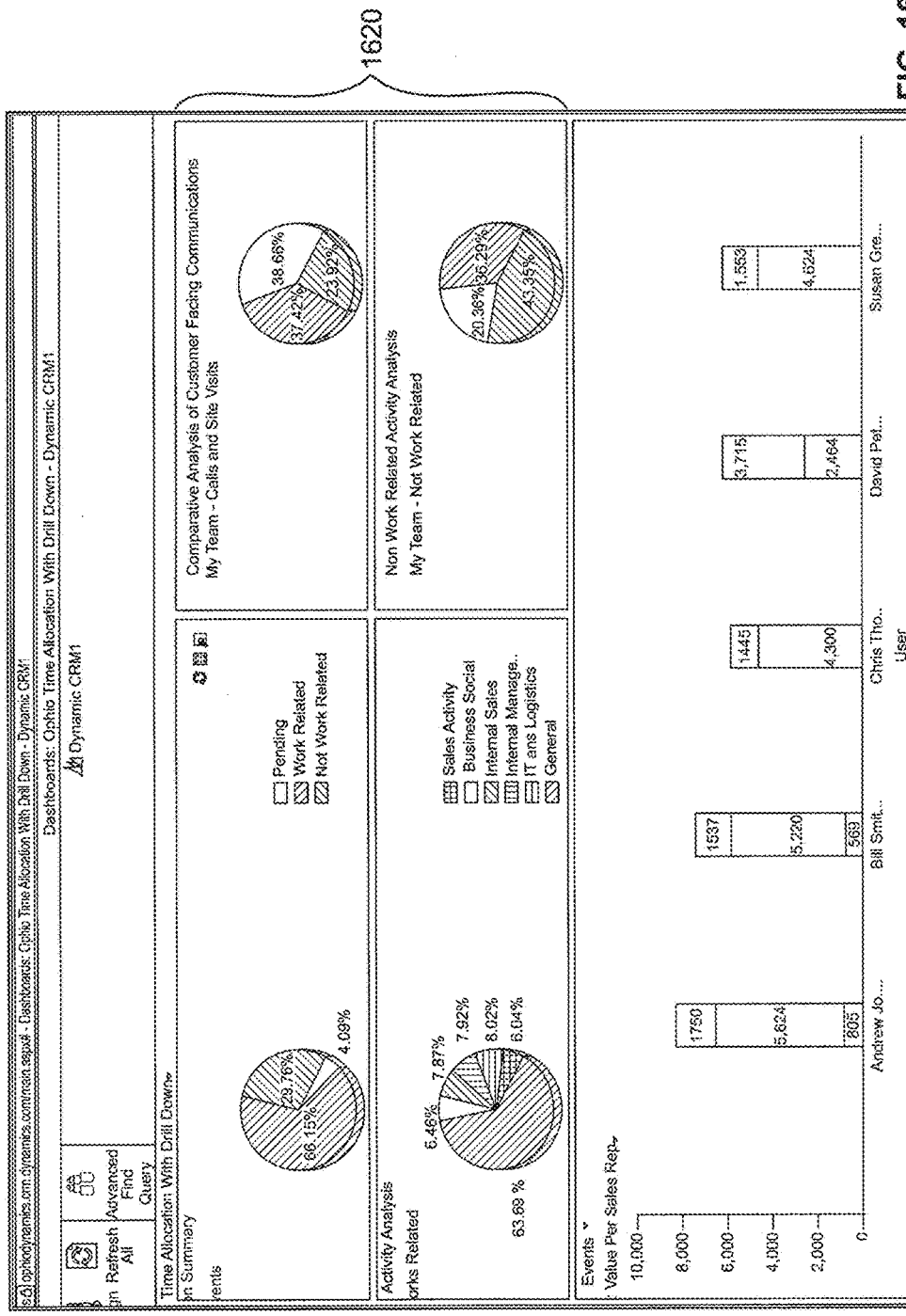
Figure 16C:
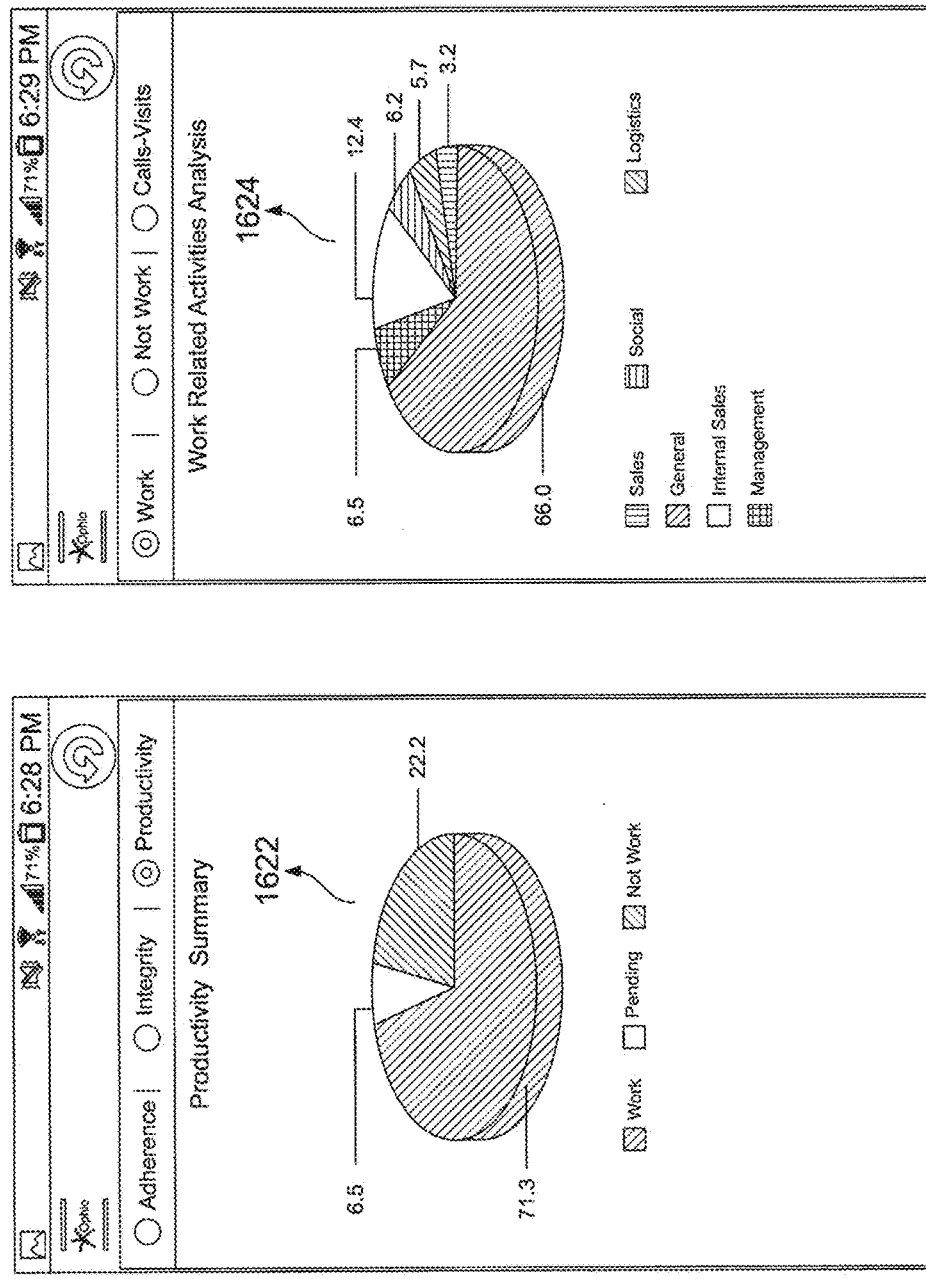

FIGS. 16A-16F are flowcharts and illustrative user interface implementations showing time allocation and productivity analysis processing consistent with certain aspects related to the innovations herein. The User interface can produce a visual representation of time allocation and user productivity analysis. This can be represented as a summary or broken out by user. Referring to FIG. 16A, at 1602, in the user interface or mobile client the user must enter a valid start and end date to include in the report or chart. At 1604, the user may select which users or groups of users to include in the report or chart. At 1606, the user selects whether to view the report as a summary or broken down in a number of ways including but not limited to: by user, by time, by customer facing activity, by work related or not work related activities. Here, see FIG. 16B. At 1608, the client sends a request to the server. At 1610, the Server receives and parses the request. At 1612, the server builds a query that will return the results that show how the user has spent his time. This "time allocation and aggregation query" leverages the classification process (described in step 2 and related flowcharts and figures of this document) the query factors in the business hours, approved time off and approved exceptions. At 1614, the server retrieves and processes the query results. At 1616, the server builds a response and sends it to the client. At 1618, the client receives the response from the server and displays the results in the requested format (ex. Charts, reports, etc. See FIGS. 16B and 16C.

Figure 16D:
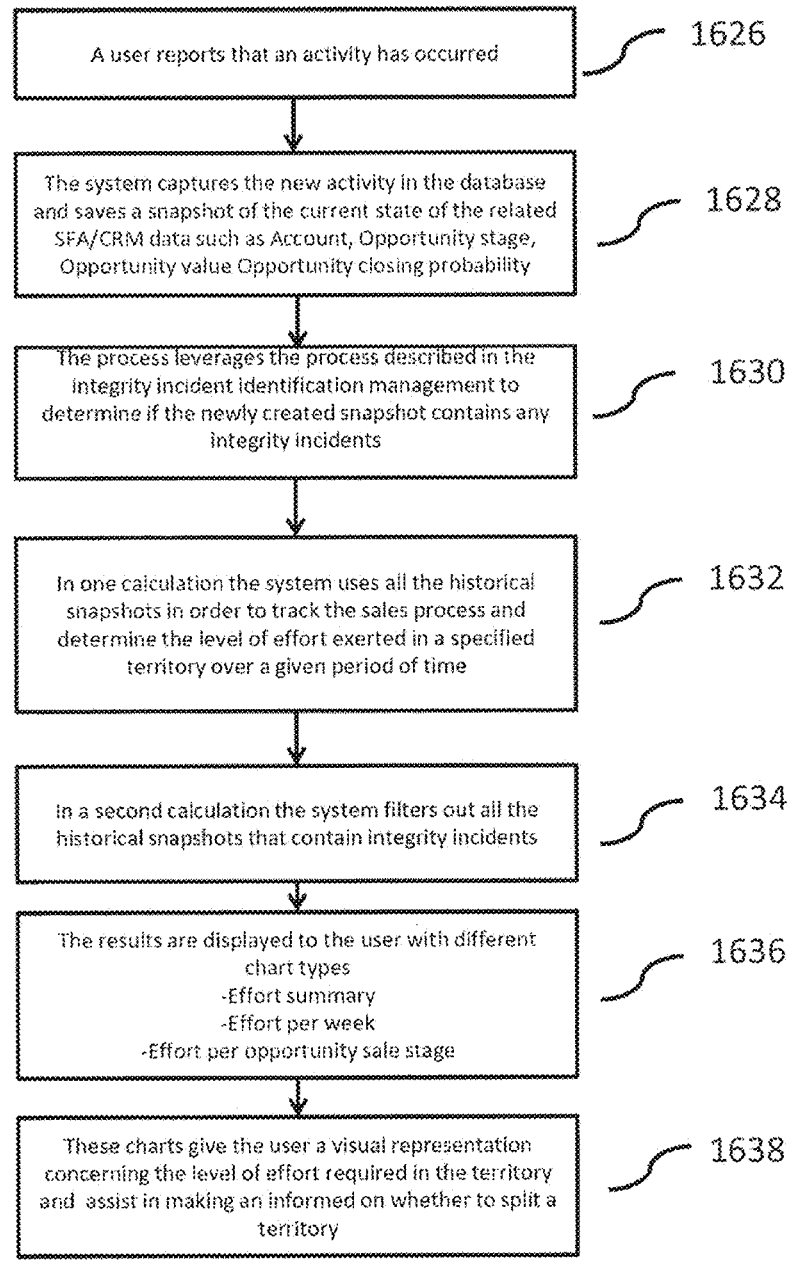
Figure 16E:
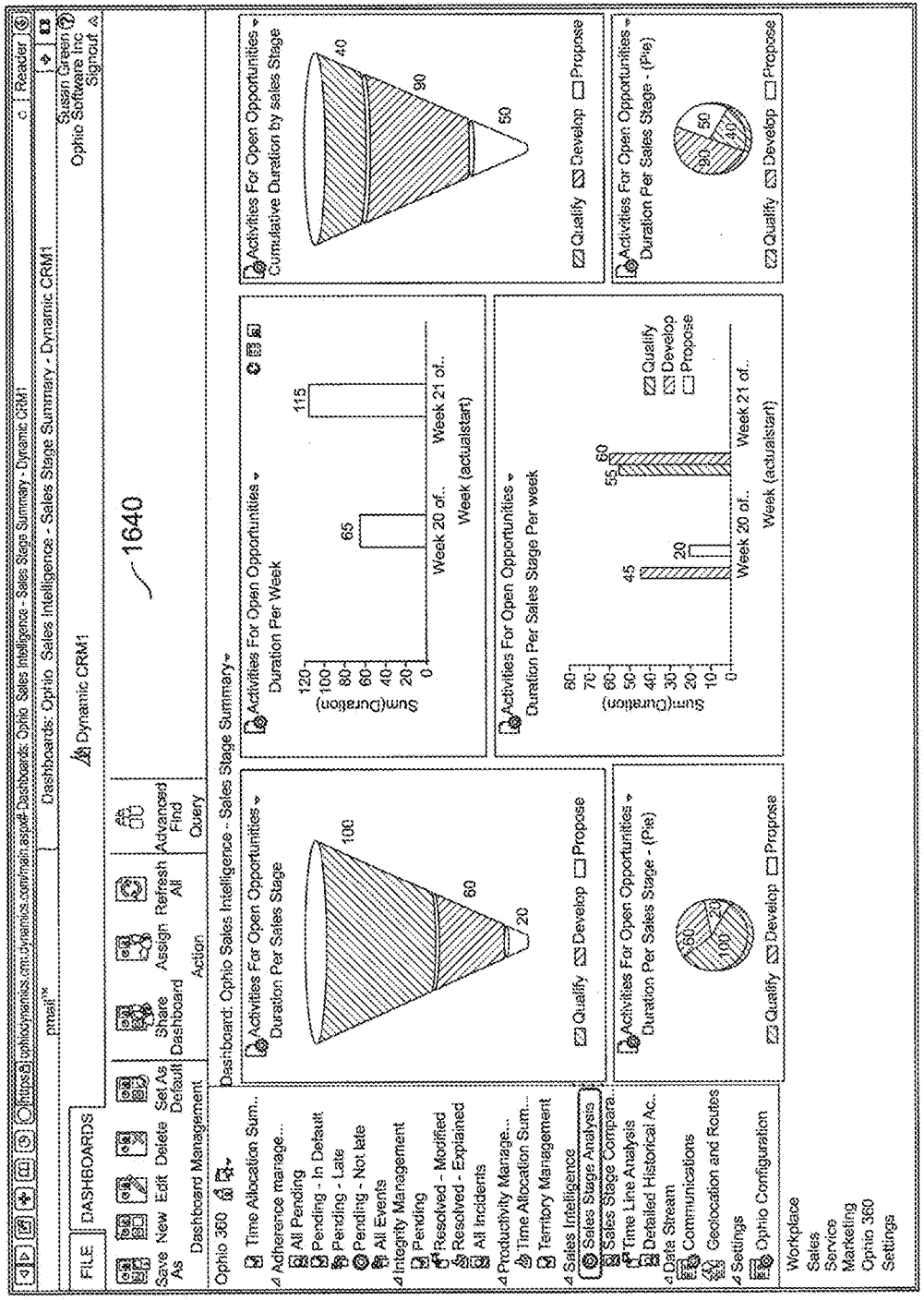
Figure 16F:
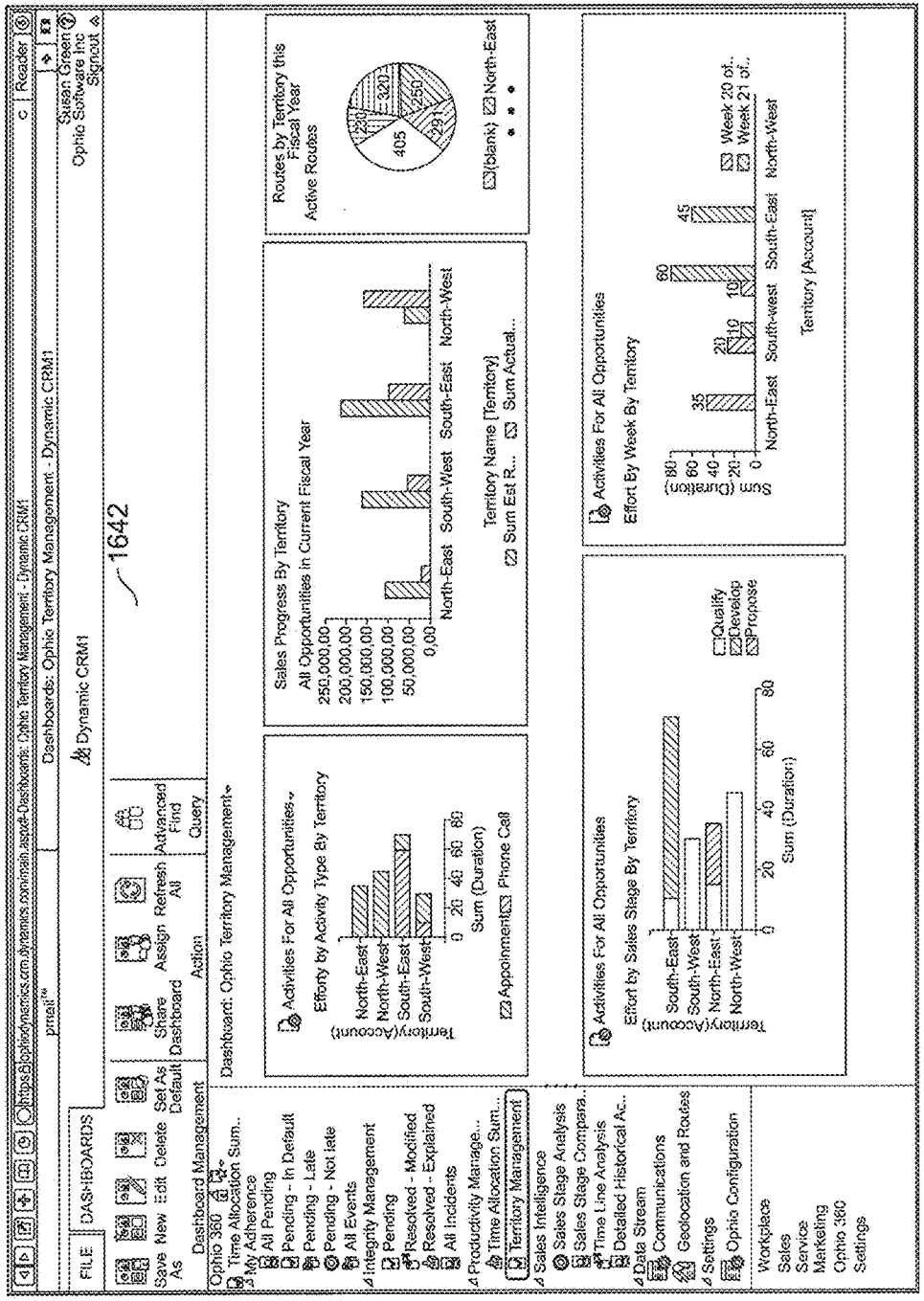

Referring to FIG. 16D, in order to bring objectivity to the process of territory management for sales teams, the system tracks the effort required by users to make quota. At 1626, a user can report that an activity has occurred through the User interface or mobile application. At 1628, the system captures the new activity in the database and saves a snapshot of the current state of the related SFA/CRM data such as Account, Opportunity stage, Opportunity value and Opportunity closing probability. This snapshot is saved in a database for later comparison to identify trends and activities taken or not taken by the users. At 1630, this process leverages the "integrity incident identification management" process in Step 5 to determine if the newly created snapshot contains any integrity incidents. Integrity incidents are observed when user reported data is in conflict with machine reported data. At 1632, the system presents the user with multiple graphical charts in order to provide a more accurate view to the data and level of effort required by a salesperson to reach quota. In the first calculation the system uses all the historical snapshots in order to track the sales process and determine the level of effort exerted in a specified territory over a given period of time. At 1634, in the second calculation the system filters out all the historical snapshots that contain integrity incidents, the two charts are placed side by side in order to present the user a clear picture of how much the integrity incidents have affected productivity, time allocation and sales. At 1636, the results are displayed to the user with different chart types such as Effort Summary, Effort per Week and Effort per Opportunity Sale Stage in order to present a fuller view of the user's efforts and how they are affected by different variables. See FIGS. 16E and 16F. At 1638, once the user has verifiable data that can objectively assess the level of effort a better decision can be made whether or not to split the territory. These charts give the user a visual representation of the aforementioned verifiable objective data and the level of effort required in the territory.

Various innovations contained herein in the area of forecast analysis are different from all existing alternatives in one or more of three key respects. First, analysis herein relies on machine data. Second, it does not use any user-entered data other than the data classification mechanisms outlined above (any subjective perceptions of the user are excluded). Third, the approach to analyze and remove opportunities from the sales pipeline rather than finding the ones to include in it. As such, it functions more as a 'last step filter' of the sales pipeline. An approach of innovations herein is to introduces a fact-based dimension to sales pipeline analysis that reviews the opportunities placed in the pipeline by salesperson or manager instinct or by other analytics products. Since user-defined events are generally incomplete and often inaccurate, this approach is far more effective when the data is machine-generated. This fact-based method tracks the relevant events for each opportunity at stage in the sales process. Examples of fact based dimensions may be: Incoming Call for Sales Stage 1, Incoming Calls for Sales Stage 1, On Site Visits for Sales Stage 1 and Emails for Sales Stage 3. The set of all the possible fact-based dimensions defines the canonical vector base. The canonical vector base permits to express all the efforts in term of duration in time for all the stages of a given opportunities. The set is said to be canonical because it is a complete and minimal. The canonical vector base is used to represent all the activities, based on machine data recording, for a given opportunity. For example, giving the following subset of the fact based dimensions: Incoming Call Stage 1, Incoming Call Stage 2, Outgoing Call Stage 1, Outgoing Call Stage 2 the expression (30,20,15,43) represents an activity where the system has tracked a total of 30 minutes of Incoming call at sales stage1, 20 minutes of Incoming calls at sales stage 2, 15 minutes of Outgoing Calls at Sales Stage 1 and 43 minutes of Outgoing Calls for Sales Stage 2.

The innovations herein may include algorithms that uses the canonical vector base to build a multi-dimensional decision matrix. The matrix represents a set of closed opportunities for which the ultimate historical results in term of loss or won outcomes are known. A given matrix will include only opportunities that the system determines to be similar from a given perspective, which is correlated to a customizable set of data attributes. Concretely, this algorithm introduces the concept of Context Dimension. A Context Dimension is defined by conventional SFA/CRM attributes used to describe opportunities including but not limited product type, customer size, opportunity size, seasonality, etc. For every attributes the algorithm defines certain a class of measure. For example, opportunities that have an estimated value that between 900K dollars and one millions dollars can be considered as the same class of estimated value. A Context dimension is then expressed in term of series of attribute classes. To achieve consistency this decision matrix will include opportunities that have the same value for the context dimensions. In other words, the decisions matrix includes opportunities that have certain similar attributes. This multi-dimensional decision matrix can be thought of as means to give a spatial representation of the effort that has been exerted for every opportunity of in a given set of selected opportunities. Once the similar opportunities are entered in the decision matrix, the algorithm determines proximities of loss and proximities of win. A proximity of a win is characterized by the presence of multiple "won opportunities" that are very close to each other. In contrast, A proximity of a loss is characterized by the presence of multiple lost opportunities that are very close to each other. The algorithm introduces two more concepts: distance between opportunities and distances between an opportunity and a given proximity.

Figure 17:
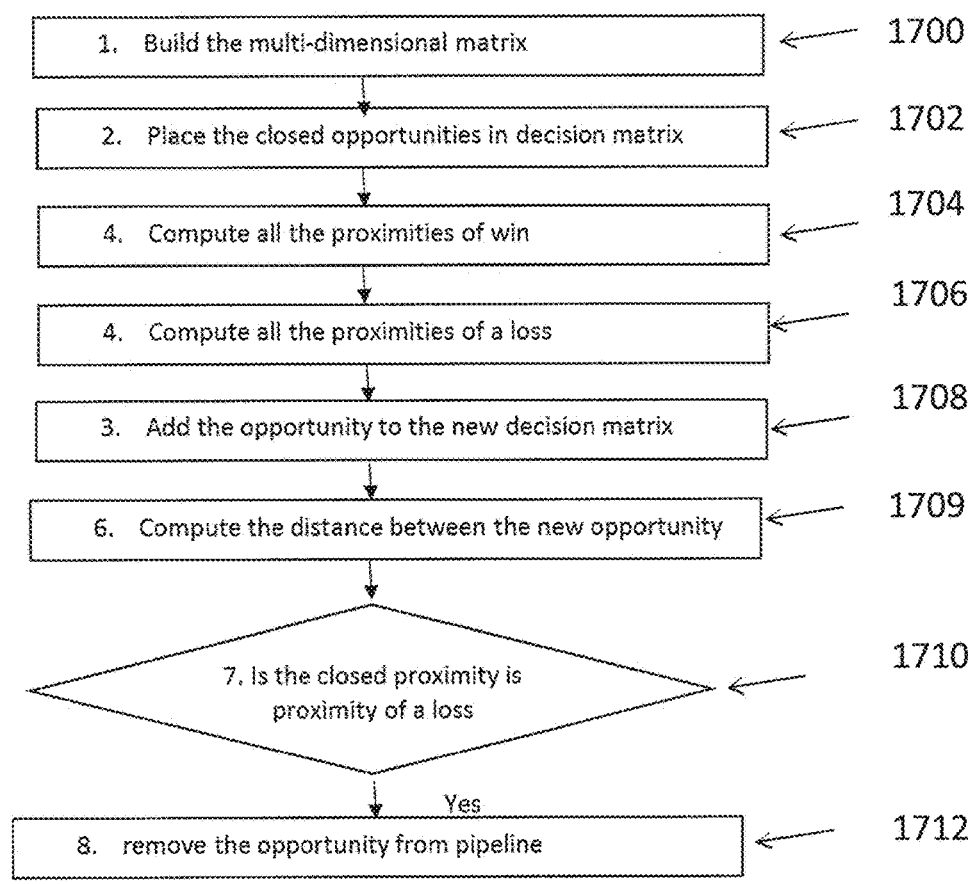
FIG. 17 is a flowchart of an illustrative pipeline filter process consistent with certain aspects related to the innovations herein.

The distance between two opportunities is measured as the square root of the sum of all the square value of the difference of efforts on each fact based dimensions. The distance between a given opportunity and a given proximity is the mean average of the distances of the given opportunity to all the opportunities that belong to the given proximity. Referring to FIG. 17, an exemplary algorithm may executes the following steps to determine if an opportunity should be removed from the pipeline or not: building the multi-dimensional matrix 1700, placing the closed opportunities in decision matrix 1702, computing all the proximities of a win 1704, computing all the proximities of a loss 1706, adding the opportunity to the new decision matrix 1708, computing the distance between the new opportunity and all the proximities 1709, checking if the closed proximity is a proximity of a loss 1710, and if the closed proximity is classified as a proximity of a loss then it removes the opportunity from the pipeline 1712.

Additionally, the innovations herein may be achieved via implementations with various software, hardware and/or firmware components. With regard to such other components (e.g., software modules, computing/processing components, etc.) and/or computer-readable media associated with or embodying the present inventions, for example, aspects of the innovations herein may be implemented consistent with numerous general purpose or special purpose computing configurations. Various exemplary computing systems, environments, and/or configurations that may enable or be suitable for use with the innovations herein may include, but are not limited to: various software or other components within or embodied on smart phones or other PDA devices or personal computing components, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the innovations herein may be achieved via logic and/or logic instructions including program modules, executed in association with the circuitry, for example. In general, program modules may include routines, programs, objects, components, data structures, etc. that perform particular tasks or implement particular instructions herein. The inventions may also be practiced in the context of distributed circuit settings where circuitry is connected via communication buses, circuitry or links. In distributed settings, control/instructions may occur from both local and remote computer storage media including memory storage devices.

Innovative software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD- ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules or other data embodying the functionality herein. Further, communication media may include wired media such as a wired network or direct-wired connection, and wireless media such as acoustic, RF, infrared and other wireless media. Combinations of the any of the above are also included within the scope of computer readable media.

In the present description, the terms component, module, device, etc. may refer to any type of logical or functional circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive) to be read by a central processing unit to implement the functions of the innovations herein. Or, the modules can comprise programming instructions transmitted to a general purpose computer or to processing/graphics hardware. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level of performance and cost.

As disclosed herein, features consistent with the present inventions may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of code structures or circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media), though do not encompass transitory media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the present inventions. Accordingly, it is intended that the invention be limited only to the extent required by the applicable rules of law.

The invention claimed is:

1. A computer-implemented method of facilitating user data entry in a sales force management system, the method comprising:
   detecting, via one or more connectivity components, and sending, to at least one computer, an event of a mobile device associated with a user of the sales force management system, wherein the sales force management system having user specific or other relationship information;
   collecting machine data associated with the mobile device for the user;
   cross-referencing contact, lead or account information in the sales force management system with the machine data;
   analyzing, via the at least one computer, the machine data to determine an event potentially requiring user input;

transmitting a notification to the mobile device to provide the user input for the event requiring user input;

providing the user with follow-on workflow notifications related to the analyzed machine data associated with the sales force management system; and processing information to provide options or suggestions to the user, including auto-populated data fields, in a graphical user interface (GUI) with selected graphical follow-on data entry options associated with the sales force management system, wherein at least one option or suggestions includes data provided into the auto-populated data fields derived from the analyzed machine data;

wherein data in the sales force management system is used to perform processing regarding:

an initial transmission to the mobile device based on the analyzed machine data, the initial transmission a updating an application installed on the mobile device that displays data regarding the workflow or graphical information corresponding to the analyzed machine data;

a graphical user interface, for transmission to and display on the mobile device, the graphical user interface configured to display and update the data in response to the analyzed machine data associated with the mobile device; and graphical indicia including information about the analyzed machine data that is transmitted and displayed on the mobile device, the graphical indicia comprising interactive graphical elements regarding which the user may interact with to provide one or more of the follow-on data entry, follow-on workflow, or suggestions to the user.

2. The method of claim 1, further comprising:
identifying inaccurate user input based on cross-referencing the machine data associated with the user against data entries provided by the user via the user input.

3. The method of claim 1, further comprising:
generating automated warnings for non-compliance in providing the required input based on exceeding an elapsed time threshold.

4. The method of claim 1, further comprising:
generating historical reports of conflicts between the machine data associated with the user and data entries provided by the user via user input.

5. The method of claim 1 further comprising:
classifying data events related to analysis or processing of information in the sales force management system, including:
  processing event data of a user to generate visual data objects representing the event data in a graphical user interface (GUI), the visual data objects incorporating options for follow-up user input and classification selections configured to provide added context to the data object from the user via the GUI;
  adding additional information to the event data based on the follow-up user input or the user's classification selections;
  automatically classifying workflow established for further action the sales force management system as a function of a classification selection that is:
    provided previously by the user and stored in a database; and
    determined as having an associated follow-up action within the sales force management system by correlating one or more attributes of the event data with relationship data contained in the sales force management system; and
    processing information to provide auto-populated data fields in the actionable workflow within the sales force management system, the data provided into the data fields being derived from the event data.

6. The method of claim 5, wherein the machine data includes an identifier and geo-location data from a third party system and a user device, or phone calls or text messages or emails.

7. The method of claim 5 further comprising:
classifying the event data into event classes, each event class being characterized by subsequent processing or related workflow associated therewith in the sales force management system.

8. The method of claim 5 further comprising:
defining, by configurable options available in the GUI, event classification information including classes that the user may select or the actionable workflow associated with the event classes in the sales force management system.

9. The method of claim 5 wherein the GUI provided to the user includes a classification option for classifying events with a default selection for non-work-related events, wherein future non-work-related events associated with a same entity/event are automatically classified with the default selection.

10. The method of claim 9 wherein the entity is identified by phone number, geo-location or email address.

11. The method of claim 5 further comprising:
initiating the actionable workflow in the sales force management system for the classification selections requiring the follow-up actions and associated auto-populating data fields from the event data.

12. The method of claim 5 further comprising:
performing user sales productivity analysis using event data and event classification data, such analysis including performing self-assessment, user comparative assessment, manager/employee assessment or sales territory analysis.

13. The method of claim 12 wherein assessments are derived from cross-referencing user productivity data against a defined set of performance indicators, which are defined by the user, the manager or by a historical model created by aggregating and analyzing the event data of salespeople who are successful in selling a particular product, service, or set of products or services.

14. The method of claim 12 wherein the performing of the user sales productivity analysis includes assessing the quantity and duration of salesperson activities.

15. The method of claim 12 further comprising:
assessing a potential sales opportunity based on the productivity analysis for that potential sales opportunity and correlating that analysis to a historical analysis of successful sales outcomes for a user or group of users and the productivity data associated with those successful sales outcomes.

16. The method of claim 12 further comprising:
forecasting sales revenue based on the sales productivity analysis and its correlation to a historical analysis of successful sales outcomes and their associated productivity data.

17. The method of claim 12 wherein the sales productivity analysis comprises territory analysis, and further comprising:
assessing sales territory configuration based on the sales productivity analysis.

18. The method of claim 5 further comprising monitoring elapsed time to completion of classifying the visual data indicia or completing the actionable workflow within a sales force management system.

19. The method of claim 5 wherein an action for which user adoption is requested, including data entry or classification of visual data indicia, is definable as a function of each event type.

20. The method of claim 5 further comprising:
performing user sales productivity analysis including automated user comparative assessment; and
providing, as a function of the automated user comparative assessment, a notification to a manager regarding a failure to meet a productivity target.

21. The method of claim 5, further comprising:
providing user interface functionality including a selection, wherein the event data may be classified as work-related or non-work-related.

22. The method of claim 21, wherein the event data is further classified into sub-categories within the work-related and the non-work-related classifications.

23. The method of claim 1, further comprising:
cross-referencing data entries provided by the user with factual event data streams associated with the user to identify missing event data classifications or user data entries in the sales force management system; and
providing a notification or alarm regarding any of the missing user data entries identified.

24. The method of claim 1, further comprising:
cross-referencing data entries provided by the user with factual event data streams associated with the user to identify inaccurate user data entries; and
providing a notification or alarm regarding any of the inaccurate user data entries identified.

25. The method of claim 1, further comprising:
determining a discrepancy between the event data and the user input;
transmitting notification to the user relating to the determined discrepancy;
processing a user explanation of the determined discrepancy; and
determining by a manager regarding whether or not the user should be deemed compliant regardless of the discrepancy with the event data.

26. The method of claim 1 further comprising one or more of:
aggregating the event data;
classifying the event data;
determining the event data requiring user input; and
transmitting notification to provide the user input for the event data.

27. The method of claim 1 further comprising:
capturing a mobile phone call or SMS; and
transmitting information regarding the mobile phone call or SMS to a server.

28. The method of claim 27 wherein the information comprises a call detail record (CDR).

29. The method of claim 28 wherein the call detail record comprises data including at least one of date, call type, name, outgoing (dialed) number, origination number, or user ID.

30. The method of claim 28 further comprising:
sending the call detail record to the backend server, a SFA server, or a CRM server.

31. The method of claim 27, wherein the event data includes communication information including origination, destination or time duration information.

32. The method of claim 27:
wherein the mobile phone call or SMS is captured via a mobile app resident on the user's mobile device; or
wherein the mobile phone call or SMS is captured via data collected from or transmitted by a third party provider.

33. The method of claim 1 further comprising:
logging into a server associated with the sales force management system from a mobile device;
loading configuration settings from a backend of the server;
loading configuration settings from a mobile application associated with a mobile device of the user; and
registering the mobile app to track machine generated event data regarding call events including at least one of incoming calls, outgoing calls, declined calls, missed calls, incoming SMSes, or outgoing SMSes.

34. The method of claim 33 wherein the machine data is captured via the mobile app, which is resident on the user's mobile device.

35. The method of claim 33 wherein the machine data is captured via data collected from or transmitted by a third party provider.

36. The method of claim 1 further comprising:
collecting, via a mobile app, notification of a new call event; and
performing processing regarding enabling or disabling media tracking.

37. The method of claim 36 further comprising:
performing processing, when the media tracking is enabled, including creating a call detail record (CDR).

38. The method of claim 1 further comprising:
sending, via a mobile app, call detail record(s) comprising one or more of mobile phone calls, SMS, or GPS data to the sale force management system.

39. The method of claim 1 wherein the machine data includes one or more of electronic calendar entries, previous CRM and sales force management system data entries, records of PBX (circuit-switched and packet-switched, directly or indirectly via Presence Manager or other systems that can provide such records) and mobile phone calls made to prospects and customers, emails, SMS messages, chat messages, fax information obtained from fax server, desktop fax software program or from the Call Detail Records ("CDR") of fax lines, credit card transaction data, Wifi and geo-location data.

40. The method of claim 1 further comprising:
aggregating event data of the user on a server;
receiving user input for the event data on a user device via user interface functionality; and
determining a discrepancy between the aggregated event data and the user input.

41. The method of claim 1 further comprising aggregating the event data including collecting or combining the event data.

42. The method of claim 1, wherein event data with common attributes is aggregated over a period of time and grouped into one data event.

43. The method of claim 1, wherein the event data includes geo-location information including time, duration, speed, or accuracy of geographic coordinates.

44. The method of claim 1, wherein the event data includes geo-location information from a Wifi network, a cellular network, or a global positioning system.

45. A computer-implemented method of facilitating user data entry in a sales force management system, the method comprising:

detecting, via one or more connectivity components, one or more mobile phone call or SMS events of a mobile device associated with a user of a sales force management system via a mobile application resident on the user's mobile device or via data collected from or transmitted by a third party provider, and sending, to at least one computer, machine data associated with the mobile device associated with the user of the sales force management system;

collecting a stream of machine generated event data associated with the mobile device for the user;

transmitting machine data information regarding the mobile phone call or SMS to a server;

cross-referencing contact, lead or account information in the sales force management system with the machine data regarding the mobile phone call or SMS event;

analyzing, via the at least one computer, the machine data of the mobile phone call or SMS events to determine a mobile phone call or SMS event potentially requiring user input;

transmitting a notification to the mobile device to provide the user input for the mobile phone call or SMS event potentially requiring user input providing the user with follow-on workflow options or notifications related to the analyzed phone call or SMS events associated with the sales force management system; and processing information to provide the follow-on workflow options or suggestions to the user in a graphical user interface (GUI), including auto-populated data fields with selected graphical follow-on data entry options associated with the sales force management system, wherein information provided into the auto-populated data fields is derived from the analyzed mobile phone call or SMS event data;

wherein data in the sales force management system is used to perform processing regarding:
  an initial transmission to the mobile device based on the processed mobile phone call or SMS event data, the initial transmission updating an application installed on the mobile device that displays data regarding the workflow or graphical information corresponding to the mobile phone call or SMS event;
  a graphical user interface, for transmission to and display on the mobile device, the graphical user interface configured to display and update the data in response to the mobile phone call or SMS event; and
  graphical indicia including information regarding the analyzed mobile phone call or SMS event, for transmission and display on the mobile device, the graphical indicia comprising interactive graphical elements regarding which the user may interact with to provide one or more of follow-on workflow, follow-on data entry and/or suggestions to the user.

46. The method of claim 27 or 45 wherein the mobile phone call or SMS is captured via a presence management system, a mobile phone, an IP Phone service, a computer system, a network, SMS or phone call data from one or more wireless, mobile, or packet switched (VoIP) telephone carriers.

47. The method of claim 45, wherein the event of the mobile device is a mobile telephone call event, further comprising:
  receiving, by a computer, pre-call data associated with the mobile telephone call event from the mobile device of the user, wherein the pre-call data includes at least a telephone number of a second user involved in the mobile telephone call event, and the pre-call data is received before the mobile telephone call event occurs;
  analyzing, by the computer, the pre-call data to identify the second user as a relationship or a collaborator within the process;
  generating, by the computer, at least one relationship management notification based on the identification of the second user; and
  sending, by the computer, at least one generated relationship management notification to the mobile device of the user before the call occurs.

48. The method of claim 47, wherein
the pre-call data is a telephone number of an incoming call received by the mobile device of the user, or
the pre-call data is a telephone number of an outgoing call to be placed by the mobile device of the user, and
the relationship management notification includes an identification of at least one relationship management process associated with the user of the mobile device, a status of the at least one relationship management process, and an identification of the second user as a collaborator or a relationship of the user within the at least one relationship management process.

49. The method of claim 47, wherein the event of the mobile device is a mobile telephone call event, further comprising:
  receiving, by the computer, post-call data associated with the mobile telephone call event from the mobile device of the user, wherein the post-call data includes at least a duration of the telephone call event and a direction of the telephone call event, wherein the post-call data is tracked by the mobile device and received after the call event is terminated;
  analyzing, by the computer, the post-call data to determine at least one relationship management suggestion based on the pre-call data, the post call data, and the at least one relationship management process; and
  sending, by the computer, the at least one generated relationship management suggestion to the mobile device of the user after the call event is terminated.

50. The method of claim 49, wherein
the generated relationship management suggestion is a suggestion for the user of the mobile device to enter user notes for the mobile telephone call event into the at least one relationship management process in the sales force management system,
the generated relationship management suggestion is a suggestion for the user of the mobile device to enter a selection to advance progression within the process, and
the generated relationship management suggestion is a suggestion to for the user of the mobile device to add the second user as a new relationship or collaborator within a second process.

51. A computer-implemented method of facilitating user data entry into a salesforce management system, the method comprising:
  detecting, via one or more connectivity components, the connectivity component connecting a user of the sales force management system and one or more sales force management servers over a network, an event of a mobile device associated with the user of a relationship management system, wherein the relationship management system has user specific relationship information;

collecting a stream of machine data associated with the mobile device for the user, the machine data comprising at least one of the following:
  voice and electronic data communications;
  geolocation data;
  electronic records; and
  records related to origination, destination/termination, user and duration attributes;
classifying event datum including comparing the machine data associated with the mobile device of the user with data in and/or processed by the sales force management system;
transmitting a notification to the mobile device if the classification of the event data requires an additional user input,
providing the user with follow-on workflow options on the mobile device, wherein the mobile device transmits, by the connectivity component, the additional user input to the sales force management system;
processing the event data, based on the classification and the additional user input, to create inputs that the sales force management system can store;
cross-referencing contact, lead or account information in the sales force management system with the inputs created from the event data, wherein a factual discrepancy can be identified and flagged for further review; and
processing the inputs created from the event data to provide auto-populated data fields in a graphical user interface (GUI) in a selected graphical follow-on data entry option within the sales force management system, the data provided into data fields being derived from the event data.

52. The method of claim 51 further comprising
providing a manager with GUI functionality enabling the manager to configure notifications or alerts based on differing variation thresholds of user data entries from the factually accurate data derived from the machine data.

53. The method of claim 51 further comprising:
maintaining both the machine data and a data set adjusted to incorporate circumstances where a manager has deemed a user compliant in contradiction to the event data;
using the adjusted data to provide context to the machine data.

54. The method of claim 51, further comprising:
receiving, by a computer, from the connectivity component, captured mobile phone call data associated with a mobile phone call associated with a user;
determining, by the computer, a relationship management process of the sales force management system associated with the user from the mobile phone call data of the mobile device;
tracking, by the computer, the mobile phone call data within the relationship management process based on analysis of the mobile phone call data; and
generating, by the computer, at least one suggestion based, at least in part, on analysis of the mobile phone call data within the relationship management process.

55. The method of claim 54, wherein the analysis of the mobile phone call data, further comprises:
applying, by the computer, machine learning model analysis to the mobile phone call data to determine a context of the mobile phone call data within the relationship management process.

56. The method of claim 54, wherein the captured mobile phone call data includes at least a time when the mobile call was initiated, a duration of the mobile phone call, a user that initiated the call, and recipient of the call.

57. The method of claim 51, wherein the event of the mobile device is a geolocation event, further comprising:
receiving, by a computer from the connectivity component, pre-visit data associated with the geolocation event coordinates from the mobile device of the user, wherein the pre-visit data includes at least the name of a person or company that the user is visiting or a physical address corresponding to the geolocation coordinates obtained by analyzing the geolocation coordinates in the context of the information contained in the user's electronic calendar, the relationship management system, or additional databases containing such addresses, and the pre-visit data is received before the event occurs;
analyzing, by the computer, the geolocation data to identify the visit as a visit with a relationship or a collaborator within a process;
generating, by the computer, at least one relationship management notification based on the identification of the second user; and
sending, by the computer, at least one generated relationship management notification to the device of the user before the event occurs.

58. The method of claim 51, wherein the event of the mobile device is a mobile device geolocation event, further comprising:
receiving, by a computer from the connectivity component, post-visit data associated with the geolocation event coordinates from the mobile device of the user, wherein the post-visit data includes at least one of the name of a person or company that the user is visiting, a physical address corresponding to the geolocation coordinates obtained by analyzing the geolocation coordinates in the context of the information contained in the user's electronic calendar, the relationship management system, or additional databases containing such addresses, and the post-visit data is received after the event occurs;
analyzing, by the computer, the post-visit data to determine at least one relationship management suggestion based on pre-visit data, the post-visit data, and at least one relationship management process; and
sending, by the computer, the at least one generated relationship management suggestion to the mobile device of the user after the geolocation event is terminated.

59. The method of claim 58, wherein
the generated relationship management suggestion is a suggestion for the user of the mobile device to enter user notes for the mobile device geolocation event into the at least one relationship management process in the relationship management system,
the generated relationship management suggestion is a suggestion for the user of the mobile device to enter a selection to advance progression within the process, and
the generated relationship management suggestion is a suggestion to for the user of the mobile device to add the second user as a new relationship or collaborator within a second process.

60. The method of claim 51, further comprising:
providing user interface functionality including a selection, wherein mobile data events and electronic communications can be classified as non-work-related, wherein the user, by selection, can designate that subsequent mobile data and electronic communication events with common attributes to be automatically classified as private; and analyzing subsequent data events by a computer by referencing the prior classifications by the user of data events stored in the database to determine whether each follow-on mobile event correlates to common origination or destination and or geolocation attributes of event data previously classified by the user as private, in order for the computer to determine whether the event data is private; and determining, by the computer, whether subsequent event data should not trigger notifications to the user because the event data is recognized by the computer as private.

61. A computer-implemented method of performing user sales productivity analysis of a sales force management system, the method comprising:

detecting, via one or more connectivity components, and sending, to at least one computer, one or more events of a mobile device associated with a user of the sales force management system;

collecting machine data associated with the mobile device for the user;

cross-referencing contact, lead or account information in the sales force management system with the machine data associated with the mobile device;

analyzing, via the at least one computer, the machine generated event data to determine an event potentially requiring user input;

transmitting a notification to the mobile device to provide the user input for the event requiring user input;

providing the user with follow-on workflow options or notifications related to the analyzed machine data associated with the sales force management system; and processing information to provide a graphical user interface (GUI) in a selected graphical follow-on data entry option associated with the sales force management system, the data provided into data fields being derived from the machine generated event data analyzed;

wherein data in the sales force management system is used to perform processing regarding:
an initial transmission to the mobile device based on the analyzed machine generated event data, the initial transmission updating an application installed on the mobile device that displays data regarding the workflow or visual data objects corresponding to the machine generated event data;

a graphical user interface, for transmission to and display on the mobile device, the graphical user interface configured to display and update the data in response to the machine generated event data associated with the mobile device; and graphical indicia including auto-populated data fields, for transmission and display on the mobile device, the graphical indicia comprising interactive graphical elements regarding which the user may interact with to provide follow-on data entry regarding event associated with the mobile device;

performing user sales productivity analysis including self-assessment, user comparative assessment, or manager employee assessment; and providing a notification to the user or to a manager regarding a failure to meet a productivity target.

62. A computer-implemented method of facilitating user data entry in a sales force management system, the method comprising:

detecting, via one or more connectivity components, and sending, to at least one computer, one or more events of at least one computing device associated with a user of the sales force management system, wherein the computing device includes one or more of a desktop computer, a laptop computer, a tablet, a smartphone, a presence management system, and/or an email server, and wherein the one or more events include electronic calendar entries, records of PBX calls, packet-switched VOIP calls, mobile phone calls, emails, SMS messages, chat messages, fax information, and geo- location data;

collecting a stream of machine data related to detected events associated with the computing device associated with the user of the sales force management system;

cross-referencing contact, lead or account information in the sales force management system with the machine data of the at least one event associated with the computing device;

analyzing, via the at least one computer, the cross-referenced machine data to identify, for the user, one or more events potentially requiring follow-on user input;

transmitting a notification to the computing device to provide the user input for the one or more events potentially requiring the user input;

providing the user with follow-on workflow options or notifications associated with the sales force management system related to the analyzed machine data; and processing information to provide options or suggestions to the user, including auto- populated data fields in a graphical user interface (GUI) including at least one graphical follow-on data entry option associated with the sales force management system, the suggestions or data provided into the auto-populated data fields being derived from the analyzed machine data;

wherein data contained in the sales force management system is used to perform processing regarding:
an initial transmission to the mobile device based on the analyzed machine data, the initial transmission updating an application installed on the computing device that displays data regarding the workflow or visual indicia corresponding to the analyzed machine data;

a graphical user interface, for transmission to and display on the computing device, the graphical user interface configured to display and update the data in response to the analyzed machine data; and graphical indicia including information regarding the analyzed machine data, the graphical indicia being transmitted to and displayed on the computing device, the graphical indicia comprising interactive graphical elements regarding which the user may interact with to provide one or more of follow-on workflow, follow-on data entry and/or suggestions to the user.

63. The method of claim 62, wherein the event of the mobile device is a calendar event, further comprising:

receiving, by a computer, access credentials from the user of the mobile device for a calendar system of the mobile device or the relationship management system;

accessing, by the computer, the calendar system using the access credentials;

locating, by the computer, the calendar event in the calendar system, wherein the calendar event is an imminent event that is scheduled to occur within a predetermined amount of time;

extracting, by the computer, event of a mobile device from the calendar event;

determining, by the computer, that the calendar event is related to the at least one relationship management process based on the extracted event data; and generating, by the computer, at least one relationship management notification and at least one relationship management suggestion based on the event data and at least one relationship management process.

64. The method of claim 63, wherein the event data extracted from the calendar event includes at least one attendee of the calendar event, a title of the calendar event, a location specified in the calendar event, and a description of the calendar event.

65. The method of claim 63, further comprising:

sending, by the computer, at least one generated relationship management notification to the mobile device of the user before the scheduled beginning of the calendar event, and sending, by the computer, at least one generated relationship management suggestion to the mobile device of the user after the scheduled ending of the calendar event.

66. The method of claim 65, wherein at least one generated relationship management suggestion includes at least a suggestion to follow up with at least one attendee of the calendar event, and/or a suggestion to add notes to a process to which the calendar event is related, and/or a suggestion to advance progression within the at least one relationship management process and/or a suggestion to add an attendee of the calendar event as a new relationship or a new collaborator within the at least one relationship management process when the attendee is not already a relationship or collaborator within the at least one relationship management process.

67. A computer-implemented method of performing user sales productivity analysis of a sales force management system, the method comprising:

detecting, via one or more connectivity components, and sending, to at least one computer, one or more events of at least one computing device associated with a user of the sales force management system, wherein the computing device includes one or more of a desktop computer, a laptop computer, a tablet, a smartphone, a presence management system, and/or an email server, and wherein the one or more events include electronic calendar entries, records of PBX calls, packet-switched, VoIP calls, mobile phone calls, emails, SMS messages, chat messages, fax information, and geo-location data;

collecting a stream of machine generated data related to detected events associated with the user;

cross-referencing contact, lead or account information in the sales force management system with the machine data associated with the user;

analyzing, via the at least one computer, the cross-referenced machine data to determine one or more events potentially requiring follow-on user input in the sales force management system;

performing user sales productivity analysis including one or more of self-assessment, user comparative assessment, or manager employee assessment by contrasting the analyzed machine generated data against one or more productivity targets for the analyzed machine generated data;

providing one or more notifications to the user or to a manager regarding a failure to meet a productivity target;

wherein data contained in the sales force management system is used to perform processing regarding:

an initial transmission to the mobile device based on the analyzed machine generated data, the initial transmission updating an application installed on the mobile device that displays data regarding the sales productivity analysis including one or more of self-assessment, user comparative assessment, or manager employee assessment against the productivity targets;

a graphical user interface, for transmission to and display on the computing device, the graphical user interface configured to display and update the data in response to the events determined via the analysis; and graphical indicia including information about the analyzed machine data that is transmitted to and displayed on the computing device, the graphical indicia comprising interactive graphical elements regarding which the user or the manager may interact with to configure or view a sales productivity analysis including one or more of self-assessment, user comparative assessment, or manager employee assessment against the productivity targets.

68. A computer implemented method of processing machine data associated with data events and facilitating user data entry in the sales force management system, the method comprising:

detecting, via one or more connectivity components, and sending, to at least one computer, one or more events of at least one computing device associated with a user of the sales force management system, wherein the computing device includes one or more of a desktop computer, a laptop computer, a tablet, a smartphone, a presence management system, and/or an email server, and wherein the one or more events include electronic calendar entries, records of PBX calls, packet-switched VOIP calls, mobile phone calls, emails, SMS messages, chat messages, fax information, and geo-location data, wherein the sales force management system has specific relationship information;

collecting a stream of machine data related to detected events associated with the computing device associated with the user of the sales force management system;

cross-referencing contact, lead or account information in the sales force management system with the machine data of the at least one event associated with the computing device;

analyzing, via the at least one computer, the cross-referenced machine data to provide for the user one or more events potentially requiring follow-on user input;

processing event data associated with a user to generate visual data indicia representing the event data in a graphical user interface (GUI), the visual data indicia incorporating options for follow-on user input and classification selections configured to provide added context to an event represented by the visual data indicia, the added context received from the user via the GUI;

automatically classifying the events as a function of a classification selection;

adding additional information to the event data based on the follow-up user input by the user or via cross-referencing contact, lead or account information in the sales force management system with the machine data of the at least one event associated with the computing device;

wherein data contained within the sales force management system is used to perform processing regarding:
- an initial transmission to the mobile device based on the analyzed machine data, the initial transmission updating an application installed on the mobile device that displays information regarding visual data objects corresponding to the analyzed machine data;
- a graphical user interface, for transmission to and display on the mobile device, the graphical user interface configured to display and update the data related to an event that was analyzed; and
- graphical indicia including information about the analyzed machine data that is transmitted and displayed on the computing device, the graphical indicia comprising interactive graphical elements regarding which the user may interact with to provide one or more classification, follow-on workflow, follow-on data entry and/or suggestions to the user.

* * * * *